United States Patent [19]
Houki et al.

[11] Patent Number: 6,118,463
[45] Date of Patent: Sep. 12, 2000

[54] POSITIONAL ERROR CORRECTION FOR COLOR IMAGE FORMING APPARATUS

[75] Inventors: Youji Houki; Kouichi Kobayashi; Hiroji Uchimura; Morihisa Kawahara; Tsutomu Nagatomi; Hirofumi Nakayasu; Hiroyuki Kaneda; Takeo Kojima; Kazuhiro Tamada; Akihisa Sota; Masao Konisi; Takao Sugano; Yoshihiko Taira, all of Kawasaki, Japan

[73] Assignee: Fujitsu Limited, Kawasaki, Japan

[21] Appl. No.: 09/042,806

[22] Filed: Mar. 17, 1998

[30] Foreign Application Priority Data

Mar. 19, 1997 [JP] Japan ..................................... 9-066218
Nov. 28, 1997 [JP] Japan ..................................... 9-329108

[51] Int. Cl.[7] .......................... G03G 15/00; G03G 15/01
[52] U.S. Cl. ............................................. 347/116; 399/301
[58] Field of Search ................................... 399/299, 301, 399/49; 347/116, 130, 131, 132; 358/276, 298

[56] References Cited

U.S. PATENT DOCUMENTS 4,750,010   6/1988   Ayers et al. .............................. 346/107
4,799,071   1/1989   Zeise et al. .............................. 347/233

(List continued on next page.)

FOREIGN PATENT DOCUMENTS 0 494 105 A2   7/1992   European Pat. Off. .
0 575 162 A1   12/1993  European Pat. Off. .

(List continued on next page.)

OTHER PUBLICATIONS

Patent Abstracts of Japan vol. 96, No. 8, Aug. 30, 1996 & JP 08 085236 A (Canon Inc.), Apr. 2, 1996.
Patent Abstracts of Japan vol. 96, No. 8, Aug. 30, 1996 & JP 08 085237 A (Canon Inc.), Apr. 2, 1996.

*Primary Examiner*—Joan Pendegrass
*Attorney, Agent, or Firm*—Armstrong, Westerman, Hattori, McLeland & Naughton

[57] ABSTRACT

An image forming apparatus includes a transport mechanism transporting a recording medium on a belt which is transported at a constant speed in a transport direction, a plurality of electrostatic recording units arranged in the transport direction of the recording medium and transferring toner images of different colors, a positional error detecting part using the toner image of a reference color transferred by one of the electrostatic recording units as a reference image, and relatively detecting positional error information related to positional errors of the toner images of remaining colors transferred by the remaining electrostatic recording units with respect to the reference image, and a positional error correcting part relatively correcting the positional errors of the toner images transferred by the remaining electrostatic recording units based on the positional error information. The positional error detecting part includes a part for controlling the electrostatic recording units to transfer at least two resist marks on the belt at a scan starting end and a scan terminating end of the belt in a main scan direction which is perpendicular to the transport direction of the recording medium, with respect to each of the colors, and a second part, including a sensor detecting the resist marks, for detecting positional error quantities of the resist marks of each of the remaining colors with respect to the resist marks of the reference color based on detection times of the resist marks of reference color and the remaining colors.

21 Claims, 38 Drawing Sheets

U.S. PATENT DOCUMENTS

| | | | |
|---|---|---|---|
| 5,040,003 | 8/1991 | Willis | 346/157 |
| 5,072,244 | 12/1991 | Aoki et al. | 346/160 |
| 5,099,260 | 3/1992 | Sato et al. | 347/116 |
| 5,384,592 | 1/1995 | Wong | 347/116 |
| 5,550,625 | 8/1996 | Takamatsu et al. | 355/326 |
| 5,587,771 | 12/1996 | Mori et al. | 399/72 |
| 5,600,404 | 2/1997 | Ando et al. | 399/18 |
| 5,715,498 | 2/1998 | Takeuchi et al. | 399/40 |
| 5,719,680 | 2/1998 | Yoshida et al. | 358/296 |
| 5,760,914 | 6/1998 | Gauthier et al. | 358/296 |
| 5,778,280 | 7/1998 | Komiya et al. | 399/49 |
| 5,806,430 | 9/1998 | Rodi | 101/484 |
| 5,854,958 | 12/1998 | Tanimoto et al. | 399/49 |

FOREIGN PATENT DOCUMENTS

| | | |
|---|---|---|
| 57-167034 | 10/1982 | Japan . |
| 62-148268 | 7/1987 | Japan . |
| 63-48573 | 3/1988 | Japan . |
| 63-191170 | 8/1988 | Japan . |
| 63-300260 | 12/1988 | Japan . |
| 1-112266 | 4/1989 | Japan . |
| 1-141746 | 6/1989 | Japan . |
| 1-142567 | 6/1989 | Japan . |
| 1-142677 | 6/1989 | Japan . |
| 4-126282 | 4/1992 | Japan . |
| 5-8438 | 1/1993 | Japan . |
| 5-69591 | 3/1993 | Japan . |
| 8-82987 | 3/1996 | Japan . |
| 8-85236 | 4/1996 | Japan . |
| 8-118737 | 5/1996 | Japan . |
| 8-258327 | 10/1996 | Japan . |
| 8-258328 | 10/1996 | Japan . |
| 8-258340 | 10/1996 | Japan . |
| 8-278680 | 10/1996 | Japan . |
| 10-198110 | 7/1998 | Japan . |
| 10-228152 | 8/1998 | Japan . |

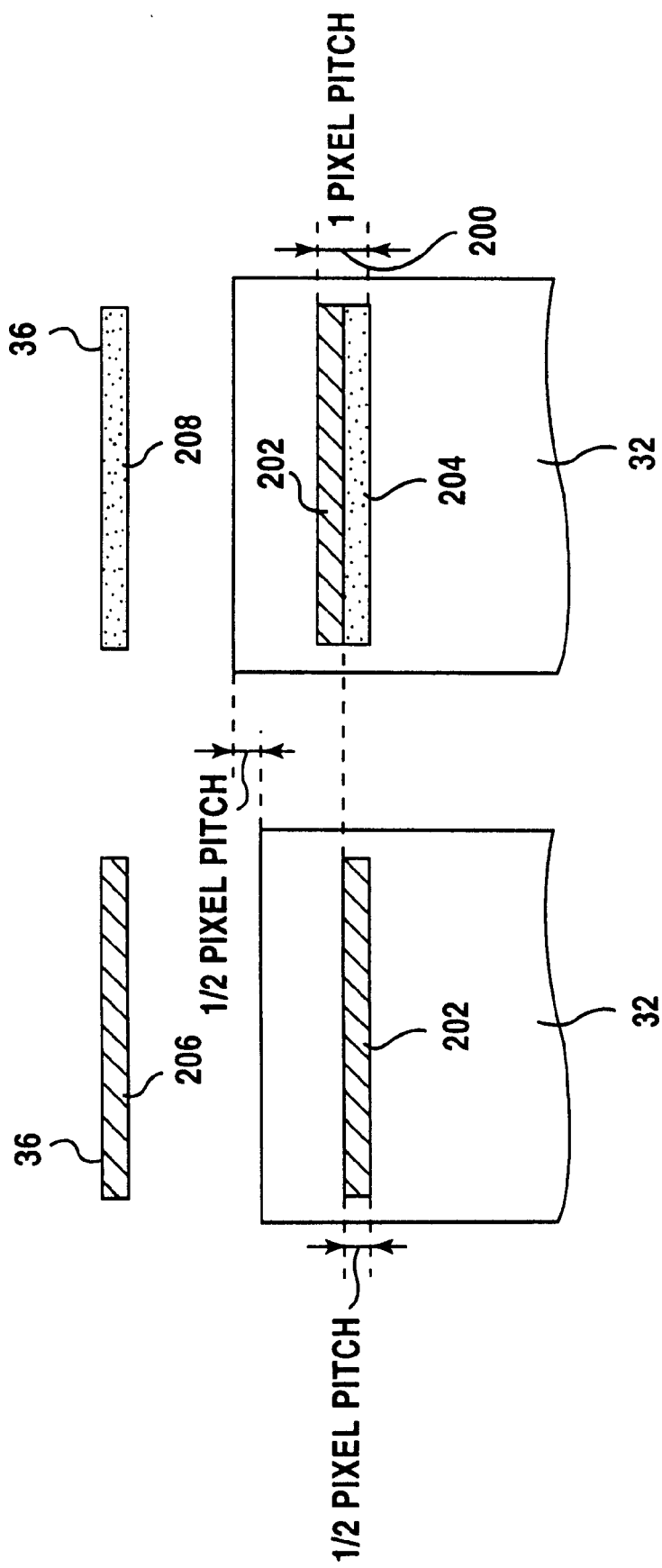

POSITIONAL ERROR CORRECTION FOR COLOR IMAGE FORMING APPARATUS

BACKGROUND OF THE INVENTION

The present invention generally relates to image forming apparatuses which print a full color image by overlapping color images transferred onto a recording medium by a plurality of electrostatic recording units which are provided with electrophotography printing functions, and more particularly to an image forming apparatus which can detect and correct positions of color images among a plurality of detachable electrostatic recording units.

Conventionally, a color image forming apparatus which employs the electrophotography technique has electrostatic recording units of four colors, namely, black (K), cyan (C), magenta (M) and yellow (Y), disposed in a tandem arrangement along a transport direction of a recording paper. Each of the electrostatic recording units of the four colors forms a latent image on a photoconductive drum by optically scanning the photoconductive drum depending on image data, and develops the latent image into a toner image by a corresponding color toner of a developing unit. The toner images in yellow (Y), magenta (M), cyan (C) and black (K) are successively transferred in this sequence onto the recording paper which is transported at a constant speed, in an overlapping manner by the four electrostatic recording units. Finally, the overlapping toner images on the recording paper are thermally fixed, for example, by a fixing unit.

When the color toner in any of the four electrostatic recording units of yellow (Y), magenta (M), cyan (C) and black (K) run out, it is necessary to replace the entire electrostatic recording unit or a portion of the electrostatic recording unit. For this reason, the electrostatic recording unit has a detachable structure so that it is possible to easily remove and set the electrostatic recording unit with respect to the image forming apparatus in a state where a cover of the image forming apparatus is open.

On the other hand, in order to improve the color printing quality in the color image forming apparatus which has the four electrostatic recording units disposed in the tandem arrangement along the transport direction of the recording paper, it is necessary to improve the color matching accuracy by reducing the positional error of the toner images which are transferred onto the moving recording paper by the four electrostatic recording units. For example, if the resolution in a main scan direction on the recording paper and the resolution in a sub scan direction on the recording paper are respectively set to 600 dpi, the pitch of pixels becomes approximately 42 $\mu$m, and the positional error must be suppressed to 42 $\mu$m or less. The main scan direction corresponds to a direction perpendicular to the transport direction of the recording paper, and the sub scan direction corresponds to the transport direction of the recording paper.

However, in the conventional color image forming apparatus the four electrostatic recording units disposed in the tandem arrangement along the transport direction of the recording paper, the four electrostatic recording units are detachably provided, and for this reason, the positional error described above is large compared to the case where the electrostatic recording units are fixedly provided. As a result, it was difficult to realize a color matching accuracy having the positional error suppressed to 42 $\mu$m of less, due to the mechanical molding or forming accuracy with which parts of the image forming apparatus can be formed and the accuracy with which the parts of the image forming apparatus can be assembled.

A method of eliminating the above described problems associated with the image forming apparatus having the detachable electrostatic recording units was proposed in a Japanese Laid-Open Patent Application No.8-85236, for example. According to this proposed method, resist marks made up of a test pattern are transferred on a transfer belt, and the resist marks are read by a charge coupled device (CCD). The positional error of the resist marks is detected based on an output of the CCD, by comparing detected coordinates of the resist marks with preset absolute reference coordinates of the apparatus. When outputting the image data with respect to a laser scan unit, the image data are corrected based on the detected positional error.

But according to this proposed method, it is necessary to carry out the operation of transferring the resist marks on the transfer belt and detecting the positional error of the resist marks with respect to the absolute coordinates, with respect to each of the four electrostatic recording units of yellow (Y), magenta (M), cyan (C) and black (K). Furthermore, since the CCD is used to detect the resist marks, it takes time to carry out the process of detecting the positional error, and the amount and cost of the required hardware increase.

On the other hand, the conventional image forming apparatus uses the electrostatic recording units which are respectively made up of the laser scan unit which forms the latent image on the photoconductive drum by scanning the photoconductive drum by a laser beam. For this reason, even if the positional error generated by each electrostatic recording unit is large, the scan position of the laser beam can be corrected to a position which is determined by the absolute coordinates in a relatively easy manner in the case of the laser scan unit. However, in order to reduce the size and cost of the image forming apparatus, an electrostatic recording unit which uses a light emitting element array in place of the laser scan unit has recently been proposed. The light emitting element array includes a plurality of extremely small light emitting elements arranged in the main scan direction.

In the electrostatic recording unit which uses the light emitting element array, the beam irradiating position of each light emitting element with respect to the photoconductive drum is determined in a 1:1 relationship by the physical position of each light emitting element. Consequently, unlike the laser scan unit, it is difficult to change the beam irradiating position of the light emitting element for the purpose of correcting the positional error.

It is conceivable to correct the positional error by mechanically adjusting the light emitting element array. However, it would be extremely difficult to make a mechanical adjustment so that the positional error will be suppressed to 42 $\mu$m or less. Therefore, in the color image forming apparatus which uses the light emitting element array, a large positional error on the order of 300 $\mu$m, for example, is generated, and there was a problem in that a sufficiently high color printing quality cannot be realized by the overlap of the color components.

SUMMARY OF THE INVENTION

Accordingly, it is a general object of the present invention to provide a novel and useful image forming apparatus in which the problems described above are eliminated.

Another and more specific object of the present invention is to provide an image forming apparatus having electrostatic recording units which use light emitting element arrays, wherein a highly accurate positional error correction can be realized by a carrying out a simple detection of the positional error.

Still another object of the present invention is to provide an image forming apparatus comprising a transport mechanism transporting a recording medium on a belt which is transported at a constant speed in a transport direction, a plurality of electrostatic recording units arranged in the transport direction of the recording medium and transferring toner images of different colors, a positional error detecting part using the toner image of a reference color transferred by one of the electrostatic recording units as a reference image, and relatively detecting positional error information related to positional errors of the toner images of remaining colors transferred by the remaining electrostatic recording units with respect to the reference image, and a positional error correcting part relatively correcting the positional errors of the toner images transferred by the remaining electrostatic recording units based on the positional error information, where the positional error detecting part comprises first means for controlling the electrostatic recording units to transfer at least two resist marks on the belt at a scan starting end and a scan terminating end of the belt in a main scan direction which is perpendicular to the transport direction of the recording medium, with respect to each of the colors, and second means, including a sensor detecting the resist marks, for detecting positional error quantities of the resist marks of each of the remaining colors with respect to the resist marks of the reference color based on detection times of the resist marks of reference color and the remaining colors. According to the image forming apparatus of the present invention, the positional error information related to the positional errors of the images of the remaining colors is detected with respect to the reference image, and the positional errors of the remaining colors are corrected relative to the reference image based on the positional error information so that the positions of the images of the remaining colors match the position of the reference image. Hence, the required amount of hardware is reduced and the processing procedure is simplified compared to the case where the positional errors of all color images are detected and corrected, thereby making it possible to considerably reduce the cost of the image forming apparatus. For example, when forming the image in four colors, namely, yellow, magenta, cyan and black, the color black having the highest contrast among the four colors may be used as the reference color with respect to the remaining colors which are yellow, magenta and cyan.

A further object of the present invention is to provide the image forming apparatus of the type described above, wherein an optical write unit of each electrostatic recording unit includes a write array having a plurality of light emitting elements arranged at a pitch of 1 pixel in the main scan direction, and writes 1 pixel by controlling light emissions of the write array in time divisions of first through nth scans in synchronism with the transport of the recording medium in the sub scan direction at a pitch of 1/n pixels, and the positional error correcting part converts the pixel data into the high-resolution pixel data by decomposing the pixel data into n in the sub scan direction and stores the high-resolution pixel data in the image memory when developing the pixel data in the image memory, and computes the error quantity in the sub scan direction at each pixel position on the main scan line, based on the error quantity $_\Delta x$ in the main scan direction, the error quantity $_\Delta y$ in the sub scan direction and the skew quantity $_\Delta z$ in the sub scan direction, with respect to the high-resolution pixel data, and writes the pixel data in the image memory by correcting the write address in the sub scan direction to a position in a direction opposite to the direction of the error so as to cancel each error quantity, so that n corrected high-resolution pixel data are successively read from the image memory in synchronism with the transport of the recording medium in the sub scan direction at a pitch of 1/n pixel, and 1 pixel is written by the write array by time-divisionally driving the light emitting elements of the write array. According to the image forming apparatus of the present invention, the image data is converted into the high-resolution pixel data having a resolution which is n times (for example, two times) in the sub scan direction when developing the image data into the pixel data, and the pixel data are written by the time-divisional driving of the light emitting elements of the write array. Hence, even if the corrected pixel data becomes inclined with respect to the main scan direction by the positional error correction, it is possible to smoothen the irregularities of the print result by the high resolution in the sub scan direction. As a result, it is possible to greatly improve the accuracy of the positional error correction in a case where the scan line becomes inclined with respect to the reference line of the reference color due to the positional error.

Another object of the present invention is to provide an image forming apparatus comprising a controller part receiving image data and control information, and an engine part including a recording unit printing an image on a recording medium based on the image data and the control information received via the controller part, where the engine part further includes image processing means for correcting a positional error of a print position of the recording unit and for converting a data format of the image data depending on a driving system employed by the recording unit. According to the image forming apparatus of the present invention, the specification of a video interface between the controller part and the engine part can be made the same or approximately the same regardless of the image forming apparatus, because the positional error correction and the data format conversion of the pixel data depending on the driving system employed by the recording unit are carried out within the engine part. Therefore, manufacturers of image forming apparatuses need not design and develop an exclusive controller part having the correcting function, and in addition, it is possible to reduce the load on the controller part.

Other objects and further features of the present invention will be apparent from the following detailed description when read in conjunction with the accompanying drawings.

BRIEF DESCRIPTION OF THE DRAWINGS

FIGS. 28A and 28B respectively are diagrams for explaining a time division write scan using the high-resolution pixel data shown in FIGS. 27A and 27B;

DESCRIPTION OF THE PREFERRED EMBODIMENTS

Figure 1A:
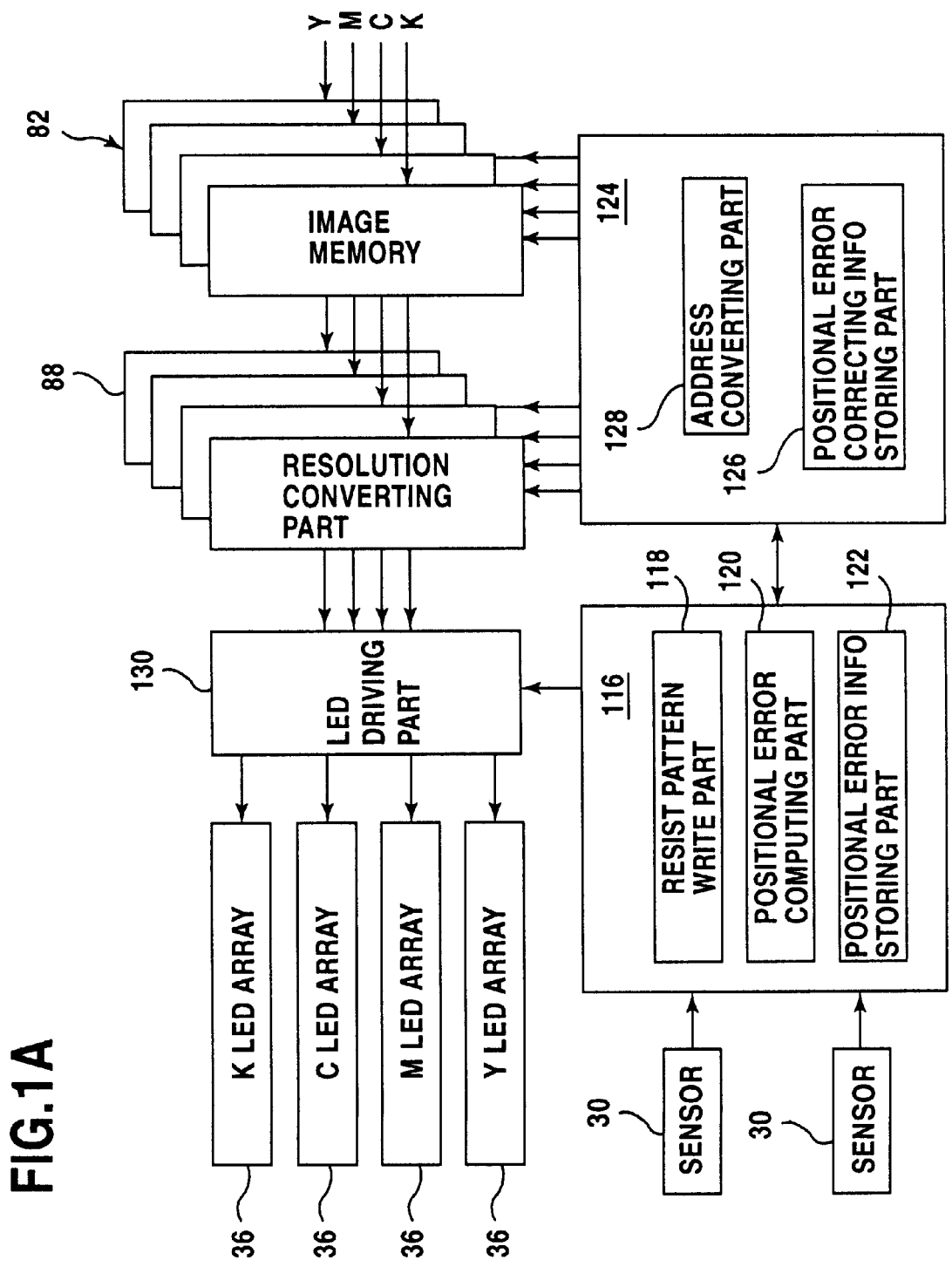
FIGS. 1A through 1C respectively are diagrams for explaining the operating principle of the present invention.

First, a description will be given of the operating principle of the present invention, by referring to FIGS. 1A through 1C.

An image forming apparatus according to the present invention generally includes a transport mechanism, and a plurality of electrostatic recording units. The transport mechanism is provided with a belt which is transported at a constant speed, and a recording paper is attracted to and is transported by this belt. The electrostatic recording units are disposed in a tandem arrangement along a transport direction of the recording paper. Each of the electrostatic recording units forms a latent image dependent on image data by optically scanning a photoconductive drum, and develops the latent image on the recording paper using a toner which has a corresponding color, so that an image of the corresponding color is transferred onto the recording paper on the belt by each of the electrostatic recording units.

In this image forming apparatus having the electrostatic recording units disposed in the tandem arrangement, a color image formed by an arbitrary one of the electrostatic recording units is used as a reference image. A positional error detecting part 116 shown in FIG. 1A detects information related to positional errors of color images formed by the other electrostatic recording units relative to the reference image. A positional error correcting part 124 shown in FIG. 1A corrects the color images formed by the other electrostatic recording units, excluding the arbitrary electrostatic recording unit, relative to the reference image so as to eliminate the positional errors, based on the detected information related to the positional errors of the other electrostatic recording units detected by the positional error detecting part 116.

For example, the image forming apparatus is provided with four electrostatic recording units for forming black (K), cyan (C), magenta (M) and yellow (Y) images (hereinafter referred to as K, C, M and Y electrostatic recording units). In addition, a black image formed by the K electrostatic recording unit is used as the reference image, for example, and the cyan, magenta and yellow images formed by the other C, M and Y electrostatic recording units are corrected relative to the black image based on the information related to the positional errors detected with respect to the cyan, magenta and yellow images.

By detecting and correcting the positional errors of the cyan, magenta and yellow images relative to the reference black image in this manner, it becomes possible to use one of the four color images as the reference image and to detect the positional errors of the remaining three color images relative to the reference image. As a result, compared to the case where the positional errors of all of the four color images are detected with respect to the absolute reference coordinates of the apparatus, the hardware required to detect the positional errors becomes simple and inexpensive.

Figure 1B:
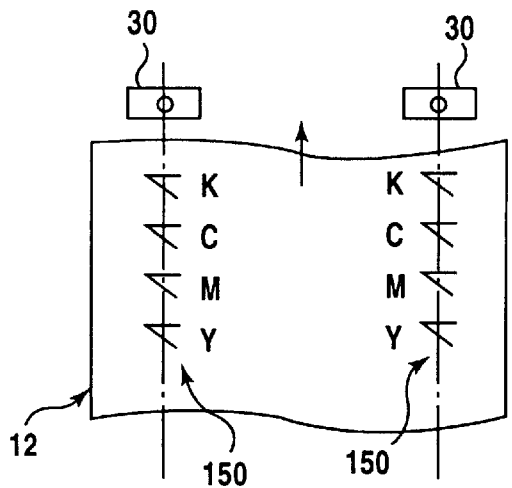
Figure 1C:
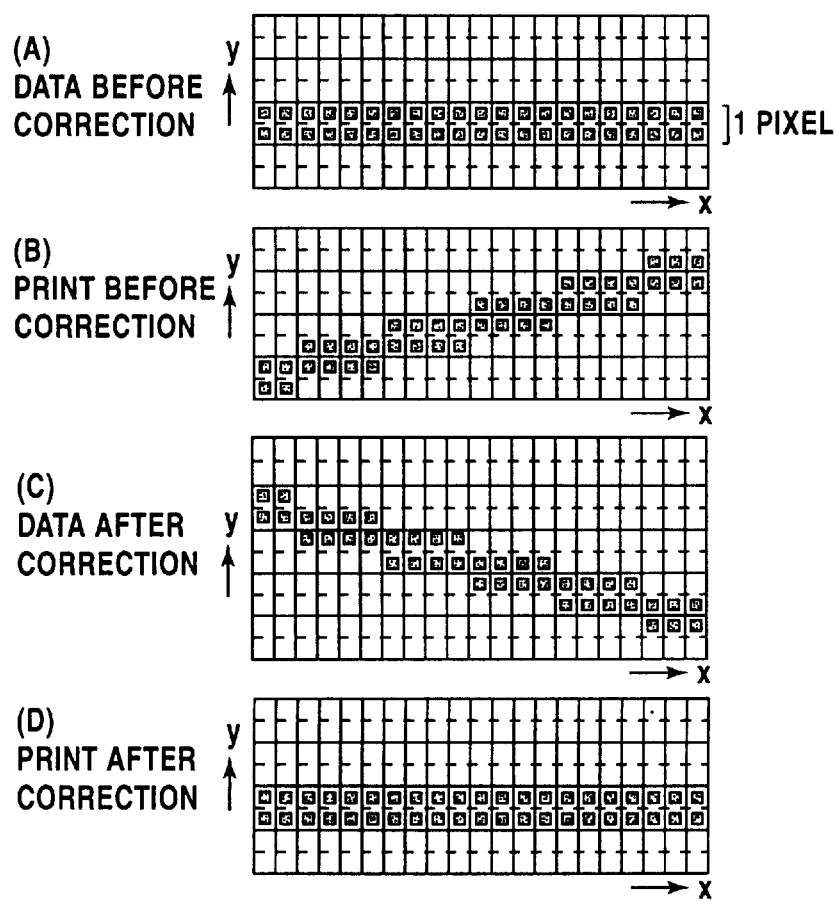

As shown in FIG. 1B, the electrostatic recording units sequentially transfer resist marks 150 of the corresponding colors onto a belt 12, and the positional error detecting part 116 thereafter optically detects the resist marks 150 by sensors 30, so as to detect the positional errors of the resist marks 150 of the corresponding three colors relative to the reference resist mark 150 of the reference color other than the three colors.

In this case, positional error detecting part 116 prints the reference resist mark 150 by the electrostatic recording unit of the color having the highest contrast, and detects positional error information of the resist marks 150 printed by the electrostatic recording units of the other three remaining colors relative to the reference resist mark 150. More particularly, the black resist mark 150 printed by the black (K) electrostatic recording unit is used as the reference resist mark 150, and the positional errors of the resist marks 150 printed by the other cyan (C), magenta (M) and yellow (Y) electrostatic recording units relative to the black resist mark 150 are detected.

The resist mark 150 which is transferred onto the belt 12 by the positional error detecting part 116 has a general wedge shape including a first straight line which extends in the main scan direction and is perpendicular to the transport direction of the recording paper, and a second straight line which is connected to one end of the first straight line and is inclined with respect to both the main scan direction and the sub scan direction which is perpendicular to the main scan direction.

The positional error detecting part 116 transfers the resist mark 150 at two positions on the belt 12, that is, at a position on a scan starting side and at a position on a scan terminating side of the belt 12 along the main scan direction. The positional error detecting part 116 measures a time from a time when the first straight line of the reference resist mark 150 is detected in the sub scan direction to a time when the first straight line of the resist mark 150 of another color is detected, and detects an error quantity $_\Delta y$ in the sub scan direction by subtracting from the measured time a reference time for the case where no positional error exists.

In addition, the positional error detecting part 116 measures a first time from a time when the horizontal first straight line of the reference resist mark 150 is detected in the sub scan direction to a time when the oblique second straight line of the reference resist mark 150 is detected, and measures a second time from a time when the horizontal first straight line of the resist mark 150 of another color is detected in the sub scan direction to a time when the oblique second straight line of the resist mark 150 of this other color is detected. The positional error detecting part 116 detects an error quantity $_\Delta x$ in the main scan direction from a difference between the first time and the second time described above.

Conditions with respect to the dimensions of the resist mark 150 transferred onto the belt 12 by the positional error detecting part 116 may be determined as follows. That is, an intersecting angle θ of the second straight line of the resist mark 150 with respect to the first straight line of this resist mark 150 in the main scan direction is set to satisfy the following relationship, where v denotes a transport speed (mm/sec) of the belt 12, S denotes a detection accuracy (μm) of the sensor 30, and T denotes a sampling period (sec) of the detection signal of the sensor 30.

$$\tan\theta \leq (v \cdot T/S)$$

On the other hand, the an intersecting angle θ of the second straight line of the resist mark 150 with respect to the first straight line of this resist mark 150 in the main scan direction is set to satisfy the following relationship, where v denotes a transport speed (mm/sec) of the belt 12, W denotes a tolerable error width (mm) of the first straight line in the main scan direction, and t denotes a tolerable time (sec) of the printing of one resist mark 150 in the sub scan direction.

$$\tan\theta \leq (v \cdot t/W)$$

The positional error detecting part 116 successively transfers onto the belt 12 a plurality of resist marks 150 of each of the colors in the sub scan direction, and calculates an average value of the error quantities detected for each of the resist marks 150. As a result, the positional error detection accuracy is further improved.

The positional error detecting part 116 may store the pattern of the resist mark 150 to be transferred onto the belt 12 in a bit map pattern. However, in order to reduce the required memory capacity, it is desirable to store the pattern information of the resist mark 150 in the form of vector data and to transfer the resist mark 150 onto the belt 12 by the electrostatic recording unit by developing the stored vector data into pixel data at the time of the printing.

The positional error detection information detected by the positional error detecting part 116 includes a positional error quantity, an inclination quantity and a line width in the main scan direction of a main scan line which is subject to the detection with respect to the reference image. In other words, the positional error detecting part 116 uses the main scan line of the reference image as a reference, and detects the positional error detection information which includes an error quantity $_\Delta x$ in the main scan direction and an error quantity $_\Delta y$ in the sub scan direction of a starting end of the main scan line of the image which is subject to the detection, a deviation quantity (skew quantity) $_\Delta z$ in the sub scan direction of a terminating end of the main scan line indicating the inclination (slope) of the main scan line, and a magnification Km of the line width of the main scan line.

The positional error correcting part 124 develops the image data transferred from a host unit into pixel data in an image memory 82. When developing the image data into the pixel data in the image memory 82, the positional error correcting part 124 corrects a write address based on the positional error detection information from the positional error detecting part 116, so as to correct the error of the image which is to be printed with respect to the reference image.

More particularly, when correcting the write address, the positional error correcting part 124 computes the error quantity in the sub scan direction at each pixel position on the main scan line, based on the error quantity $_\Delta x$ in the main scan direction, the error quantity $_\Delta y$ in the sub scan direction and the deviation quantity (skew quantity) $_\Delta z$ in the sub scan direction. The positional error correcting part 124 writes the pixel data in the image memory 82 by correcting the write address in the sub scan direction to a position in a direction opposite to the direction of the error so as to cancel each error quantity.

Furthermore, each of the electrostatic recording units used in the image forming apparatus of the present invention includes an optical write unit which forms an electrostatic latent image on the photoconductive drum by carrying out an optical write operation with respect to the photoconductive drum depending on gradation values of the pixel data. The resolution in the sub scan direction of the optical write unit is set higher than the resolution in the main scan direction. The positional error correcting part 124 carries out the printing by correcting the positional error using the gradation values and the high-resolution optical write operation of the optical write unit.

The optical write unit includes a write array 36 having a plurality of light emitting elements (LEDs or light emitting segments) arranged at a pitch of 1 pixel in the main scan direction, and writes 1 pixel by controlling light emissions of the write array 36 in time divisions of first through nth scans by a LED driving part 130 in synchronism with the transport of the recording paper in the sub scan direction at a pitch of 1/n pixels.

When developing the pixel data in the image memory 82, in correspondence with the write array 36, the positional error correcting part 124 converts the pixel data into high-resolution pixel data by decomposing the pixel data into n (for example, two) in the sub scan direction and stores the high-resolution pixel data. This resolution conversion process may be carried out within the positional error correcting part 124 or, by a resolution converting part 88 which is provided independently of the positional error correcting part 124 as shown in FIG. 1A. At the same time, the positional error correcting part 124 computes the error quantity in the sub scan direction at each pixel position on the main scan line, based on the error quantity $_\Delta x$ in the main scan direction, the error quantity $_\Delta y$ in the sub scan direction and the deviation quantity (skew quantity) $_\Delta z$ in the sub scan direction, with respect to the high-resolution pixel data. The positional error correcting part 124 writes the pixel data in the image memory 82 by correcting the write address in the sub scan direction to a position in a direction opposite to the direction of the error so as to cancel each error quantity, as may be seen from FIGS. 1C(A) through 1C(D). FIG. 1C(A) shows the pixel data stored in the image memory 82 prior to the correction, and FIG. 1C(B) shows the printed pixel data prior to the correction, that is, the pixel data printed in the case where no correction is made. On the other hand, FIG. 1C(C) shows the pixel data stored in the image memory 82 after the correction, and FIG. 1C(D) shows the printed pixel data after the correction, that is, the pixel data in the case where the correction is made.

In other words, n corrected high-resolution pixel data are successively read from the image memory 82 in synchronism with the transport of the recording paper in the sub scan direction at a pitch of 1/n pixel, 1 pixel is written by the write array 36 by time-divisionally driving the LEDs of the write array 36 by the LED driving part 130.

When converting the pixel data into the n high-resolution pixel data at the pitch of 1/n pixel in the sub scan direction, the gradation value differs depending on whether the decomposed hi-resolution pixel data is located at a boundary of 1 pixel by a shift of the positional error correction.

That is, when developing the high-resolution pixel data which are corrected of the positional error in the image memory 82, the positional error correcting part 124 judges whether or not the n high-resolution pixel data decomposed with the pitch of 1/n pixel in the sub scan direction are located at the pixel boundary. If the n high-resolution pixel data are not located at the pixel boundary, a previously used gradation value is stored as a gradation value of the first scan with respect to the n decomposed high-resolution pixel data. On the other hand, when the n high-resolution pixel data are located at the pixel boundary, the gradation values are stored separately for the first through nth scans with respect to the decomposed n high-resolution pixel data.

With respect to the gradation values of the high-resolution pixel data which are generated in this manner, the light emission of the LEDs of the write array 36 of the optical write unit is time-divisionally controlled depending on the same gradation value for each timing of the first through nth scans of 1 pixel at the pitch of 1/n pixel in the sub scan direction if the high-resolution pixel data amounting to 1 pixel decomposed in the sub scan direction and read from the image memory 82 has the gradation value of only the first scan.

On the other hand, if the high-resolution pixel data amounting to 1 pixel decomposed in the sub scan direction and read from the image memory 82 has the gradation values of the first through nth scans (that is, located at the pixel boundary), the light emission of the LEDs of the write array 36 of the optical write unit is controlled via the LED driving part 130 depending on the gradation value of the first scan with the timing of the nth scan of the nth 1/n period for the first 1 pixel, controlled via the LED driving part 130 depending on the gradation value of the second scan with the timing of the (n−1)th scan of the second 1/n period of the next 1 pixel, . . . , and controlled via the LED driving part 130 depending on the gradation value of the nth scan with the timing of the first scan of the first 1/n period of the next 1 pixel.

For this reason, by printing the corrected high-resolution pixel data stored in the image memory 82, the resolution of the printed image becomes doubled in the sub scan direction. Hence, even in the case of the printing using a write array having an optical recording position which is physically fixed with respect to the photoconductive drum, it is possible to correct the positional error of the image with respect to the reference image with a high accuracy. It is possible to improve the accuracy of the positional error correction particularly in the case where the positional error is caused by the scan line which is inclined with respect to a reference line.

The write array 36 of the optical write unit has a plurality of LEDs or LED chips arranged at a pitch of 1 pixel in the main scan direction. By use of the write array 36, the printing resolution of the optical write unit in the sub scan direction is set to an integral multiple of (n times) the resolution in the main scan direction. For example, n is 2 or 3. In other words, in the case where the printing resolution in the main scan direction is 600 dpi, for example, the printing resolution in the sub scan direction is set to 1200 dpi which is 2 times that in the main scan direction or, set to 1800 dpi which is 3 times that in the main scan direction. The LED driving part 130 of the optical write unit controls each LED of the write array 36 to make a number of light emission pulses dependent upon the gradation value during the light emission period of each LED, so as to control the depth of the latent image formed on the photoconductive drum.

If the line width in the main scan direction is different from a reference width, a correction is carried out to compress or expand the pixel data in the main scan direction so as to match the line width to the reference width. In other words, the positional error correcting part 124 obtains a reduced or enlarged number (N/Km) of corrected pixels by multiplying to a predetermined number N of pixels in the main scan direction an inverse number of a magnification Km (=L/L0) which is obtained by dividing a line width L of the image in the main scan direction by a line width L0 of the reference image in the main scan direction. In addition, the positional error correcting part 124 writes the gradation value of the pixel data compressed or expanded in the main scan direction at each pixel address of the reduced or enlarged number (N/Km) of corrected pixels.

More particularly, with respect to the print result of the pixel data before the correction, the positional error correcting part 124 multiplies an inverse number of the magnification Km and obtains a corrected print result which is reduced or enlarged in the main scan direction. The positional error correcting part 124 samples the corrected print result at each position of the reduced or enlarged number (N/Km) of corrected pixels by multiplying the inverse number of the magnification Km of the line width of the image in the main scan direction to the predetermined number N of pixels in the main scan direction, so as to generate the gradation value of each pixel after being subjected to the line width correction.

The image forming apparatus of the present invention may be constructed so that a main apparatus body is formed by an engine part and a controller part, where the plurality of electrostatic recording units and the positional error detecting part 116 are provided in the engine part, and the positional error correcting part 124 is provided in the controller part.

In this case, the positional error correcting part 124 provided in the controller part carries out the positional error correction based on the positional error detection information supplied from the positional error detecting part 116 of the engine part, when developing the image data transferred from an external host unit into the image memory 82 as pixel data.

In addition, when reading the image data from the image memory 82 and outputting the read image data to the engine part, the positional error correcting part 124 provided in the controller part may develop the image memory in a buffer memory which is provided at an intermediate part of an output path. In this case, the positional error correction can be carried out in the buffer memory based on the positional error detection information supplied from the positional error detecting part 116 provided in the engine part.

As will be described later in the specification in conjunction with FIG. 8, the positional error detecting part 116 includes a resist pattern write part 118, a positional error computing part 120 and a positional error information storing part 122 for carrying out the above described operations of the positional error detecting part 116. On the other hand, the positional error correcting part 124 includes an address converting part 128 and a positional error correcting information storing part 126 for carrying out the above described operations of the positional error correcting part 124.

Next, a description will be given of various embodiments of the image forming apparatus of the present invention.

Figure 2:
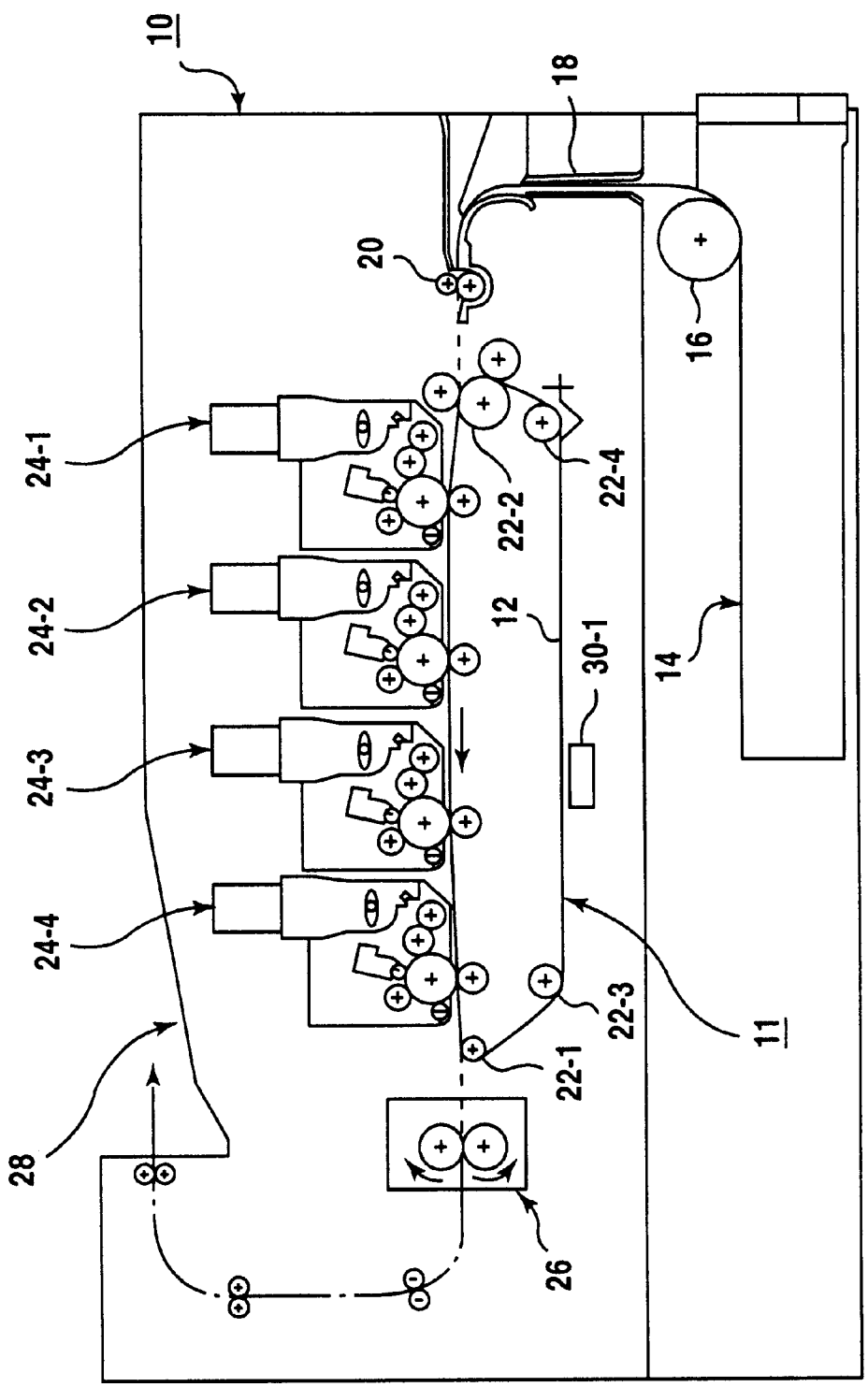
FIG. 2 is a diagram for explaining an internal structure of a main apparatus body of a first embodiment of an image forming apparatus according to the present invention.

1-1. Structure of First Embodiment of Image Forming Apparatus:

FIG. 2 is a diagram for explaining an internal structure of a first embodiment of the image forming apparatus according to the present invention. A transport belt unit 11 for transporting a recording medium such as a recording paper is provided within a main apparatus body 10. This transport belt unit 11 has an endless belt 12 which is freely movable, and the endless belt 12 is made of a transparent dielectric material such as a suitable synthetic resin material. The endless belt 12 is provided around 4 rollers 22-1, 22-2, 22-3 and 22-4. The transport belt unit 11 is detachably provided with respect to the main apparatus body 10.

The roller 22-1 functions as a driving roller, and the driving roller 22-1 is driven by a driving mechanism (not shown) to drive the endless belt 12 clockwise as indicated by an arrow at a constant speed. The driving roller 22-1 also functions as an A.C. charge elimination roller for eliminating (or discharging) the charge on the endless belt 12. The roller 22-2 functions as a freely rotatable following roller, and this following roller 22-2 also functions as a charging roller for applying a charge on the endless belt 12.

The rollers 22-3 and 22-4 both function as guide rollers, and the guide roller 22-3 is arranged in a vicinity of the driving roller 22-1 while the guide roller 22-4 is arranged in a vicinity of the following roller 22-2. An upper moving part of the endless belt 12 between the following roller 22-2 and the driving roller 22-1 forms a paper moving path for the recording paper. The recording paper is stored in a hopper 14, and the recording paper is fed from the hopper 14 one sheet at a time from the top sheet by a pickup roller 16. The recording paper fed out by the pickup roller 16 passes through a paper guide path 18 and is supplied to the paper moving path of the endless belt 12 from the side of the following roller 22-2 by a pair of paper feeding rollers 20, and the recording paper passed through the paper moving path is ejected by the driving roller 22-1.

Since the endless belt 12 is charged by the following roller 22-2, the recording paper is electrostatically attracted to the endless belt 12 when the recording paper is supplied to the paper moving path from the side of the following roller 22-2, thereby preventing the position of the recording paper from changing during transport. On the other hand, because the driving roller 22-1 on the ejecting side functions as the charge elimination roller, the charge on the endless belt 12 is eliminated at a part where the endless belt 12 touches the driving roller 22-1. For this reason, the charge on the endless belt 12 is eliminated when the recording paper passes the driving roller 22-1, and the recording paper can easily be separated from the endless belt 12 and ejected without being attracted towards the lower moving part of the endless belt 12.

Four electrostatic recording units 24-1, 24-2, 24-3 and 24-4 of yellow (Y), magenta (M), cyan (C) and black (K) are provided within the main apparatus body 10. The Y, M, C and K electrostatic recording units 24-1, 24-2, 24-3 and 24-4 are disposed in series in a tandem arrangement in this sequence from an upstream side to a downstream side along the paper moving path on the upper moving part of the endless belt 12 between the following roller 22-2 and the driving roller 22-1.

The Y, M, C and K electrostatic recording units 24-1, 24-2, 24-3 and 24-4 have the same structure, except that the Y, M, C and K electrostatic recording units 24-1, 24-2, 24-3 and 24-4 respectively use a yellow toner, magenta toner, cyan toner and black toner as developing agents.

Hence, the Y, M, C and K electrostatic recording units 24-1, 24-2, 24-3 and 24-4 successively transfer and record yellow, magenta, cyan and black toner images in an overlapping manner on the recording paper which moves along the paper moving path on the upper moving part of the endless belt 12, thereby forming a full color toner image on the recording paper.

Figure 3:
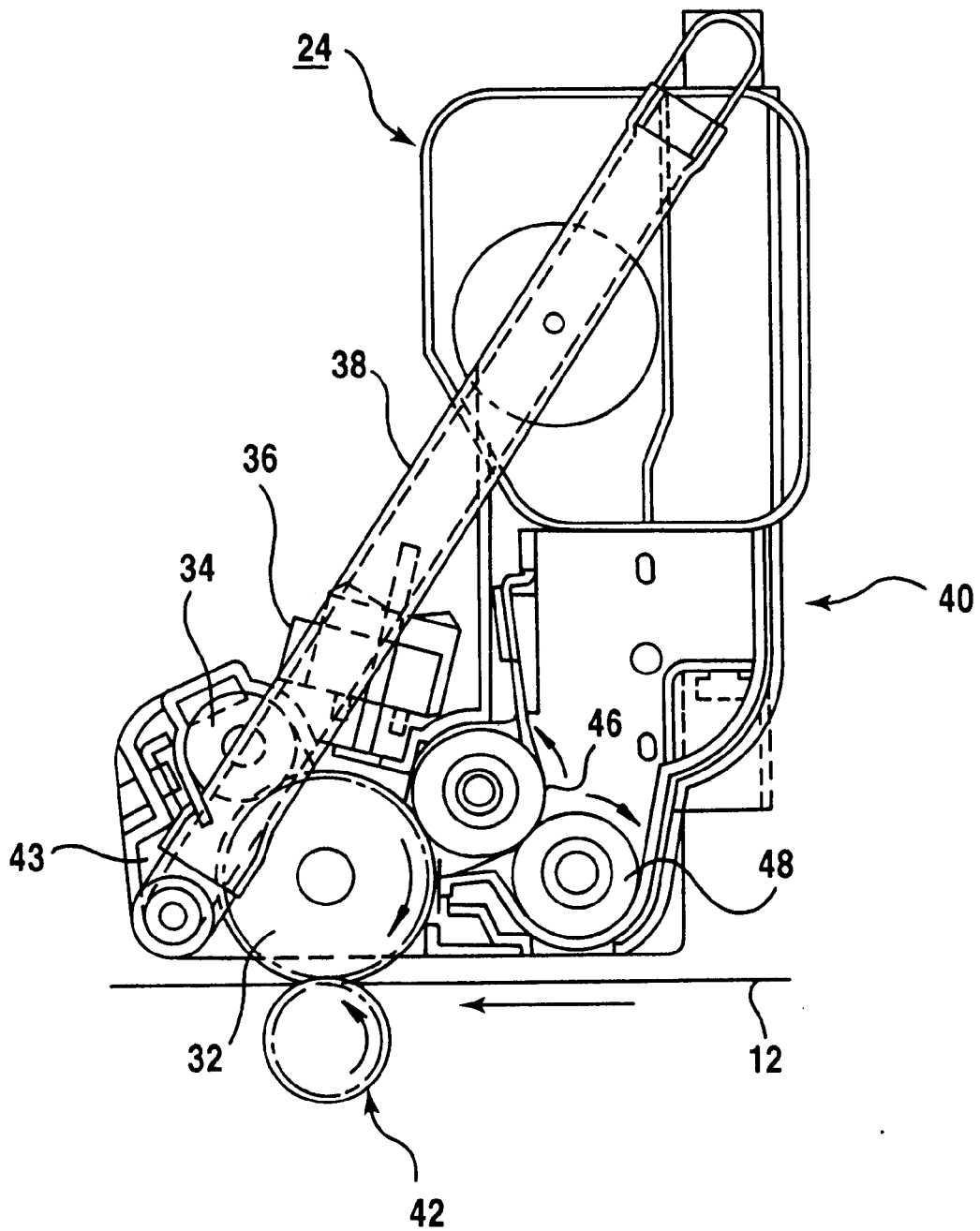
FIG. 3 is a cross sectional view showing an electrostatic recording unit shown in FIG. 2.

FIG. 3 is a cross sectional view showing one of the electrostatic recording units 24-1, 24-2, 24-3 and 24-4 shown in FIG. 2. An electrostatic recording unit 24 is provided with a photoconductive drum 32, and this photoconductive drum 32 is rotated clockwise when carrying out the recording operation. A precharger 34 which is made of a corona charger or scorotron charger, for example, is arranged above the photoconductive drum 32, and the rotary surface of the photoconductive drum 32 is uniformly charged by the precharger 32.

A LED array 32 which functions as the optical write unit is arranged in a charging region of the photoconductive drum 32, and an electrostatic latent image is written by a scanning light emitted from the LED array 36. In other words, the light emitting elements arranged in the main scan direction of the LED array 36 are driven based on gradation values of pixel data (dot data) developed from the image data which is supplied as print information from a computer, word processor or the like, and the electrostatic latent image is written as a dot image.

The electrostatic latent image written on the photoconductive drum 32 is electrostatically developed into a charged toner image by a predetermined color toner of a developing unit 40 arranged above the photoconductive drum 32. The charged toner image on the photoconductive drum 32 is electrostatically transferred onto the recording paper by a conductive transfer roller 42 located below the photoconductive drum 32.

In other words, the conductive transfer roller 42 is arranged with a small gap from the photoconductive drum 32 via the endless belt 12. The conductive transfer roller 42 applies on the recording paper which is transported by the endless belt 12 a charge of a polarity opposite to that of the charged toner image, so that the charged toner image on the photoconductive drum 32 is electrostatically transferred onto the recording paper.

After the transfer process, residual toner not transferred onto the recording paper remains adhered on the photoconductive drum 32. The residual toner is removed by a toner cleaner 43 which is provided on the downstream side of the paper moving path with respect to the photoconductive drum 32. The removed residual toner is returned to the developing unit 40 by a screw conveyor 38 and is used again as the developing toner.

Returning now to the description of FIG. 2, the full color image is formed on the recording paper as the recording paper passes the paper moving path of the endless belt 12 between the following roller 22-2 and the driving roller 22-1, by the overlap of the toner images of the four colors, namely, yellow, magenta, cyan and black, by the electrostatic recording units 24-1 through 24-4. The recording paper having the full color image formed thereon is supplied from the side of the driving roller 22-1 towards a heat roller type thermal fixing unit 26 where the full color image on the recording paper is thermally fixed. After the thermal fixing, the recording paper passes through guide rollers and is stacked on a stacker 28 which is provided at an upper part of the main apparatus body 10.

A pair of sensors 30-1 and 30-2 are arranged in a direction perpendicular to the moving direction of the endless belt 12, with respect to the lower moving path of the endless belt 12. In the state shown in FIG. 2, only the sensor 30-1 in front is visible. The sensors 30-1 and 30-2 are used to optically read resist marks which are transferred onto the endless belt 12 in order to detect a positional error in this embodiment.

Figure 4:
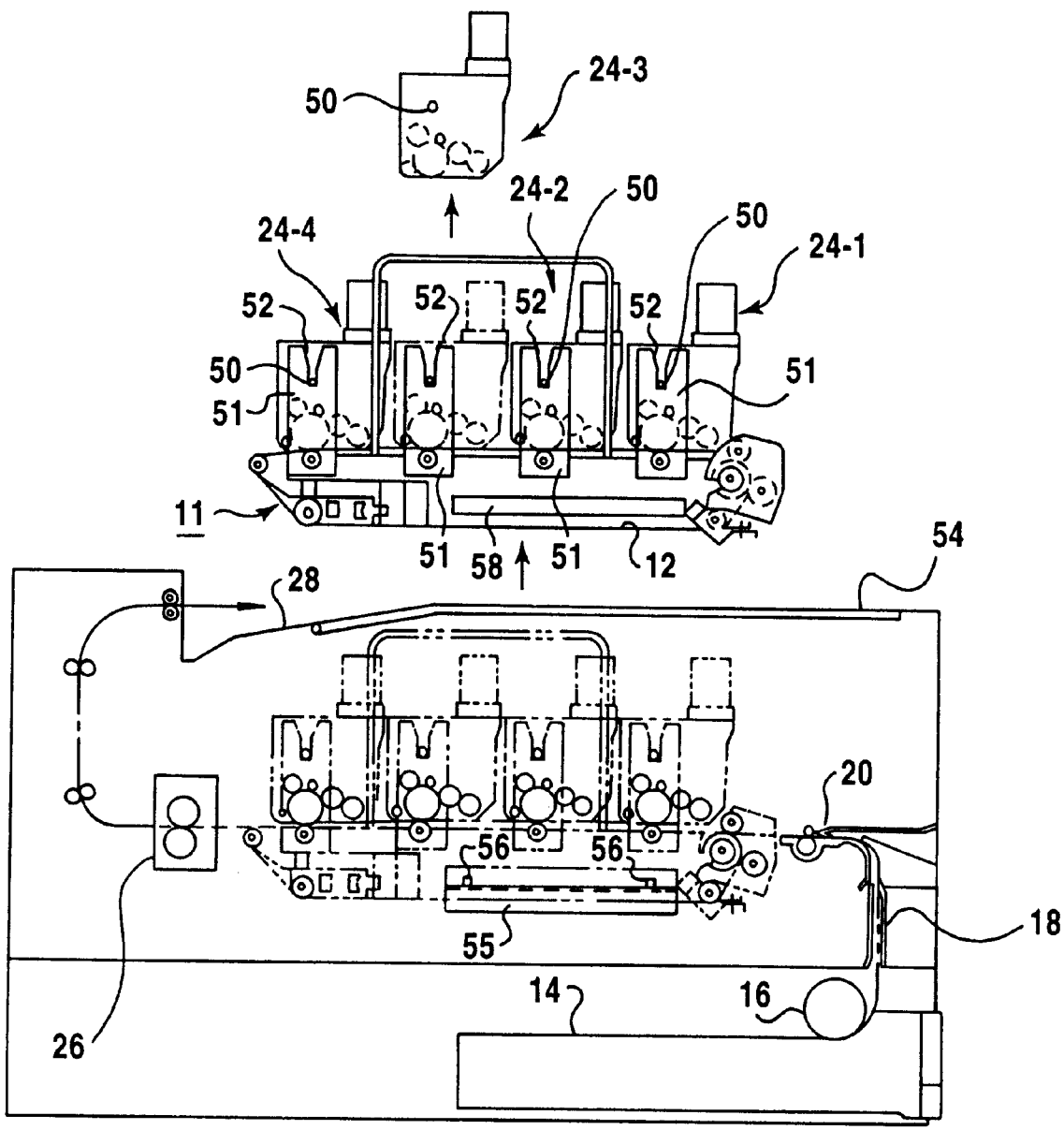
FIG. 4 is a diagram for explaining removal of a transport belt unit and the electrostatic recording units shown in FIG. 2.

FIG. 4 is a diagram for explaining removal of the transport belt unit 11 provided within the main apparatus body 10 shown in FIG. 2, and detachable structures of the electrostatic recording units 24-1 through 24-4 provided with respect to the transport belt unit 11. First, a cover 54 which is free to open and close about a fulcrum located on a left side thereof is provided at an upper part of the main apparatus body 10. A frame 55 is arranged within the main apparatus body 10, and pins 56 are arranged at two locations at an upper part of the frame 55.

On the other hand, a frame 58 provided in correspondence with the frame 55 of the main apparatus body 10 is provided on a side surface of the transport belt unit 11 which is shown in a state removed from the main apparatus body 10 in FIG. 4. Pin holes are provided at positions of the frame 58 corresponding to the pins 56 of the frame 55. For this reason, the transport belt unit 11 can be removed upwards from the pins 56 located on the side of the main apparatus body 10 by opining the cover 54 and pulling the transport belt unit 11 upwards.

The electrostatic recording units 24-1 through 24-4 are mounted with respect to the transport belt unit 11 by inserting pins 50 provided on the side surfaces of the electrostatic recording units 24-1 through 24-4 into corresponding mounting grooves 52 which are open at the top and are provided on corresponding mounting plates 51 arranged on both sides of the transport belt unit 11. Each mounting groove 52 has an upper V-shaped portion which opens to the top, and a lower straight groove portion which connects to the upper V-shaped portion and has a width approximately corresponding to that of the pin 50. Each electrostatic recording unit 24 can be accurately positioned to a predetermined position on the transport belt unit 11 by fitting the pin 50 into the corresponding mounting groove 52 and pushing the electrostatic recording unit 24 downwards along the mounting groove 52. When supplying the toner to or attending to the maintenance of the electrostatic recording units 24-1 through 24-4, it is possible to easily remove the electrostatic recording units 24-1 through 24-4 by pulling them upwards, as may be seen from the removed electrostatic recording unit 24-3 shown in FIG. 4, for example.

Figure 5:
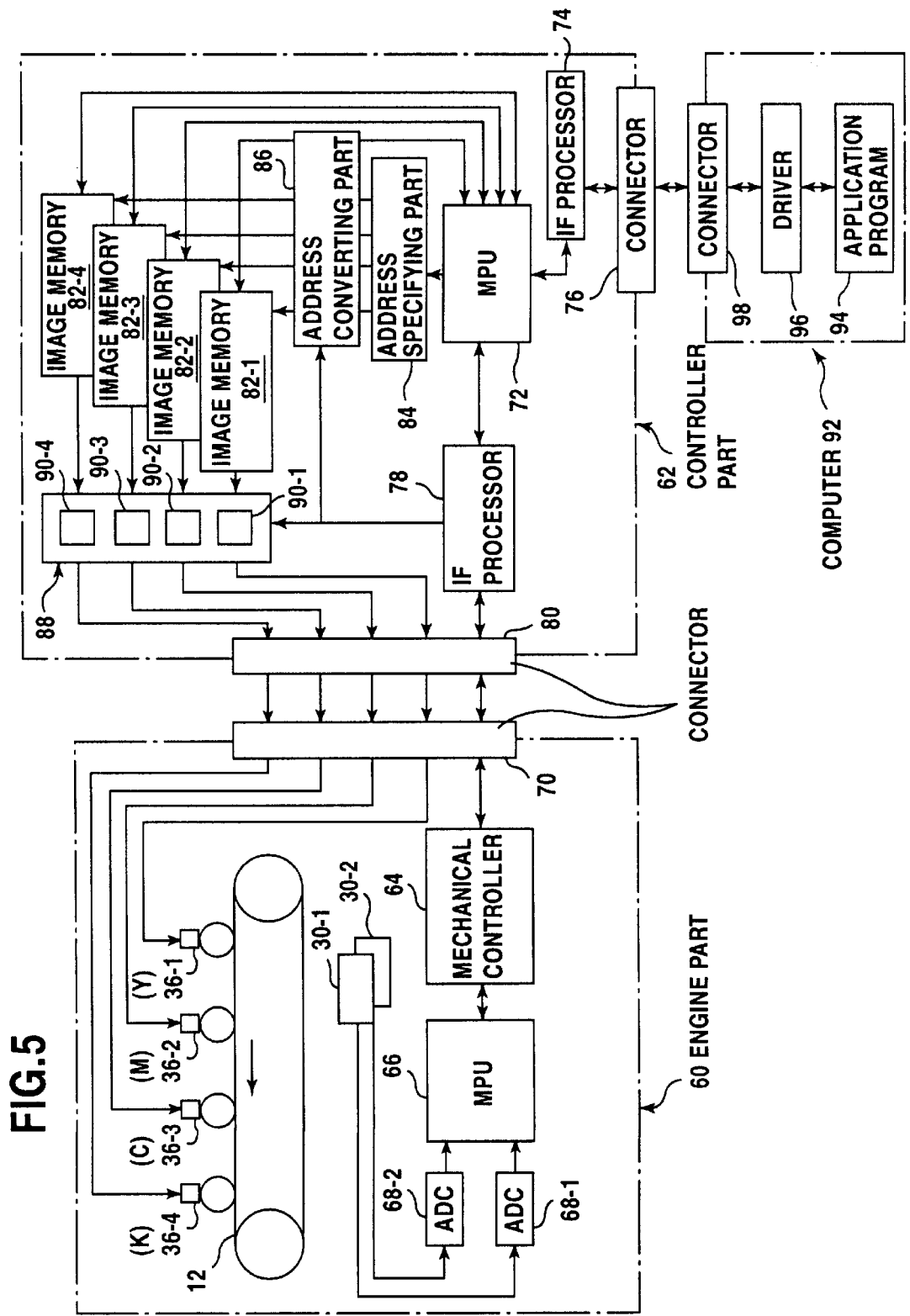
FIG. 5 is a system block diagram showing a hardware structure of the first embodiment of the image forming apparatus.

1-2. Hardware Structure and Function:

FIG. 5 is a system block diagram showing the hardware structure of this embodiment of the image forming apparatus. In this embodiment, the hardware is made up of an engine part 60 and a controller part 62 shown in FIG. 5. A mechanical controller 64 which controls operations of printing mechanism parts such as the transport belt unit 11 and the electrostatic recording units 24-1 through 24-4 is provided in the engine part 60.

A sensor process MPU 66 is provided with respect to the mechanical controller 64 in order to carry out a positional error detection process of this embodiment. With respect to the sensor process MPU 66, detection signals from the pair of sensors 30-1 and 30-2 arranged below the endless belt 12 are input via corresponding analog-to-digital converters (ADCs) 68-1 and 68-2.

The mechanical controller 64 is coupled to the controller part 62 via an engine part connector 70 and a controller side connector 80. In FIG. 5, only the endless belt 12 and LED arrays 36-1, 36-2, 36-3 and 36-4 of the Y, M, C and K electrostatic recording units 24-1, 24-2, 24-3 and 24-4 are shown as the printing mechanisms provided in the engine part 60.

A controller MPU 72 is provided in the controller part 62. A host unit such as a personal computer 92, for example, is coupled to the controller MPU 72 via a controller part connector 76 and an interface processor 74. The personal computer 92 is provided with a driver 96 for subjecting color image data supplied from an arbitrary application program 94 to a printing process. This driver 96 is coupled to the control part connector 76 of the controller part 62 via a personal computer connector 98.

Y, M, C and K image memories 82-1, 82-2, 82-3 and 82-4 for storing yellow, magenta, cyan and black image data transferred from the personal computer 92 by developing the image data into pixel data (dot data) are provided in the controller part 62 with respect to the controller MPU 72. On the other hand, the controller MPU 72 is coupled to the engine part 60 via an interface processor 78, the controller side connector 80 and the engine side connector 70. The positional error information detected in the engine part 60 is received by the interface processor 78, and the positional error correction is carried out with respect to the pixel data of each of the images developed in the Y, M, C and K image memories 82-1 through 82-4.

The controller MPU 72 is provided with an address specifying part 84 for specifying an address when developing the pixel data of each of the colors into the Y, M, C and K image memories 82-1 through 82-4. An address converting part 86 is coupled to the address specifying part 84. The address converting part 86 carries out an address conversion for the positional error correction, based on the positional error information obtained from the engine part 60 via the interface processor 78.

A resolution converting part 88 is provided with respect to the Y, M, C and K image memories 82-1 through 82-4. Buffer memories 90-1, 90-2, 90-3 and 90-4 are provided in the resolution converting part 88 in correspondence with the colors yellow, magenta, cyan and black. The resolution converting part 88 converts the pixel data corrected of the positional error and read from the image memories 82-1 through 82-4 into two high-resolution pixel data by decomposing the pixel data in the sub scan direction (paper transport direction) of the LED arrays 36-1 through 36-4.

For example, if the resolution is 600 dpi in the main scan direction and 600 dpi in the sub scan direction when the image data are developed and stored in the image memories 82-1 through 82-4 as the pixel data, the resolution converting part 88 converts the pixel data into high-resolution pixel data having a resolution of 600 dpi in the main scan direction but a resolution of 1200 dpi in the sub scan direction. By converting the pixel data into the high-resolution pixel data having the resolution which is doubled in the sub scan direction, it becomes possible to increase the printing accuracy when carrying out the positional error correction in a case where the scan line becomes inclined in the engine part 60. Of course, the resolution of the high-resolution pixel data in the sub scan direction may be n times that of the pixel data developed in the image memories 82-1 through 82-4, and n is not limited to 2. If n=3, the resolution of the high-resolution pixel data in the sub scan direction becomes 1800 dpi which is 3 times that of the pixel data developed in the image memories 82-1 through 82-4.

Figure 6:
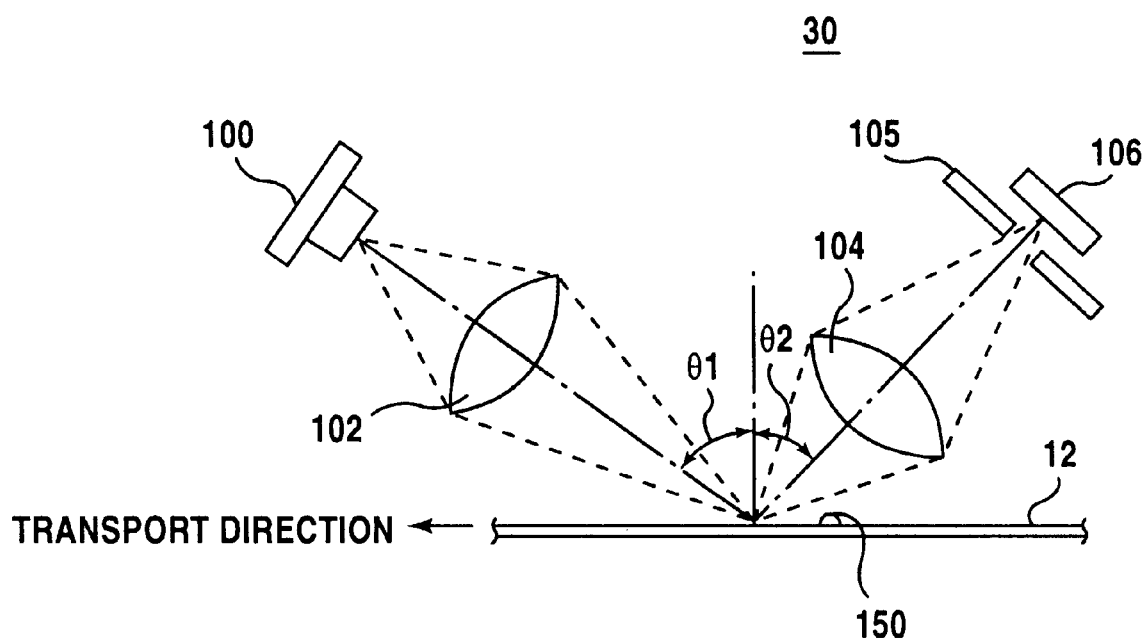
FIG. 6 is a diagram for explaining a sensor which detects a resist mark transferred onto a belt.

FIG. 6 is a diagram for explaining an embodiment of one of the sensors 30-1 and 30-2 provided in the engine part 60 shown in FIG. 5. A sensor 30 shown in FIG. 6 has a light emitting element 100 arranged in a direction of an incident angle θ1 with respect to the endless belt 12, and a light from the light emitting element 100 is imaged as a beam spot on the endless belt 12 via an imaging lens 102. A light receiving element 106 is arranged via a condenser lens 104 and a split 105 in a direction of a reflection angle θ2 with respect to this beam spot.

The incident angle θ1 of the light emitting element 100 and the reflection angle θ2 of the light receiving element 106 are determined within a range of 45° to 75°, so that an optimum amount of reflected light is obtained. The sensor 30 optically detects the resist mark 150 which is transferred onto the endless belt 12 by the electrostatic recording unit 24 for the purpose of detecting the positional error.

In other words, at a position on the surface of the endless belt 12 where no resist mark 150 is formed, the incident light from the light emitting element 100 is sufficiently reflected and is received by the light receiving element 106, so that a signal output from the light receiving element 106 becomes greater than or equal to a prescribed level. On the other hand, when the endless belt 12 moves and the resist mark 150 reaches the detecting position, the incident light from the light emitting element 100 undergoes a diffused reflection at the resist mark 150 because the resist mark 150 is made up of fine toner. As a result, the level of the signal output from the light receiving element 106 decreases when the resist mark 150 reaches the detecting position, and the resist mark 150 can be detected from this decrease in the level of the signal output from the light receiving element 106.

Figure 7:
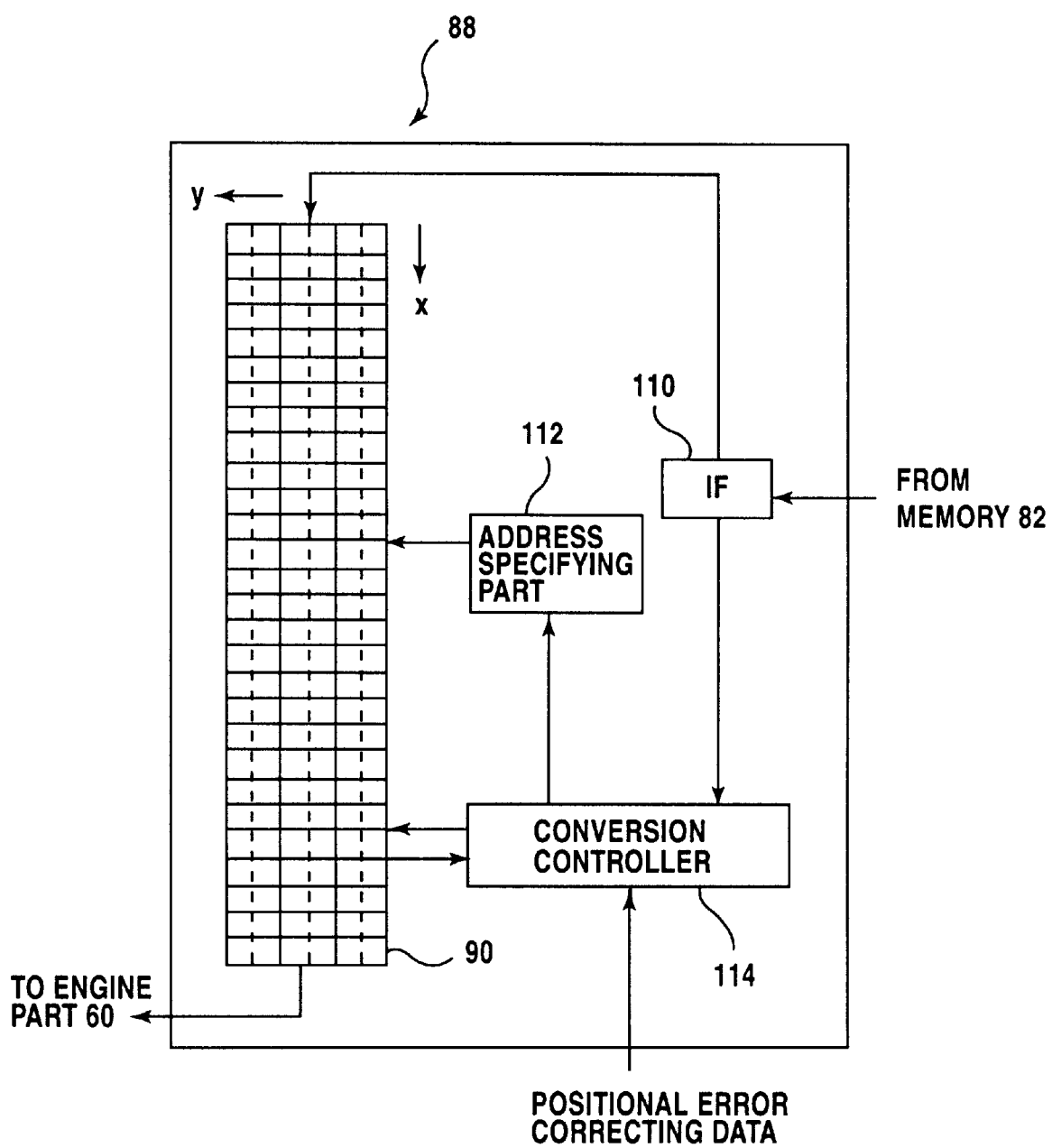
FIG. 7 is a system block diagram showing a resolution converting part shown in FIG. 5.

FIG. 7 is a system block diagram showing the resolution converting part 88 provided in the controller part 60 shown in FIG. 5. As shown in FIG. 7, the resolution converting part 88 has a buffer memory 90, an interface part 110, and address specifying part 112 and a conversion controller 114 with respect to each of the colors yellow, magenta, cyan and black. The pixel data corrected of the positional error and obtained from the corresponding one of the image memories 82-1 through 82-4 shown in FIG. 5 are input to the interface part 110.

Positional error correction data based on the positional error information detected in the engine part 60 are supplied to the conversion controller 114 via the interface processor 78 provided in the controller part 62 shown in FIG. 5. When a direction of the LED arrays 36-1 through 36-4 in the engine part 60 perpendicular to the paper transport direction is denoted by the main scan direction x and the paper transport direction is denoted by the sub scan direction y, the buffer memory 90 is used to convert the pixel data into the high-resolution pixel data in which 1 pixel in the sub scan direction y is decomposed into 2 pixels.

By making this resolution conversion using the buffer memory 90, the pixel data having a resolution of 600 dpi in the main scan direction x and a resolution of 600 dpi in the sub scan direction y, for example, are converted into the high-resolution pixel data having a resolution of 600 dpi in the main scan direction but a resolution of 1200 dpi in the sub scan direction y which is 2 times that of the pixel data before the resolution conversion. Two high-resolution pixel data obtained by decomposing 1 pixel into 2 pixels are read from the buffer memory 90 and the recording is carried out by a time-divisional light emission control of a first scan line and a second scan line.

The conversion to the high-resolution pixel data carried out in the resolution converting part 88 and the recording of the high-resolution pixel data carried out by the engine part 60 will be described later in the specification in more detail.

Figure 8:
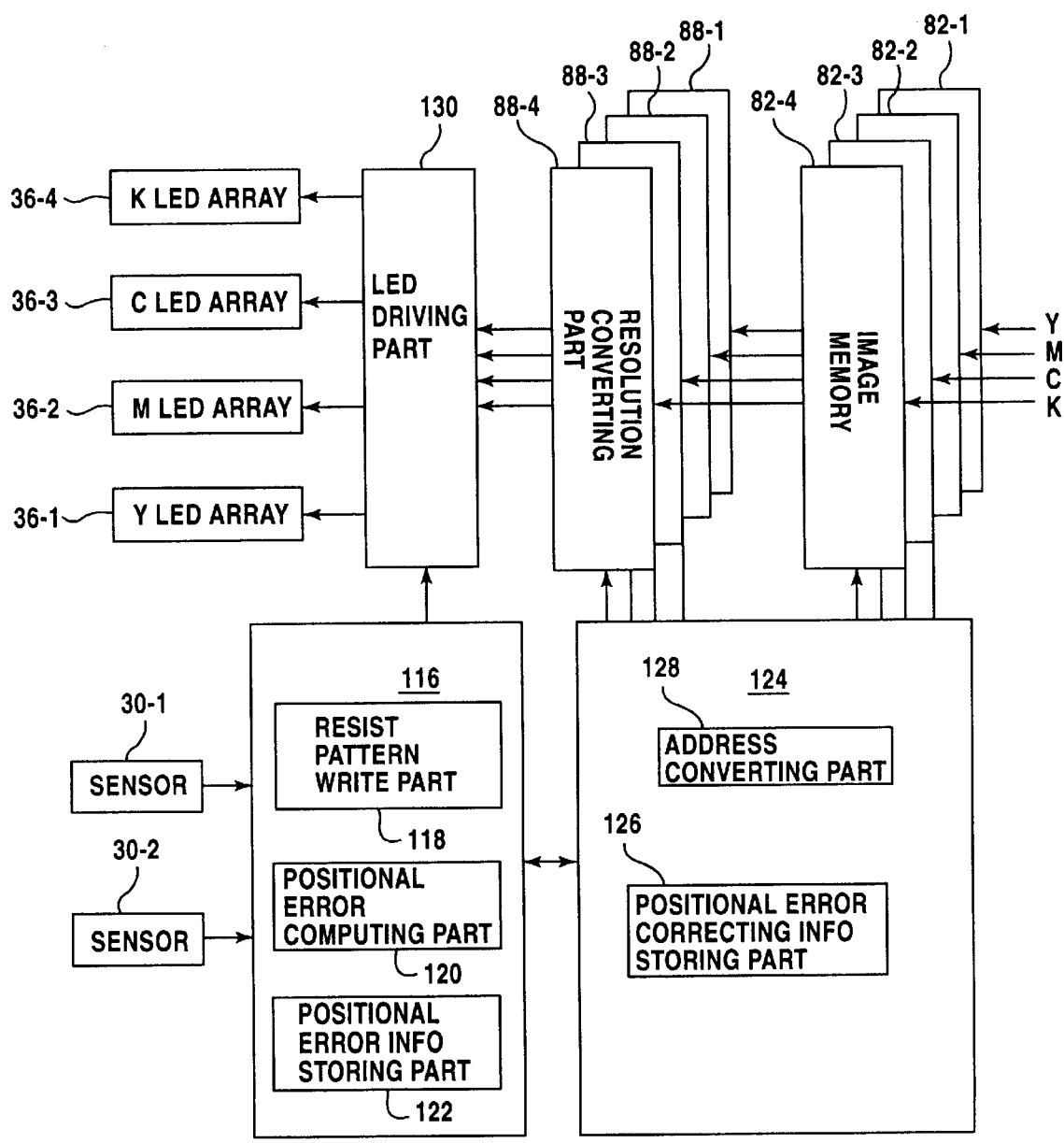
FIG. 8 is a functional block diagram for explaining processing functions of the first embodiment of the image forming apparatus.

FIG. 8 is a functional block diagram for explaining processing functions of the first embodiment of the image forming apparatus realized by the hardware structure shown in FIG. 5. In FIG. 8, this embodiment of the image forming apparatus basically comprises the two functions of the positional error detecting part 116 and the positional error correcting part 124. The function of the positional error detecting part 116 is realized by the sensor process MPU 66 provided within the engine part 60 shown in FIG. 5. The function of the positional error correcting part 124 is realized by the controller MPU 72 provided within the controller part 62 shown in FIG. 5.

The detection signals from the sensors 30-1 and 30-2 provided below the endless belt 12 of the engine part 60 shown in FIG. 5 are supplied to the positional error detecting part 116. The positional error detecting part 116 includes a resist pattern write part 118, a positional error computing part 120, and a position error information storing part 122. The resist pattern write part 118 controls the LED arrays 36-1 through 36-4 via the LED driving part 130 when detecting the positional error, so as to write resist patterns 150 that are used to detect the positional error on the endless belt 12.

The resist pattern 150 that is used to detect the positional error is transferred onto the endless belt 12 at two locations, namely, at the starting end and the terminating end of the scan range of the endless belt 12 in the main scan direction which is perpendicular to the transport direction of the document paper. The two resist patterns 150 transferred onto the endless belt 12 at the two locations are respectively detected by the sensors 30-1 and 30-2. When carrying out the positional error detection in this embodiment, the image printed in black which has the highest contrast among the four colors yellow, magenta, cyan and black is used as the reference image, and the positional errors of the images printed in yellow, magenta and cyan are detected with respect to the reference image printed in black.

More particularly, the resist pattern write part 118 stores print information of the resist mark 150 having a pattern which will be described later in the specification. By using the resist mark print information, one or a plurality of resist marks 150 are transferred onto the endless belt 12 by driving for example the yellow, magenta, cyan and black LED arrays 36-1 through 36-4 in parallel.

The resist mark print information may be stored in the resist pattern write part 118 in the form of a bit map pattern. However, it is desirable to store the resist mark print information in the resist pattern write part 118 in the form of vector information, and to record the resist mark 150 by developing the vector information into bit map data in the LED driving part 130. Based on the detection information related to the resist marks 150 of the four colors yellow, magenta, cyan and black detected by the sensors 30-1 and 30-2, the positional error computing part 118 computes the positional error information of the resist marks 150 of the colors yellow, magenta and cyan with reference to the resist mark 150 of the color black having the highest contrast among the four colors.

The positional error information computed in the positional error computing part 120 includes the error quantity $_\Delta x$ in the main scan direction of the image at the starting end position of the scan line in the main scan direction with reference to the scan line in the main scan direction of the color black, the error quantity $_\Delta y$ in the sub scan direction at the starting end position, the deviation quantity (skew quantity) $_\Delta z$ in the sub scan direction indicating the inclination (slope) at the terminal end position of the scan line, and the magnification Km (=L/L0) of the detected width L of the subject scan line with respect to the reference width L0 of the scan line with the color black in the main scan direction.

The positional error information computed in the positional error computing part 120 is stored in the positional error storing part 122. Since the positional error information stored in the positional error storing part 122 uses the printed position in the color black as the reference, the positional error information for the color black is all "0". Accordingly, the positional error information is not necessary for the color black, and the positional error information is only stored in the positional error storing part 122 for the remaining three colors yellow, magenta and cyan.

The positional error correcting part 124 includes a positional error correcting information storing part 126 and an address converting part 128. The positional error correcting information storing part 126 stores positional error correcting information based on the positional error information of the colors yellow, magenta and cyan detected by the positional error detecting part 116 and stored in the positional error storing part 122.

The address converting part 128 carries out an address conversion for making a positional error correction when developing the pixel data in the image memories 82-1 through 82-4 based on the positional error correcting information stored in the positional error correcting information storing part 126. In the case of the controller part 62 shown in FIG. 5, the function of this address converting part 128 is realized by providing the address converting part 86 exclusively for the address conversion.

The address conversion for making the positional error correction in the address converting part 128 is unnecessary when developing the pixel data in the K image memory 82-4. Hence, the address converting part 128 carries out the address conversion for making the positional error correction when developing the pixel data in the remaining Y, M and C image memories 82-1, 82-2 and 82-3.

In addition, the address conversion carried out in the address converting part 128 for making the positional error correction is not carried out with respect to all of the positional error information detected in the positional error detecting part 116, but only with respect to the positional error information having a value which exceeds a predetermined threshold value. Since the pixel pitch is approximately 42 μm when the resolution is 600 dpi, for example, the address conversion for making the positional error correction is only carried out with respect to the positional error information indicating a positional error of 42 μm or greater.

Furthermore, when reading from the Y, M, C and K image memories 82-1, 82-2, 82-3 and 83-4 the pixel data which is corrected of the positional error and driving the Y, M, C and K LED arrays 36-1, 36-2, 36-3 and 36-4 by the LED driving part 130, the positional error correcting part 124 also controls a resolution conversion process of resolution converting parts 88-1 through 88-4 which are provided at an intermediate position in the data transfer path. This resolution conversion process decomposes 1 pixel in the sub scan direction y into two high-resolution pixel data, and generates a gradation value of each of the high-resolution pixel data.

In the functional block diagram shown in FIG. 8, the resolution converting parts 88-1 through 88-4 are illustrated as being provided independently of the positional error correcting part 124, however, the resolution converting parts 88-1 through 88-4 may of course be included in the positional error correcting part 124. But in the actual structure of the image forming apparatus, it is desirable to provide a circuit module which functions exclusively as the resolution converting parts 88-1 through 88-4.

Figure 9:
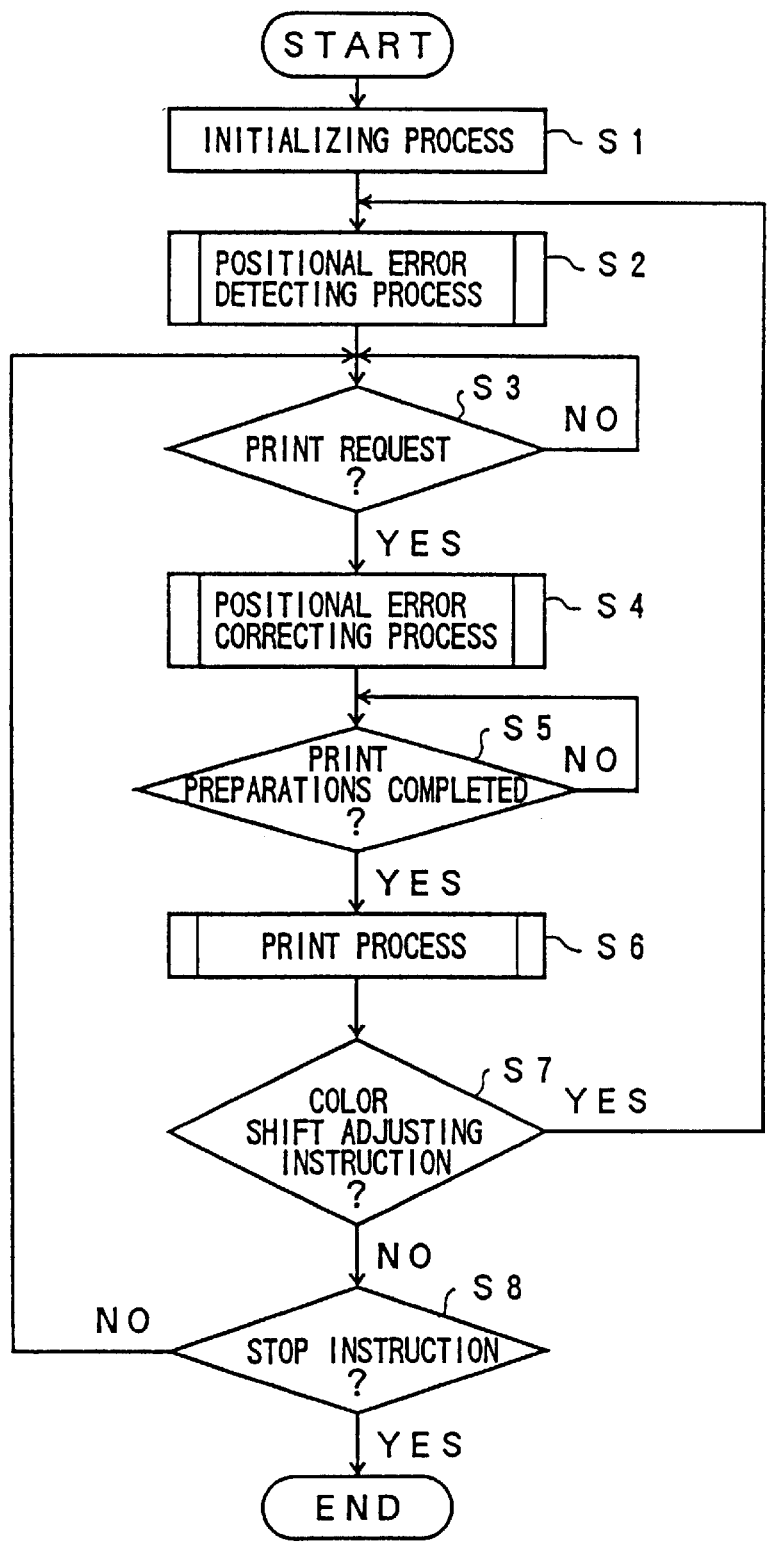
FIG. 9 is a flow chart for explaining a general print process of the first embodiment of the image forming apparatus.

FIG. 9 is a flow chart for explaining a general print process of the first embodiment of the image forming apparatus provided with the functions shown in FIG. 8. First, when the power of the image forming apparatus is turned ON, a step S1 carries out a predetermined initializing process, and a positional error detecting process of a step S2 is included in this initializing process. When the positional error detecting process of the step S2 ends, a step S3 decides whether or not a print request is received from the host unit such as the personal computer 92.

If the decision result in the step S3 becomes YES, the process advances to a step S4. When developing the image data transferred from the personal computer 92 in the image memories 82-1 through 82-4, the step S4 carries out a positional error correcting process. This positional error correcting process of the step S4 includes the positional error correction carried out by the address converting part 128 shown in FIG. 8 and the resolution conversion process carried out by the resolution converting parts 88-1 through 88-4 shown in FIG. 8.

Next, a step S5 waits for print preparations to be completed in the engine part 60 by deciding whether or not the print preparations are completed. If the decision result in the step S5 becomes YES, a step S6 carries out a print process. During this print process, a step S7 decides whether or not an instruction to carry out a color shift adjusting process is received. If the decision result in the step S7 is YES, the process returns to the step S2 so as to again carry out a positional error detecting process similar to that at the time when the power is turned ON. On the other hand, if the decision result in the step S7 is NO, a step S8 decides whether or not a stop instruction is received, and the process ends if the decision result in the step S8 is YES. The process returns to the step S3 if the decision result in the step S8 is NO.

The color shift adjusting instruction may be input manually by the operator or input from the host unit such as the personal computer 92 as a command. Further, due to the mechanical factors of the electrostatic recording units 24-1 through 24-4 provided in the engine part 60, the positional error may change depending on an environmental temperature within the image forming apparatus. For this reason, it is possible to monitor the lapsed time from a time when the power is turned ON, and to automatically carry out the positional error detecting process of the step S2 every time a predetermined time set in a time schedule elapses. In this case, the time schedule may be set in advance so that the positional error detecting process is carried out at short time intervals immediately after the power is turned ON since the temperature change within the image forming apparatus is large immediately after the power is turned ON, and the positional error detecting process is carried out at longer time intervals as time elapsed from the time when the power is turned ON increases.

Figure 10:
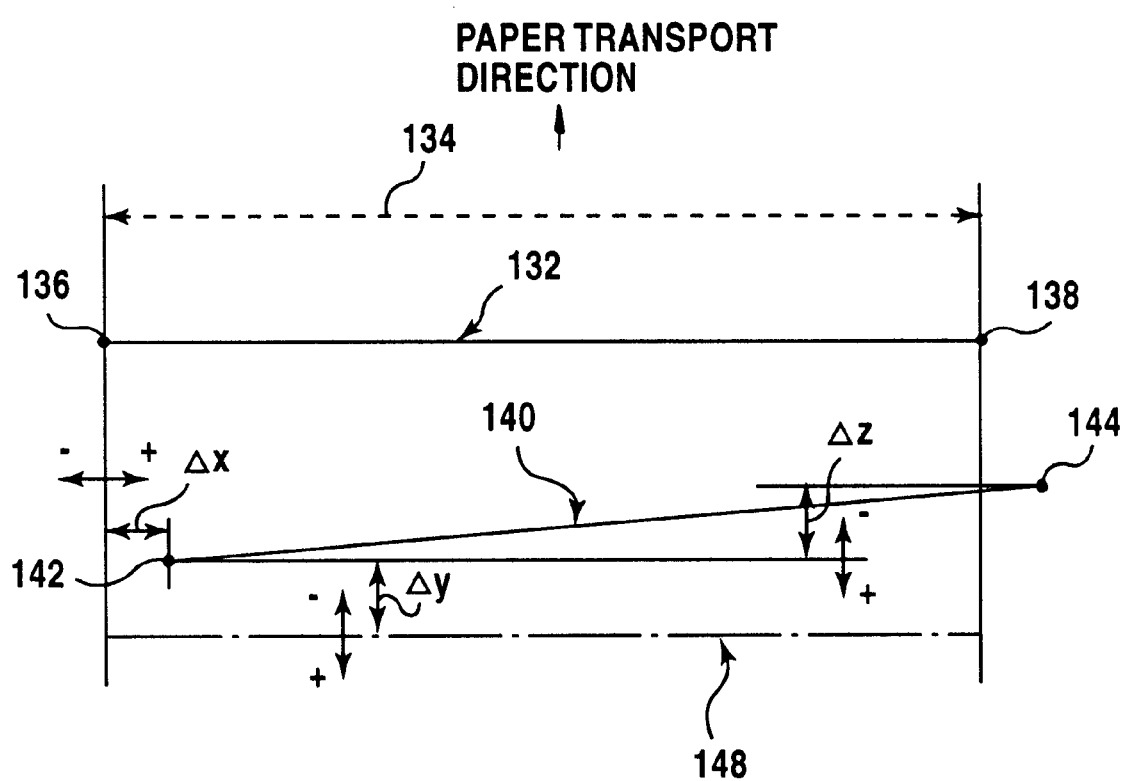
FIG. 10 is a diagram for explaining the operating principle of a positional error detection.

1-3. Positional Error Detection:

FIG. 10 is a diagram for explaining the operating principle of the positional error detection carried out in the positional error detecting part 116 shown in FIG. 8 with respect to the yellow, magenta and cyan images with reference to the black image which has the highest contrast among the four colors used.

In FIG. 10, a black print line having an A4T paper width 134 in a direction perpendicular to the paper transport direction is indicated as a reference print line 132. With respect to this reference print line 132, a subject print line 140 which is printed has a positional error with respect to an ideal print line 148 due to the mechanical positional error and the like of the electrostatic recording unit which prints this subject print line 140 with respect to the K electrostatic recording unit 24-4.

The positional error of the subject print line 140 with respect to the ideal print line 148 may be defined by three elements which are the positional error quantity $_\Delta x$ in the main scan direction of a starting end (point) 142, the positional error quantity $_\Delta y$ in the sub scan direction of the starting end 142, and the deviation quantity (skew quantity) $_\Delta z$ in the sub scan direction indicating the inclination (slope) of the line defined by the error quantity of a terminating end (point) 144.

The ideal print line 148 is parallel to the reference black print line 132 and matches the paper width 134. Accordingly, the positional error quantity $_\Delta x$ in the main scan direction, the positional error quantity $\Delta y$ in the sub scan direction and the deviation quantity $_\Delta z$ with respect to the ideal print line 148 indicate the positional error quantity with respect to the reference black print line 132.

Furthermore, in this embodiment, the magnification Km of the line width of the subject print line 140 with respect to the paper width 134 of the reference black print line 132 is also detected as an element of the positional error quantity.

Figure 11:
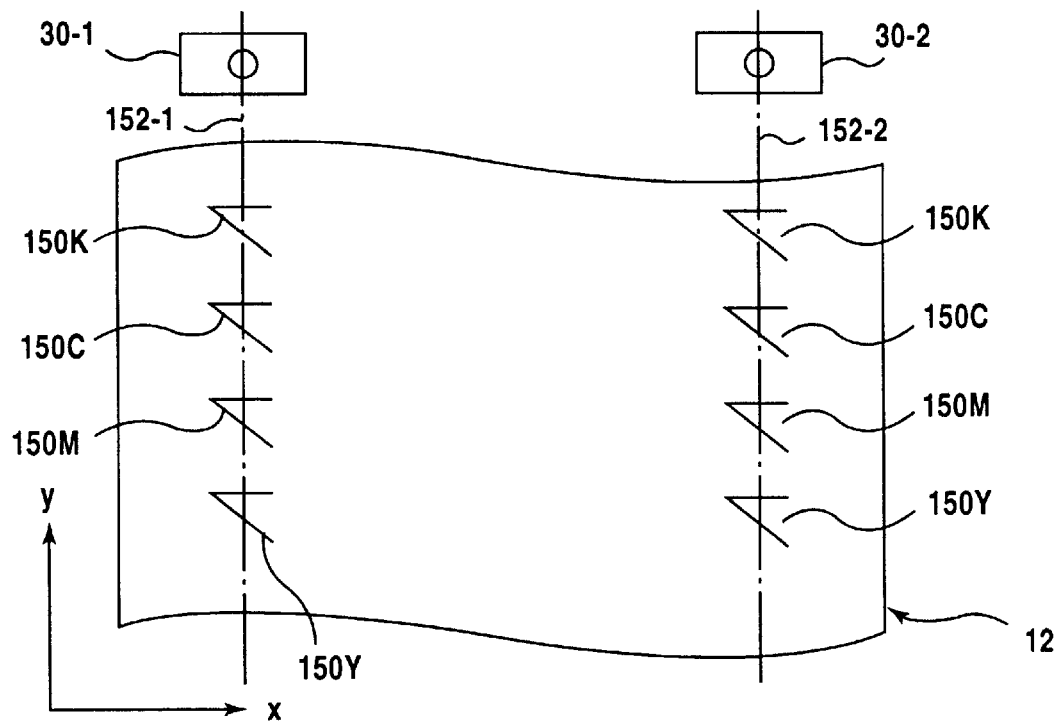
FIG. 11 is a diagram for explaining the resist mark transferred onto the belt for use in making the positional error detection.

The positional error information shown in FIG. 10 is obtained by transferring the resist mark 150 at two locations at the starting end position and the terminating end position of the endless belt 12 along the main scan direction as shown in FIG. 11, and detecting the resist marks 150 by the sensors 30-1 and 30-2.

In FIG. 11, a black resist mark 150K, a cyan resist mark 150C, a magenta resist mark 150M and a yellow resist mark 150Y are successively transferred onto the endless belt 12 at predetermined intervals from the upstream side along the paper transport direction, on both the starting and terminating end positions.

Figure 12:
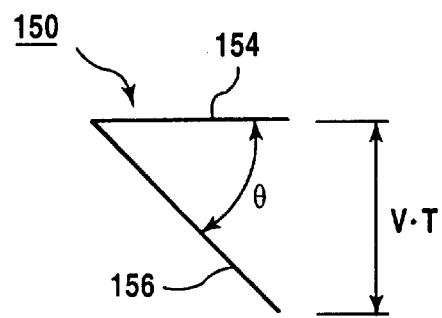
FIG. 12 is a diagram for explaining a shape of the resist mark and a condition for determining the shape.

As shown in FIG. 12, each of the resist marks 150K, 150C, 150M and 150Y, that is, the resist mark 150, is made up of a first straight line 154 in the main scan direction, and a second straight line 156 arranged at a predetermined inclination angle θ to the first straight line 154. In other words, the second straight line 156 is inclined with respect to both the main and sub scan directions. In addition, although one end of the first straight line 154 connects to one end of the second straight line 156 in FIG. 12, the ends of the first and second straight lines 154 and 156 may be slightly separated from each other.

The first and second straight lines 154 and 156 of the resist mark 150 may have any size as long as these first and second straight lines 154 and 156 are readable by the sensor 30 shown in FIG. 6. For example, in FIG. 12, the intersecting angle θ of the first and second straight lines 154 and 156 is set to satisfy the following relationship, where v denotes a transport speed (mm/sec) of the endless belt 12, S denotes a detection accuracy (μm) of the sensor 30, and T denotes a sampling period (sec) of the detection signal of the sensor 30.

$$\tan\theta \leq (v \cdot T/S)$$

Figure 13:
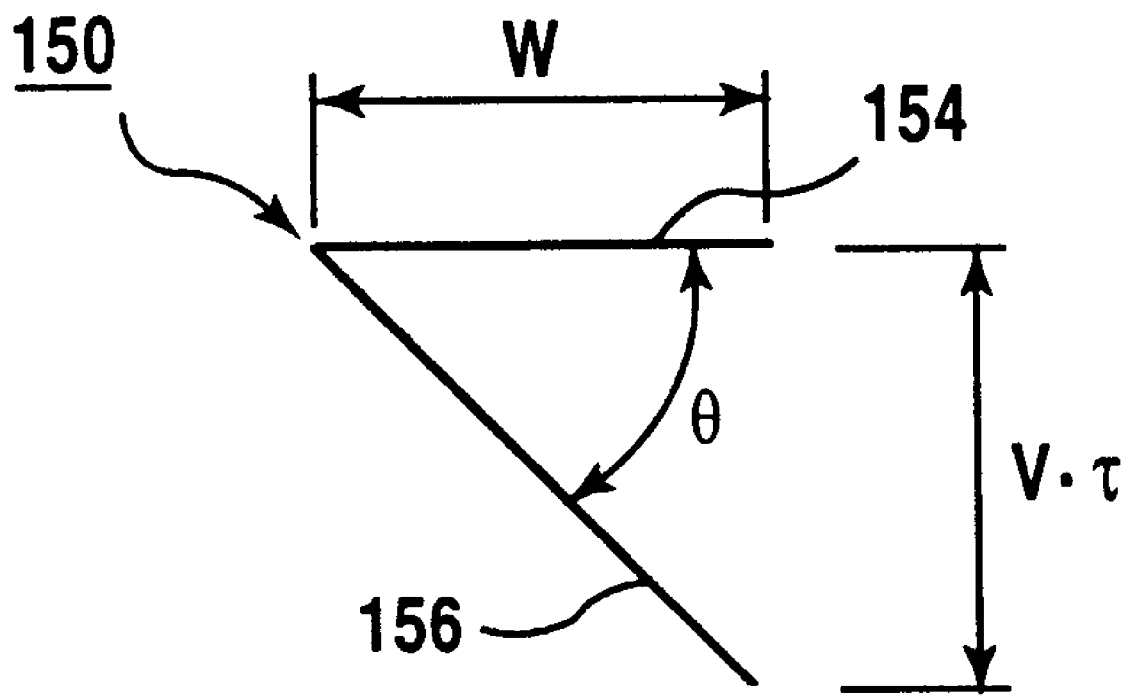
FIG. 13 is a diagram for explaining the shape of the resist mark and the condition for determining the shape.

FIG. 13 is a diagram for explaining another method of determining the first and second straight lines 154 and 156 of the resist mark 150 which is used to detect the positional error in this embodiment. In this case, the intersecting angle θ of the first and second straight lines 154 and 156 is set to satisfy the following relationship, where v denotes a transport speed (mm/sec) of the endless belt 12, W denotes a tolerable error width (mm) of the first straight line 156 in the main scan direction, and t denotes a tolerable time (sec) of the printing of one resist mark 150 in the sub scan direction.

$$\tan\theta \leq (v \cdot t/W)$$

Figure 14A:
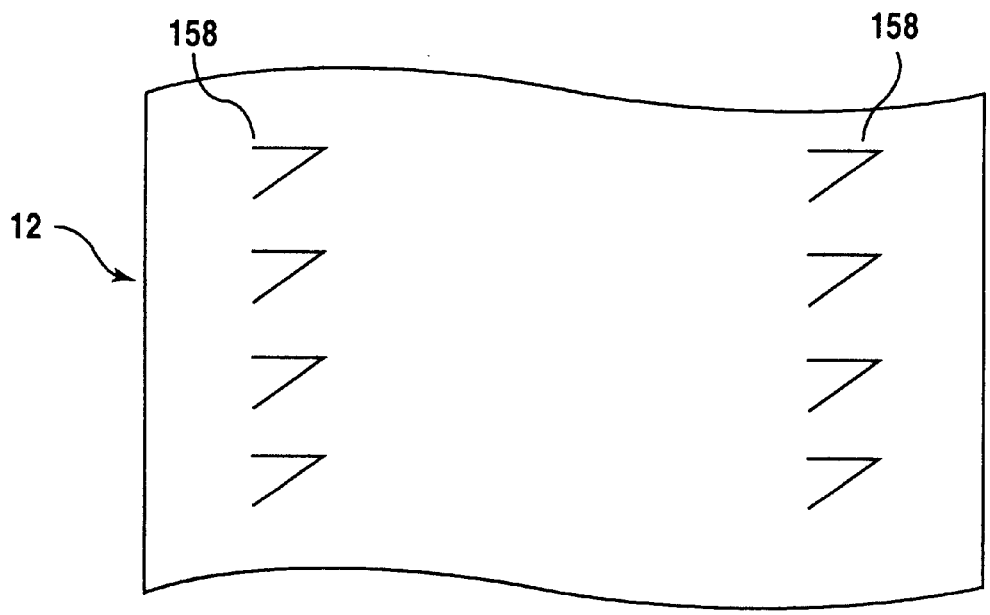
FIGS. 14A and 14B respectively are diagrams for explaining other shapes of the resist mark.
Figure 14B:
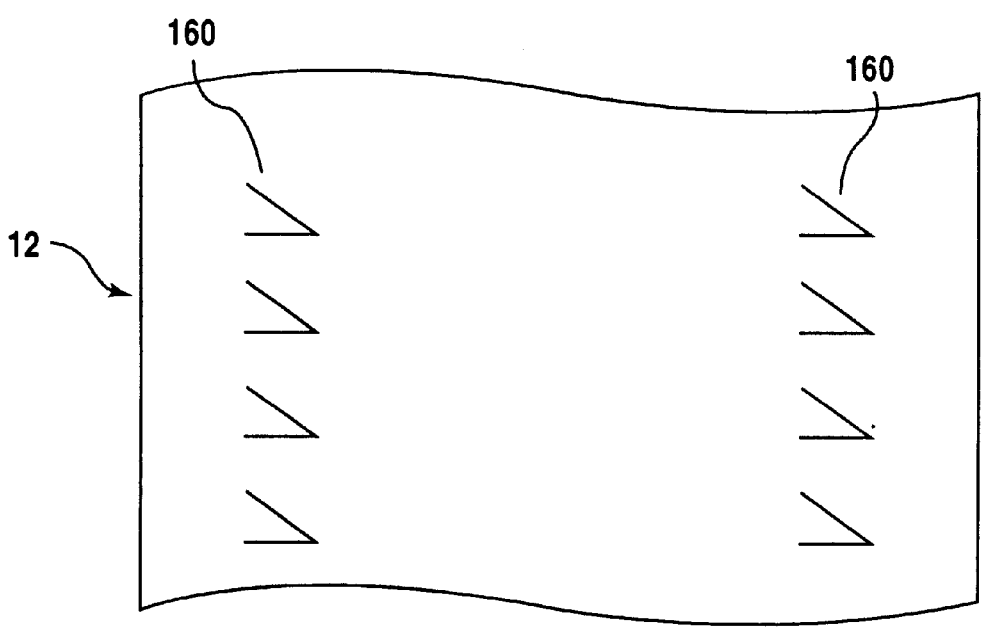

Instead of using the resist mark 150 which is open towards the right bottom as shown in FIG. 11, it is possible to use a resist mark 158 shown in FIG. 14A which is open towards the left bottom or, to use a resist mark 160 shown in FIG. 14B which is open towards the right top, for the purpose of detecting the positional error.

Figure 15:
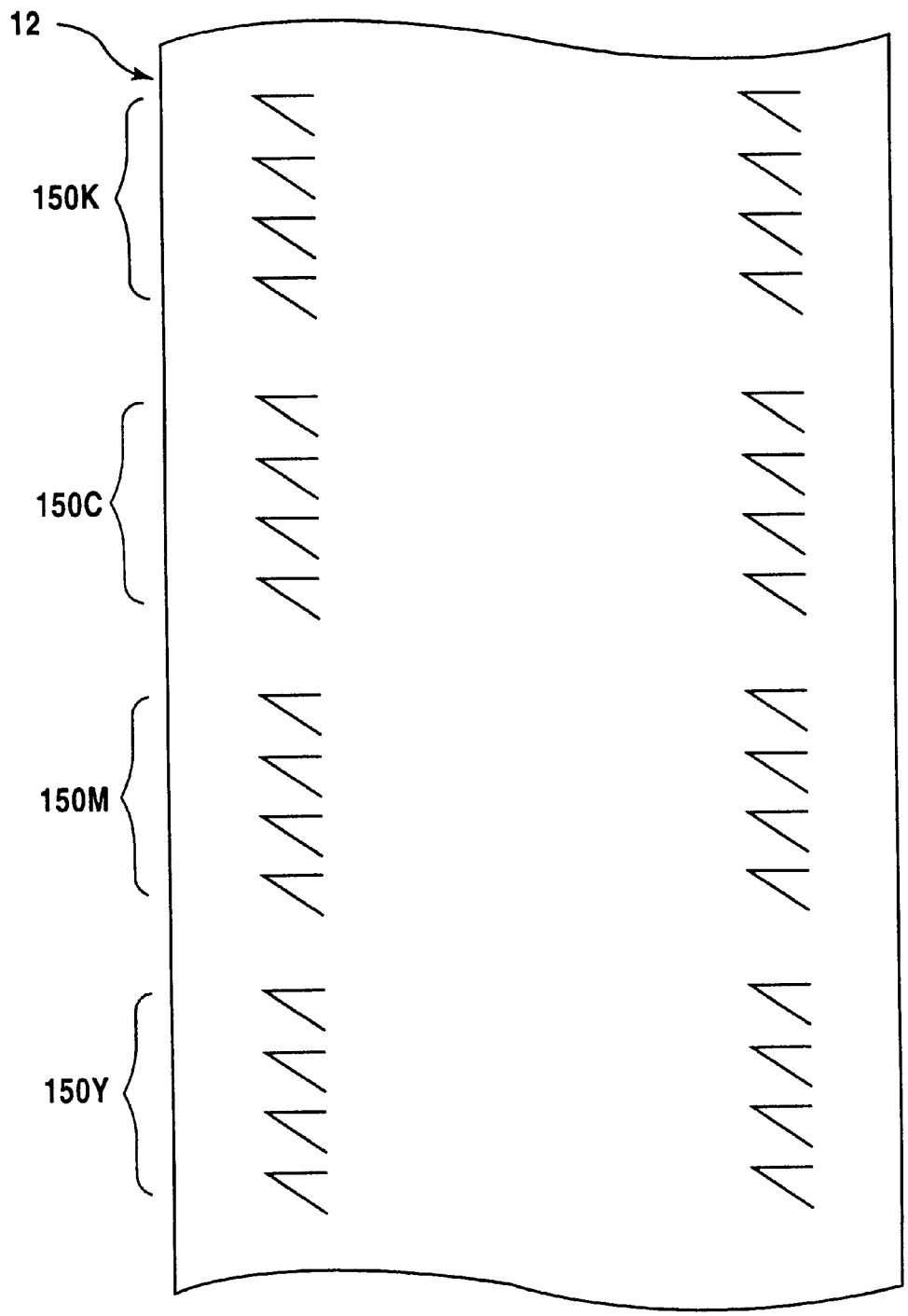
FIG. 15 is a diagram for explaining Y, M, C and K resist marks transferred onto the belt.

When actually detecting the positional error, a plurality of black resist marks 150K, a plurality of cyan resist marks 150C, a plurality of magenta resist marks 150M and a plurality of yellow resist marks 150Y are respectively transferred consecutively onto the endless belt 12 as shown in FIG. 15. The positional errors of the cyan, magenta and yellow resist marks 150C, 150M and 150Y with respect to each of the black resist marks 150K are computed, and the computed positional errors are averaged for each of the colors cyan, magenta and yellow. By using the averaged positional errors, it is possible to suppress detection errors caused by inconsistencies, noise and the like which are introduced when transferring the resist marks 150K, 150C, 150M and 150Y onto the endless belt 12.

Figure 16A:
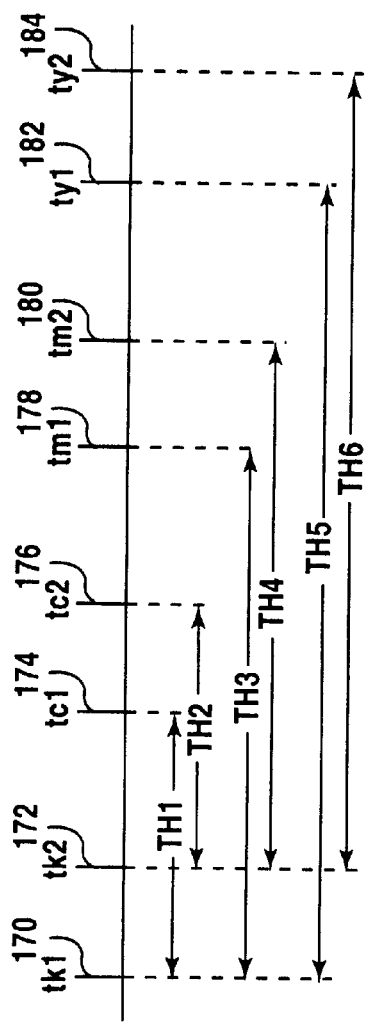
FIGS. 16(A) through 16(C) respectively are timing charts showing resist mark detection pulses obtained from sensors.
Figure 16B:
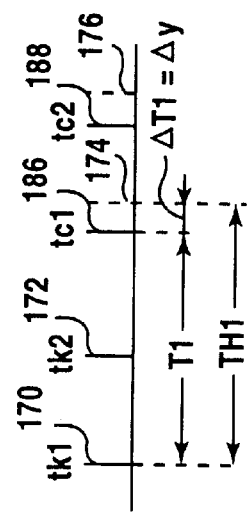
Figure 16C:
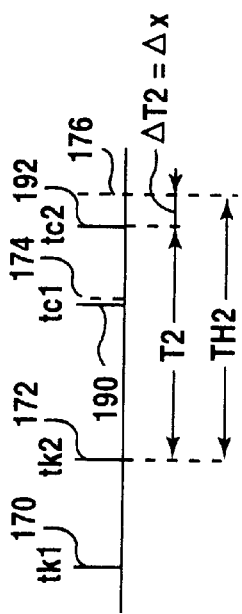

FIGS. 16(A) through 16(C) are time charts for explaining the positional error detection based on detection pulses which are obtained from the lower sensor 30-1, for example, when the resist marks 150K, 150C, 150M and 150Y shown in FIG. 11 are read by this sensor 30-1.

FIG. 16(A) shows the detection pulses which are obtained from the sensor 30-1 shown in FIG. 11 when the resist marks 150K, 150C, 150M and 150Y are successively read by the sensor 30-1 in a case where no positional error exists. In FIG. 16(A), detection pulses 170, 172, . . . , 184 are obtained at times tk1, tk2, . . . , ty2 when a detecting scan line 152-1 of the sensor 30-1 intersects the resist marks 150K, 150C, 150M and 150Y at mark detection points in FIG. 11. In FIG. 11, a detecting scan line of the sensor 30-2 is denoted by a reference numeral 152-2.

In this case, since the cyan, magenta and yellow resist marks 150C, 150M and 150Y have no positional error with respect to the black resist mark 150K, the times from the detection pulses 170 and 172 of the reference black resist mark 150K to the detection pulses 174, 176, . . . , 184 of the other resist marks 150C, 150M and 150Y are respectively equal to prescribed reference times TH1, TH2, . . . , TH6.

For example, a time from the detection time tk1 of the detection pulse 170 of the first straight line in the main scan direction of the first black resist mark 150K to the detection time tc1 of the detection pulse 174 of the first straight line in the main scan direction of the first cyan resist mark 150C is equal to the reference time TH1 which is determined by a difference (tc1−tk1) between the detection times tc1 and tk1. Similarly, a time from the detection time tk2 of the detection pulse 172 of the second straight line in the oblique direction of the first black resist mark 150K to the detection time tc2 of the detection pulse 176 of the second straight line in the oblique direction of the first cyan resist mark 150C is equal to the reference time TH2 which is determined by a difference (tc2−tk2) between the detection times tc2 and tk2, because no positional error exists.

Figure 17:
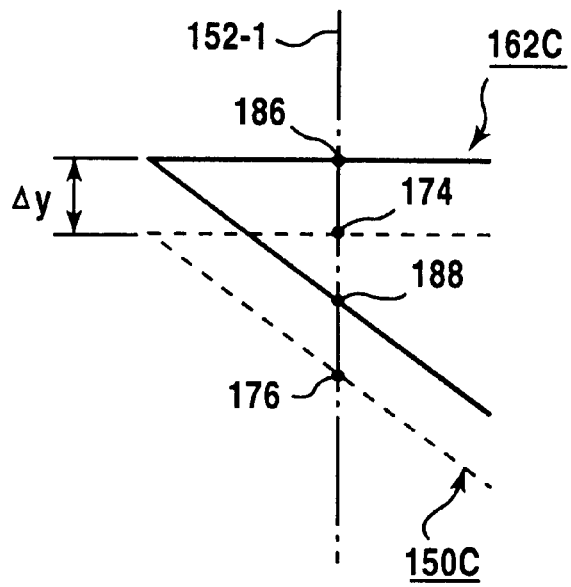
FIG. 17 is a diagram for explaining a resist mark having a positional error in a sub scan direction.

FIG. 16(B) shows the detection pulses in a case where the cyan resist mark 150C shown in FIG. 11 is shifted in the sub scan direction as shown in FIG. 17. In FIG. 17, a transferred resist mark 162C is shifted in the sub scan direction with respect to a correct position of the cyan resist mark 150C indicated by a broken line.

For this reason, the detection pulses 174 and 176 corresponding to the detection points of the cyan resist mark 150C on the detecting scan line 152-1 shift to positions of detection pulses 186 and 188 corresponding to the shifted detection points. As a result, the detection pulses 186 and 188 indicated by solid lines in FIG. 16(B) are obtained earlier than the detection pulses 174 and 176 which are indicated by broken lines and are obtained when no positional error exists.

Accordingly, a time difference $_\Delta T1$ can be obtained by obtaining a difference (Tc1−Tk1) of an elapsed time T1 of the cyan detection pulse 186 of the first straight line with respect to the reference black detection pulse 170 of the first straight line, and subtracting this elapsed time T1 from the reference time TH1. If the transport speed of the endless belt 12 is denoted by v (mm/sec), it is possible to obtain the error quantity $_\Delta y$ in the sub scan direction by multiplying the belt transport speed v (moving speed of the recording paper) to the time difference $_\Delta T1$.

Figure 18:
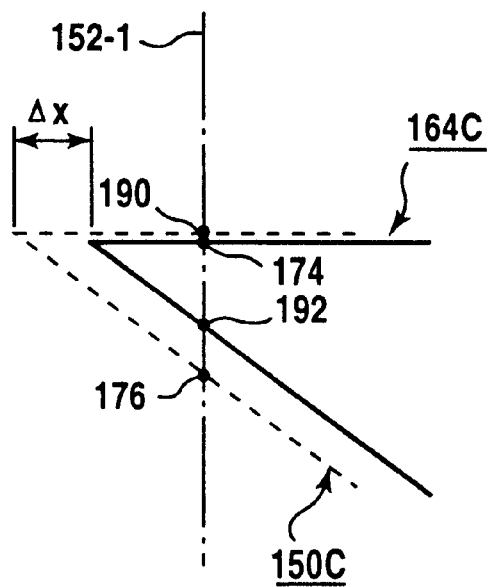
FIG. 18 is a diagram for explaining a resist mark having a positional error in a main scan direction.

FIG. 16(C) shows a case where a resist mark 164C shifts to the right in the main scan direction with respect to the resist mark 150C which has no positional error as indicated by a broken line in FIG. 18. When the resist mark 164C shifts to the right in the main scan direction, the timings of the detection pulses 174 and 190 at the intersection points of the detecting scan line 152-1 and the first straight line of the resist mark 164C do no change, but the timing of a detection pulse 192 at the intersection point of the detecting scan line 152-1 and the second straight line of the resist mark 164C becomes earlier than that of the detection pulse 176 as shown in FIG. 18.

Hence, as shown in FIG. 16(C), a time difference $_\Delta T2$ can be obtained by obtaining a difference (Tc2−Tk2) of an elapsed time T2 of the cyan detection pulse 192 of the second straight line with respect to the reference black detection pulse 172 of the second straight line, and subtracting this elapsed time T2 from the reference time TH2. If the transport speed of the endless belt 12 is denoted by v (mm/sec), it is possible to obtain the error quantity $_\Delta x$ in the main scan direction by multiplying the belt transport speed v (moving speed of the recording paper) to the time difference $_\Delta T2$.

In addition, if the positional error of the cyan resist mark 150C occurs in both the main and sub scan directions, the first straight line of the cyan resist mark 150C is only affected by the shift in the sub scan direction. On the other hand, the second straight line of the cyan resist mark 150C is affected by both the shift in the main scan direction and the shift in the sub scan direction. For this reason, in order to detect the positional error in the main scan direction shown in FIG. 18, the first straight line is first used to obtain the difference (Tc1−Tk1) of the elapsed time T1 of the cyan detection pulse 186 with respect to the reference black detection pulse 170 as described above in conjunction with FIG. 17, and this elapsed time T1 is subtracted from the reference time TH1 to obtain the time difference $_\Delta T1$. Then, the error quantity of the first straight line of the cyan resist mark 150C in the sub scan direction with respect to the first straight line of the black resist mark 150K is obtained by multiplying the belt transport speed v to the time difference $_\Delta T1$ Further, in order to obtain the positional error of the second straight line shown in FIG. 18, the time difference $_\Delta T2$ is obtained by obtaining the difference (Tc2−Tk2) of the elapsed time T2 of the cyan detection pulse 192 of the second straight line with respect to the reference black detection pulse 172 of the second straight line, and subtracting this elapsed time T2 from the reference time TH2. It is possible to obtain the error quantity in the main scan direction of the second straight line of the cyan resist mark 150C with respect to the second straight line of the black resist mark 150K by multiplying the belt transport speed v to the time difference $_\Delta T2$.

The error quantity in the sub scan direction of the second straight line of the cyan resist mark 150C with respect to the second straight line of the black resist mark 150K can be obtained by subtracting the above error quantity of the first straight line from the above error quantity of the second straight line.

The error quantities of the cyan, magenta and yellow resist marks 150C, 150M and 150Y in the main and sub scan directions with reference to the black resist mark 150K are thus detected based on the detection of the cyan, magenta and yellow resist marks 150C, 150M and 150Y, with respect to the cyan, magenta and yellow resist marks 150C, 150M and 150Y located at the starting and terminal end positions of the endless belt 12 in the main scan direction. Consequently, it is possible to obtain error quantities ($_\Delta x1$, $_\Delta y1$) of the print line 150 at the starting end 142 shown in FIG. 10 in the main and sub scan directions, and error quantities ($_\Delta x2$, $_\Delta y2$) of the print line 150 at the terminating end 144 in the main and sub scan directions.

For example, the error quantities ($_\Delta x1$, $_\Delta y1$) at the starting end 142 are regarded as the error quantity $_\Delta x$ in the main scan direction and the error quantity $_\Delta y$ in the sub scan direction, and the error quantity $_\Delta x2$ in the main direction at the terminating end 144 is regarded as the deviation quantity (skew quantity) $_\Delta z$ which indicates the inclination (slope) of the subject print line 140.

Moreover, in this embodiment, the magnification Km of the line width of the subject print line 140 and the reference black print line 132 shown in FIG. 10 is detected as one of the positional error information.

Figure 19:
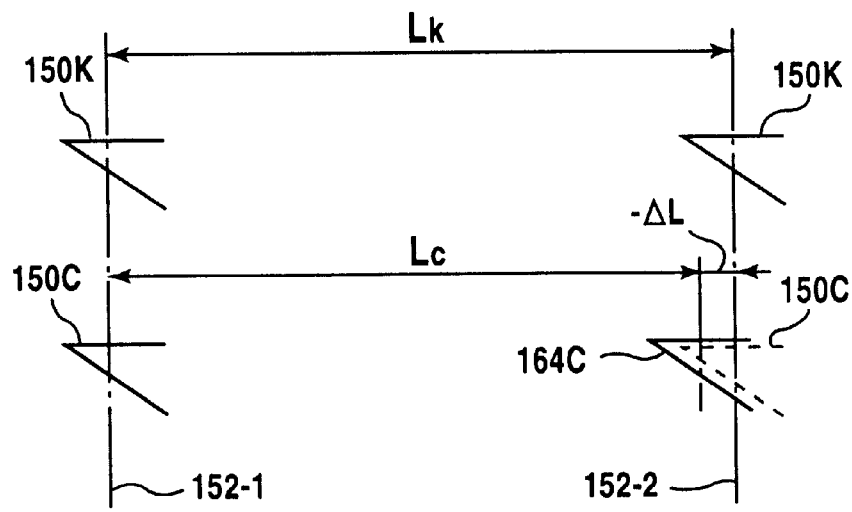
FIG. 19 is a diagram for explaining a resist mark having a reduced line width in the main scan direction.

FIG. 19 is a diagram for explaining a case where a line width Lc which is determined by the cyan resist mark 150C, for example, is short compared to a reference line width Lk which is determined by the black resist mark 150K. For example, with respect to the correct line width of the cyan resist mark 150C, an actual cyan resist mark 160C may shift to the left as shown in FIG. 19. In this case, the cyan line width Lc is $_\Delta L$ shorter than the reference black line width Lk.

When carrying out the actual printing, the number of pixels recorded in the main scan direction is the same for the reference black line width Lk and the cyan line width Lc. Hence, it may be seen that the cyan pixel pitch of the main scan line in this case is compressed with respect to the black pixel pitch of the main scan line.

Figure 20:
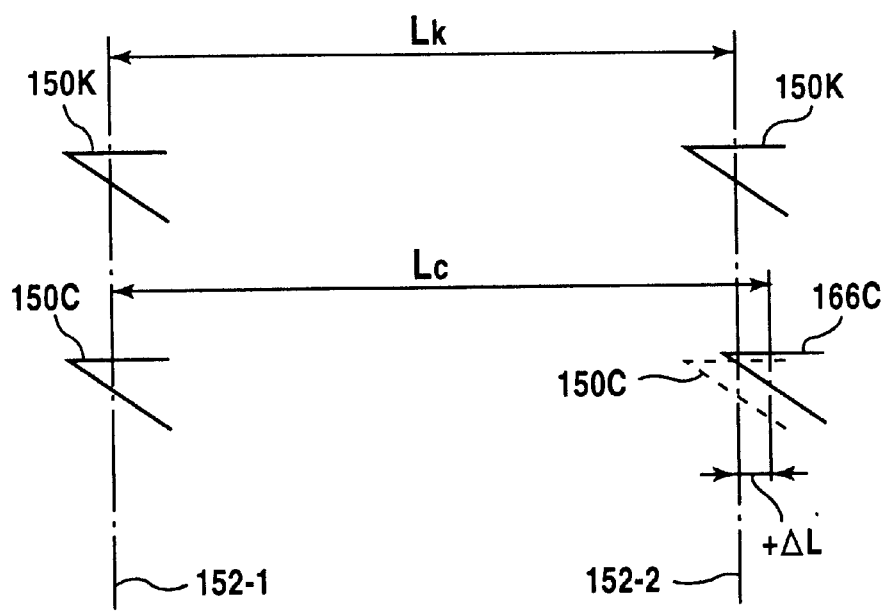
FIG. 20 is a diagram for explaining a resist mark having a line width enlarged in the main scan direction.

On the other hand, FIG. 20 is a diagram for explaining a case where the line width Lc which is determined by the cyan resist mark 150C, for example, is long compared to the reference black line width Lk which is determined by the black resist mark 150K. For example, with respect to the correct line width of the cyan resist mark 150C, an actual cyan resist mark 166C may shift to the right as shown in FIG. 20. In this case, the cyan line width Lc is $_\Delta L$ longer than the reference black line width Lk. Thus, it may be seen that the cyan pixel pitch of the main scan line in this case is expanded with respect to the black pixel pitch of the main scan line.

Therefore, the positional error is obtained by transferring the resist marks 150 onto the endless belt 12 and detecting the resist marks 150 as described above. In addition, the positional error detection information is stored in the positional error information storing part 122 provided within the positional error detecting part 116 shown in FIG. 8. More particularly, the positional error quantity $_\Delta x$ in the main scan direction, the positional error quantity $_\Delta y$ in the sub scan direction, the deviation quantity (skew quantity) $_\Delta z$ in the sub scan direction, and the line width magnification Km in the main scan direction are stored as the positional error detection information for each of the colors cyan, magenta and yellow, into corresponding cyan, magenta and yellow tables 122C, 122M and 122Y within the positional error information storing part 122 shown in FIG. 21.

When the positional error detection information described above is obtained, the positional error correcting information is created in the positional error correcting part 124 shown in FIG. 8. Basically, the positional error is corrected by writing of the image data into the image memories 82-1 through 82-4 while making the address conversion in the address converting part 128 for carrying out the positional error correction, and it is possible to obtain a print result having positions of the cyan, magenta and yellow images matched to the position of the black image which is used as the reference.

FIGS. 22A through 22D are diagrams for explaining the operating principle of a pixel data correcting process based on a positional error detection information obtained in this embodiment.

Figure 22A:
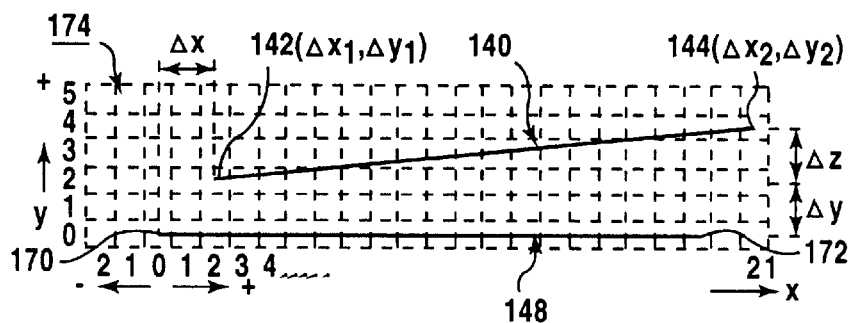
FIGS. 22A through 22D respectively are diagrams for explaining the operating principle of a correcting process based on the positional error detection information obtained in the first embodiment.

The positional error detection information related to the subject print line 140 shown in FIG. 10 based on the resist mark 150 is converted into a positional error in a bit map memory space 174 shown in FIG. 22A which is partitioned at a pitch of 1 pixel in the main scan direction x and the sub scan direction y. In the bit map memory space 174 shown in FIG. 22A, the subject print line 140 is set with respect to the ideal print line 148 which is determined in advance by the actual transfer of the subject print line 140.

In other words, the subject print line 140 can be set in the bit map memory space 174 by use of the positional error quantity $_\Delta x$ in the main direction, the positional error quantity $_\Delta y$ in the sub scan direction, and the deviation quantity (skew quantity) $_\Delta z$ in the sub scan direction. When this subject print line 140 is converted into pixel data, positional error data 176-1 through 176-3 shown in FIG. 22B are generated.

Figure 22B:
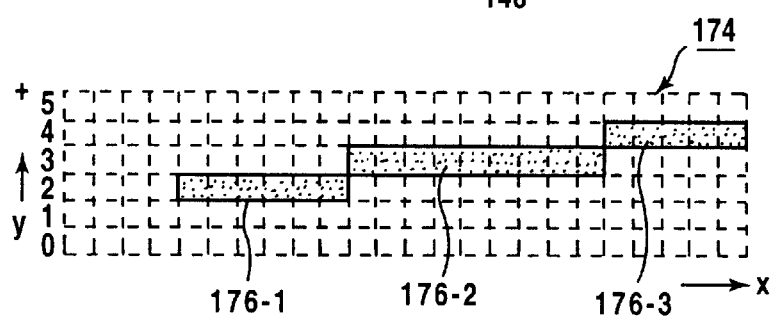
Figure 22C:
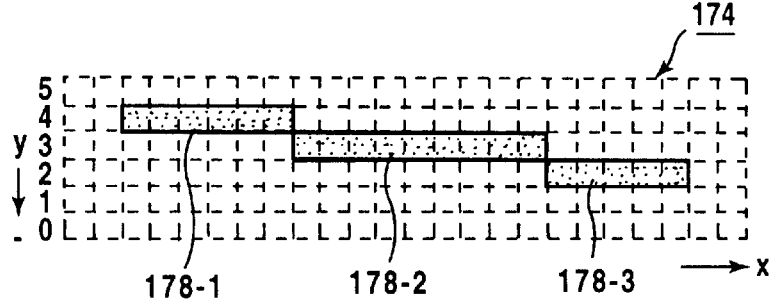

The positional error data shown in FIG. 22B are converted into correcting data shown in FIG. 22C. More particularly, the positional error data shown in FIG. 22B, that is, the subject print line 140 shown in FIG. 22A, is reversed towards the negative side in a line symmetrical manner with respect to the ideal print line 148, and shifted by the positional error quantity $_\Delta x$ in the main scan direction towards the negative side (left side) along the main scan direction, so as to obtain a curve. This curve is converted into correcting data 178-1 through 178-3 in the bit map memory space 174.

Figure 22D:
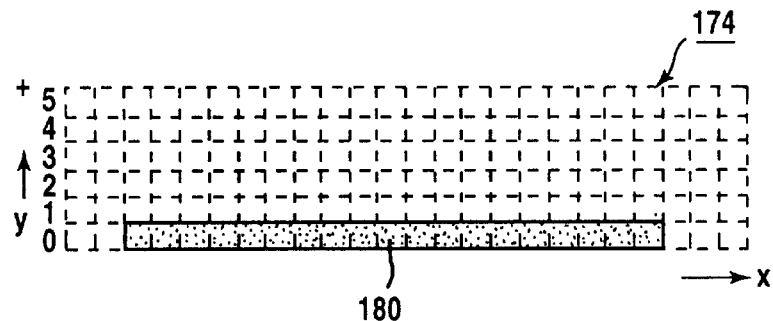

When the correcting data shown in FIG. 22C are read to thereby control the light emission of the LED arrays 36-1 through 36-4, the positional error shown in FIG. 22B is corrected and a print result 180 corresponding to the ideal print line 148 shown in FIG. 22A is obtained as shown in FIG. 22D.

In order to simplify the description related to the relationship of the subject print line, the positional error data, the correcting data and the print result shown in FIGS. 22A through 22D, it is assumed for the sake of convenience that the resolution of the image memories 82-1 through 82-4 and the resolution of the LED arrays 36-1 through 36-4 are the same. In the positional error correction of this embodiment, the resolution in the bit map memory space 174 shown in FIGS. 22A through 22D is improved by decomposing 1 pixel into 2 pixels in the sub scan direction y. By improving the resolution in the sub scan direction y, it is possible to smoothen the irregularities of the pixels of the print result 180 shown in FIG. 20D in the sub scan direction when the printing is carried out using the correcting data shown in FIG. 22C.

Figure 23:
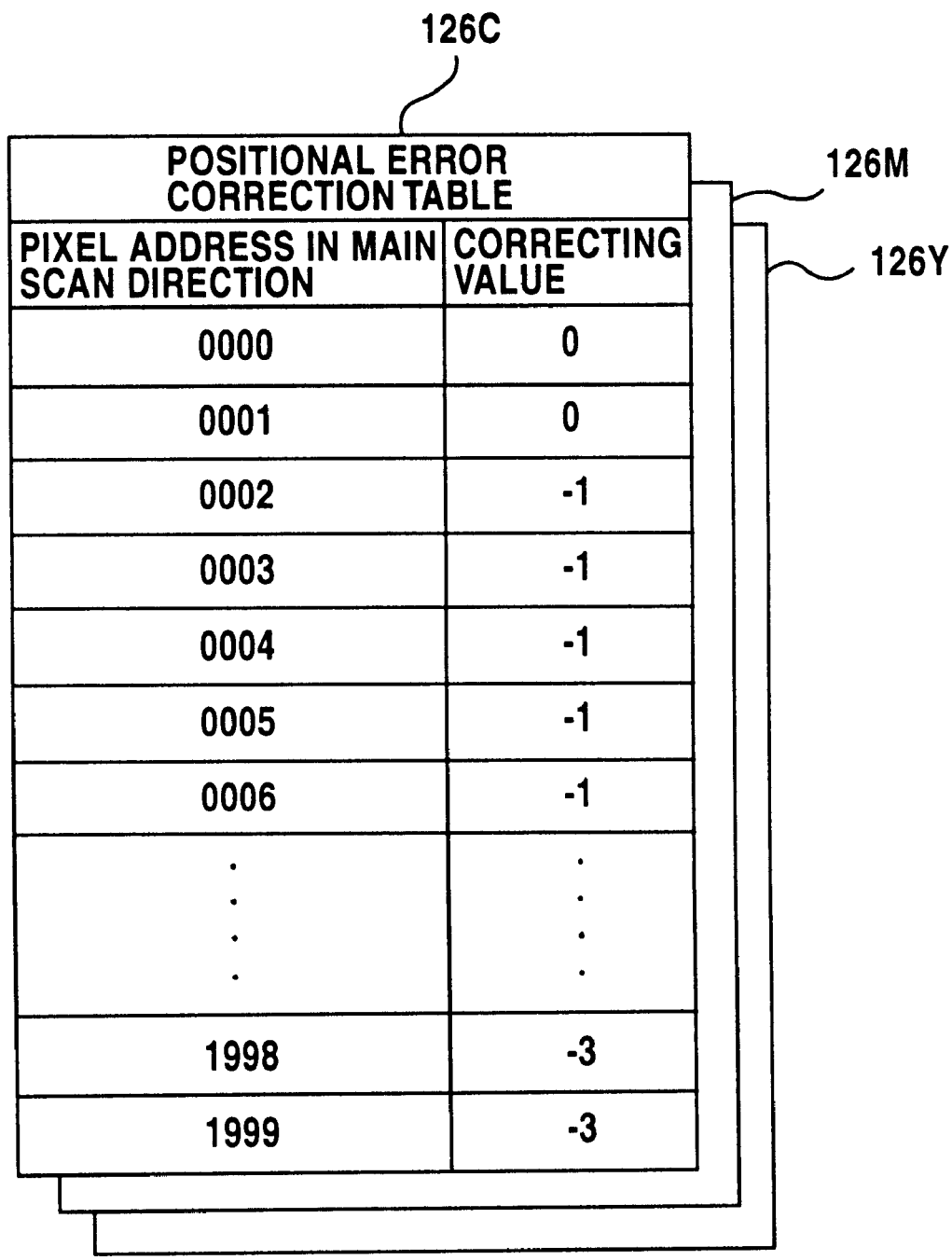
FIG. 23 is a diagram for explaining positional error correction tables generated from the position error detection information.

FIG. 23 is a diagram for explaining cyan, magenta and yellow positional error correction tables 126C, 126M and 126Y which are generated from the correcting data shown in FIG. 22C. Contents of these positional error correction tables 126C, 126M and 126Y are stored in the positional error correcting information storing part 126 which is provided within the positional error correcting part 124 shown in FIG. 8.

Figure 24:
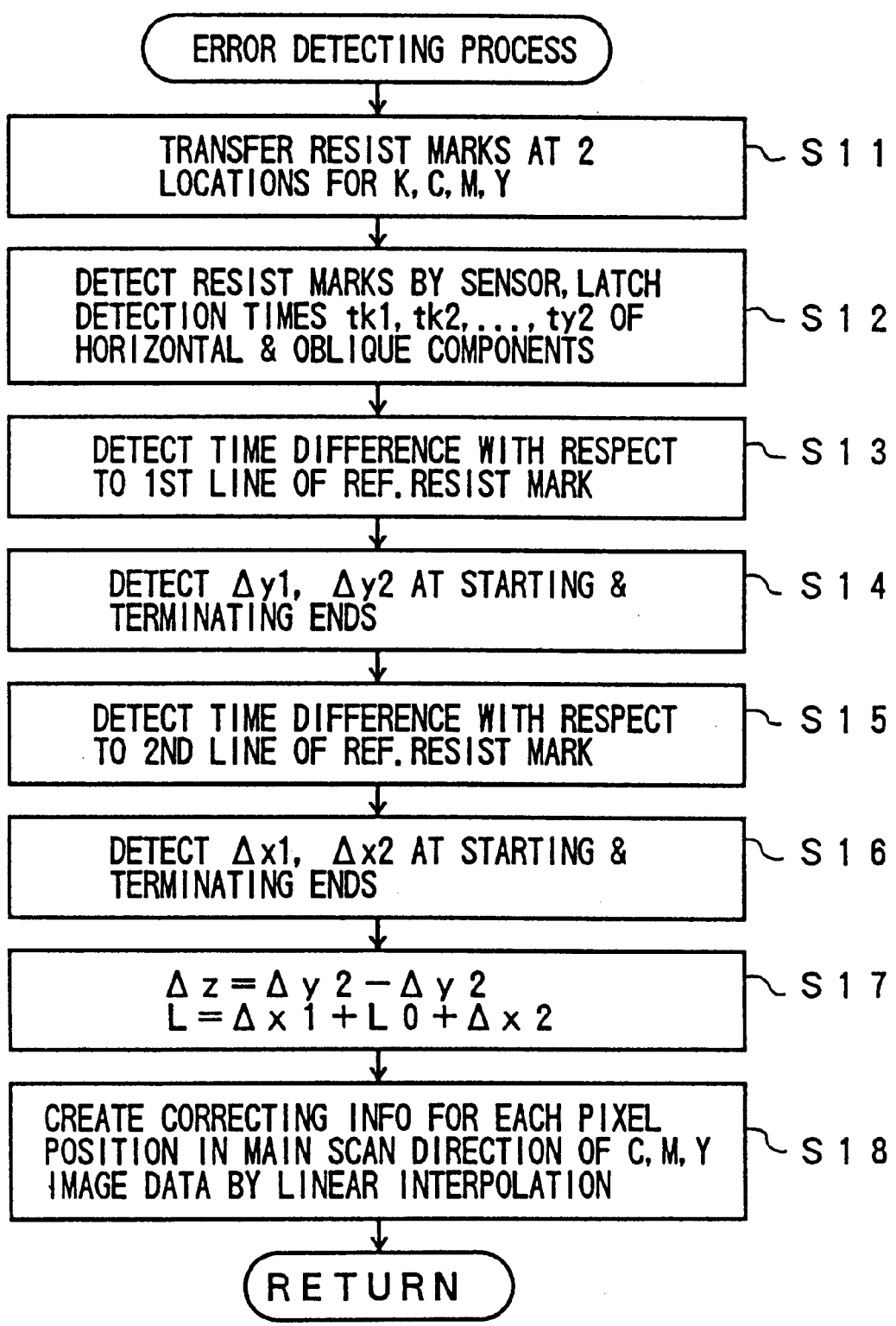
FIG. 24 is a flow chart for explaining a positional error detection process in the first embodiment.

FIG. 24 is a flow chart for explaining the positional error detection process of the positional error detecting part 116 shown in FIG. 8 in this embodiment. First, a step S11 transfers the resist mark 150 at two positions, namely, the starting and terminating ends on the endless belt 12, for each of the four colors black, cyan, magenta and yellow as shown in FIG. 15, for example. Then, a step S12 detects the resist marks 150 by the pair of sensors 30-1 and 30-2, and latches the detection times of a horizontal line component and an oblique line component of the resist marks 150. The horizontal line component is the first straight line component of the resist mark 150, and the oblique line component is the second straight line of the resist mark 150.

A step S13 detects a time difference T between the detection time of the first straight line of the reference black resist mark 150K in the main scan direction and the detection time of each of the yellow, magenta and cyan resist marks 150Y, 150M and 150C, based on the latched detection times. A step S14 detects error quantities $_\Delta y1$ and $_\Delta y2$ in the sub scan direction at the starting and terminating ends of the endless belt 12. In the case where a plurality of resist marks 150 are successively transferred onto the endless belt 12 for each of the four colors black, cyan, magenta and yellow as shown in FIG. 15, the steps S13 and S14 detect the error quantities from average values of detected results obtained for the resist marks 150 of each of the four colors.

Next, a step S15 detects a time difference T between the detection time of the second straight line of the reference black resist mark 150K in the oblique direction and the detection time of each of the yellow, magenta and cyan resist marks 150Y, 150M and 150C, based on the latched detection times. A step S16 detects error quantities $_\Delta x1$ and $_\Delta x2$ in the main scan direction at the starting and terminating ends of the endless belt 12. In the case where a plurality of resist marks 150 are successively transferred onto the endless belt 12 for each of the four colors black, cyan, magenta and yellow as shown in FIG. 15, the steps S15 and S16 detect the error quantities from average values of detected results obtained for the resist marks 150 of each of the four colors.

Figure 21:
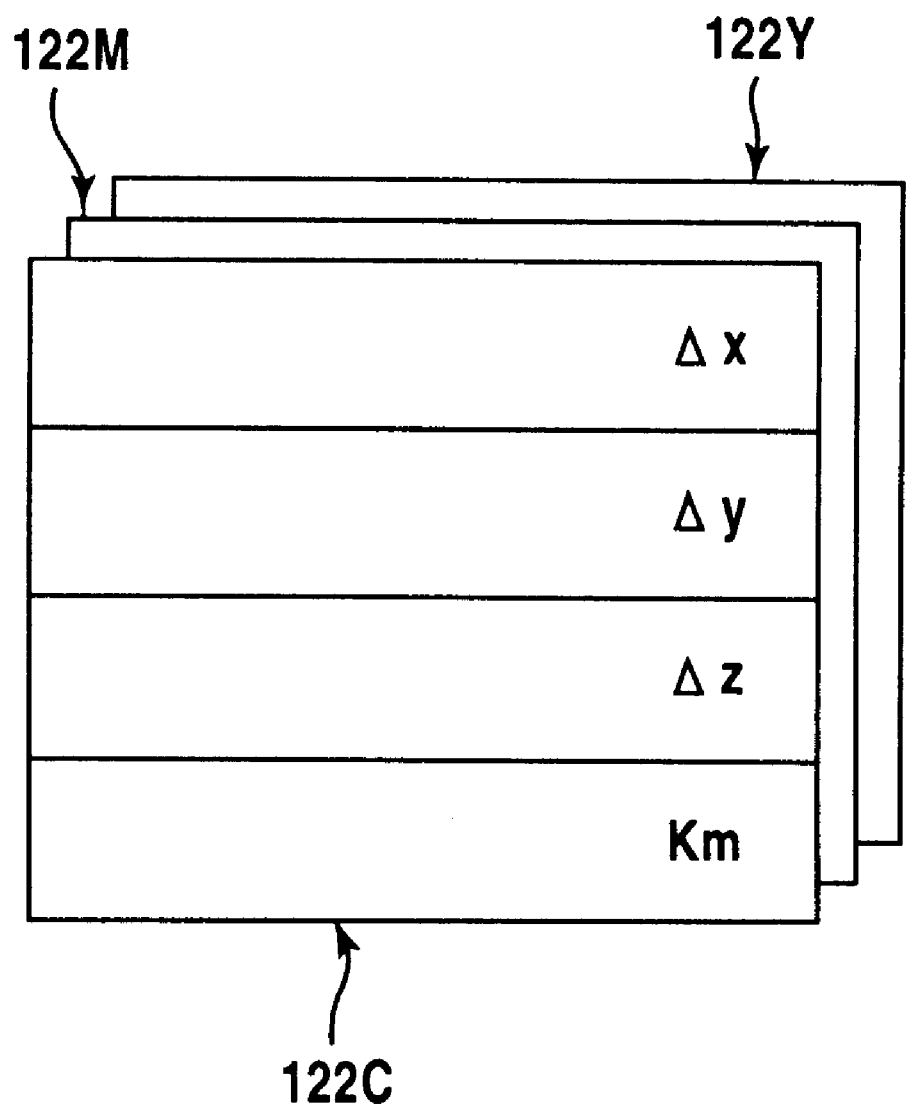
FIG. 21 is a diagram for explaining tables storing positional error detection information.

Next, a step S17 detects the deviation quantity $_\Delta z$ in the sub scan direction, and detects the line width L in the main scan direction. As a result, the cyan, magenta and yellow tables 122C, 122M and 122Y of the positional error detection information are created as shown in FIG. 21. Finally, a step S18 sets the detected subject line in the bit map memory space 174 as shown in FIGS. 22A through 22D. In other words, the step S18 creates correcting information for each pixel position in the main scan direction of the cyan, magenta and yellow image data by linear interpolation, that is, creates offset values in the sub scan direction, so as to obtain the cyan, magenta and yellow positional error correction tables 126C, 126M and 126Y shown in FIG. 23.

In the positional error detecting process shown in FIG. 24, the step S18 creates the positional error correcting information shown in FIG. 23, for example. This positional error correcting information may be created by the positional error correcting part 124 shown in FIG. 8 or, by the positional error detecting part 116 shown in FIG. 8.

Figure 25:
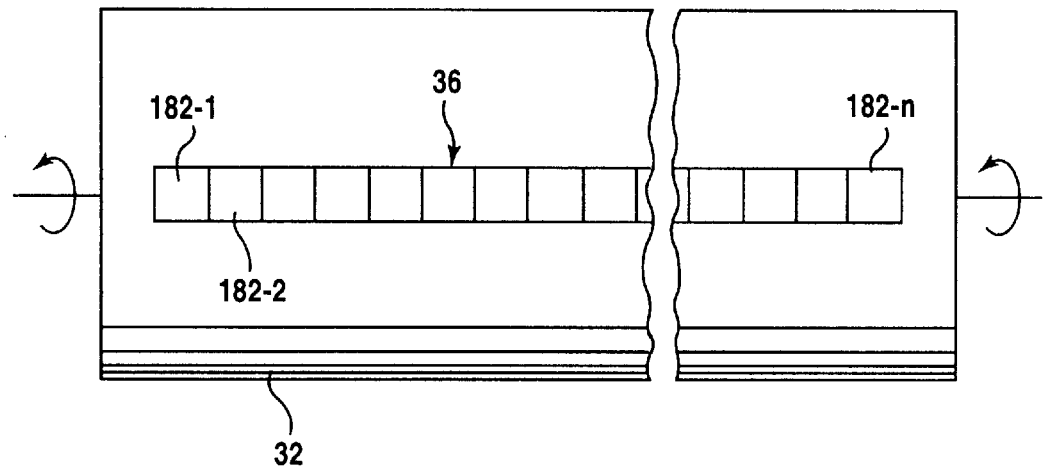
FIG. 25 is a diagram for explaining a photoconductive drum and a light emitting diode (LED) array of the electrostatic recording unit.

1-4. Positional Error Correction:

FIG. 25 is a diagram for explaining an arrangement of the LED array 36 with respect to the photoconductive drum 32 of the electrostatic recording unit 24 shown in FIG. 3. The LED array 36 includes a plurality of light emitting elements, namely, a plurality of LED chips 182-1, 182-2, . . . , 182-n arranged in the main scan direction which is perpendicular to a rotating direction of the photoconductive drum 32. In the case where the resolution in the main scan direction is 600 dpi, for example, the LED chips 182-1 through 182-n are arranged at a pitch of approximately 42 μm.

Figure 26:
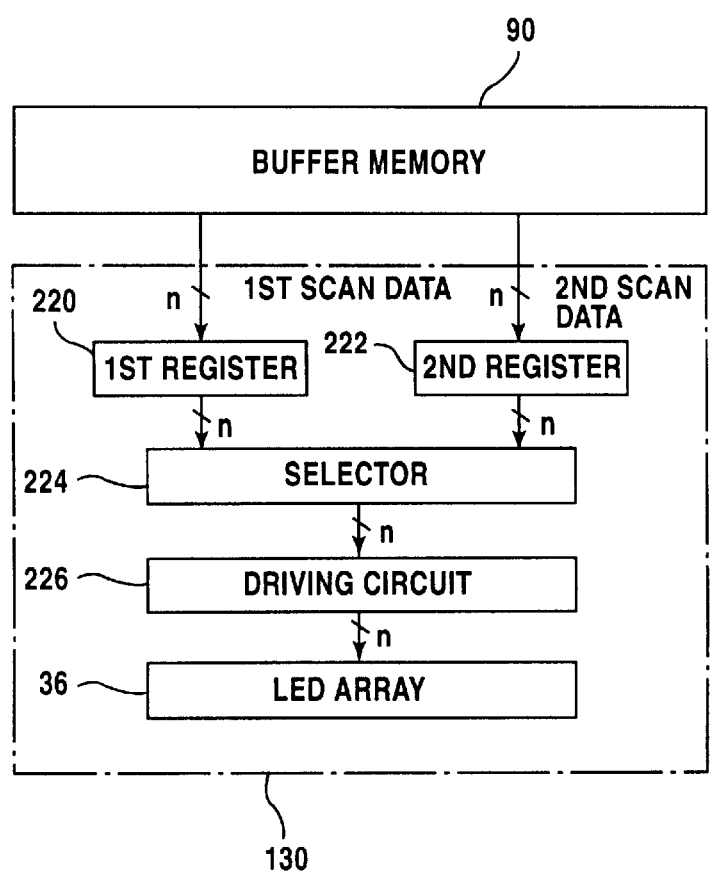
FIG. 26 is a system block diagram showing a LED driving part with respect to the LED array shown in FIG. 25.

FIG. 26 is a system block diagram showing the LED driving part 130 with respect to the LED array 36 shown in FIG. 25. The high-resolution pixel data generated by the buffer memory 90 provided within the resolution converting part 88 shown in FIG>7 are supplied to the LED driving part 130. The conversion process of the high-resolution pixel data with respect to the buffer memory 90 becomes as shown in FIGS. 27A and 27B.

Figure 27A:
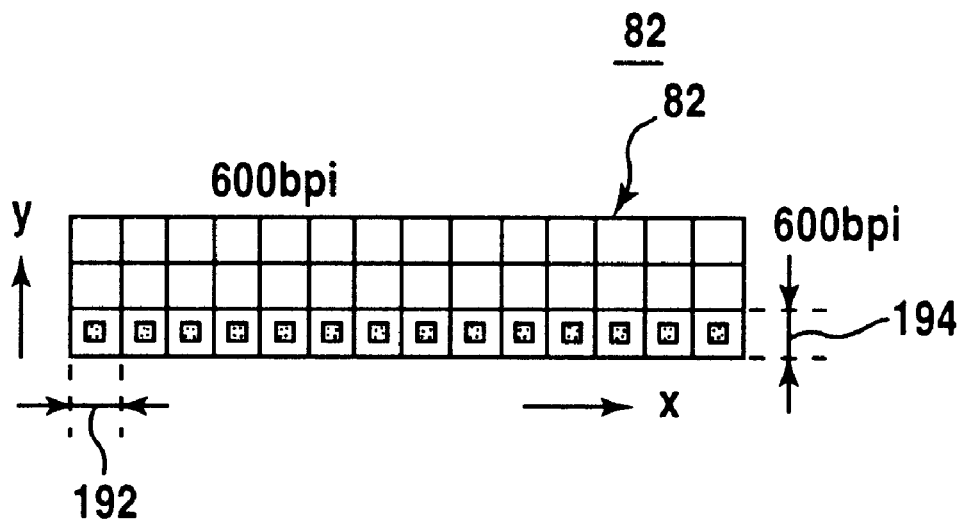
FIGS. 27A and 27B respectively are diagrams for explaining a memory development for obtaining a high resolution of pixel data in the sub scan direction.

FIG. 27A shows a part of a memory region of the image memory 82. In FIG. 27A, the pixel data are developed for each 1 pixel region 192 in the main scan direction x, and are also developed for each 1 pixel region 194 in the sub scan direction y. For example, the resolution in the main scan direction x is 600 dpi, and the resolution in the sub scan direction y is also 600 dpi.

Figure 27B:
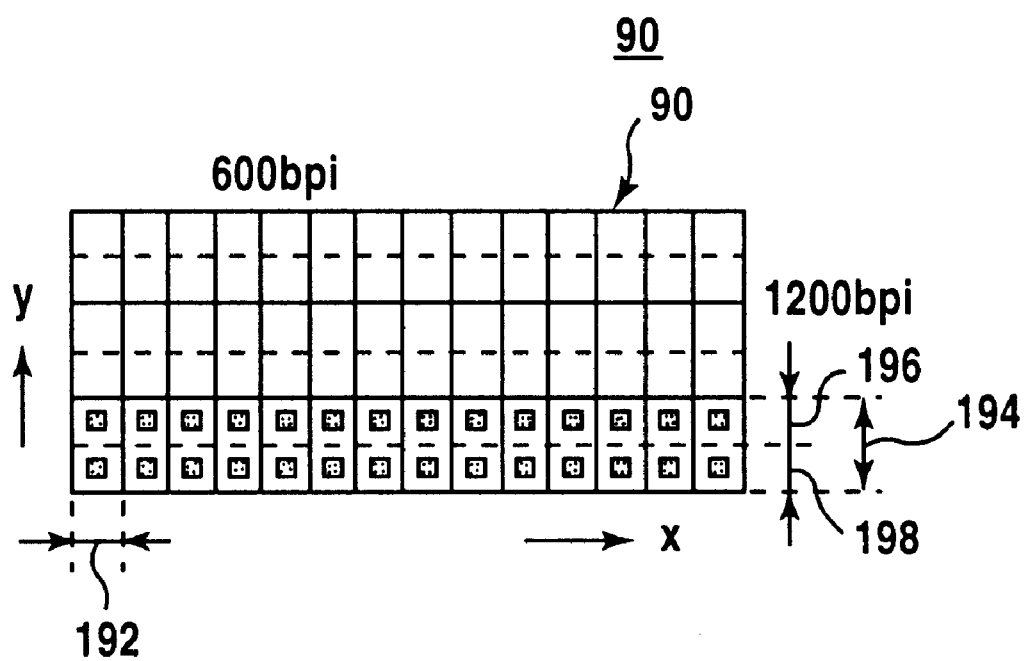

The buffer memory 90 provided in the resolution converting part 88 converts such pixel data stored in the image memory 82 into the high-resolution pixel data as shown in FIG. 27B. A memory space of the buffer memory 90 shown in FIG. 27B is the same as the image memory 82 shown in FIG. 27A with respect to the main scan direction x, and 1 pixel data is stored in 1 pixel region 194 in the buffer memory 90 to realize a resolution of 600 dpi in the main scan direction.

On the other hand, with respect to the sub scan direction y, 1 pixel region 194 is divided into two regions, namely, a first scan data region 196 and a second scan data region 198, and 1 pixel data read from the image memory 82 shown in FIG. 27A is decomposed into the high-resolution pixel data and stored in the buffer memory 90. For this reason, the resolution in the sub scan direction y is 1200 dpi which is two times the resolution (600 dpi) of the image memory 82. Of course, the resolution of the buffer memory 90 in the sub scan direction y may be an integral multiple of the resolution of the image memory 82, and may be 1800 dpi, for example, which is three times the resolution of the image memory 82.

Returning now to the description of FIG>26, the high-resolution pixel data shown in FIG. 27B are developed in the buffer memory 90. The pixel data amounting to 1 line in the main scan direction x of the first scan data region 196, and the pixel data amounting to 1 line in the main scan direction x of the second scan data region 198 are successively read from the buffer memory 90 and supplied to the LED driving part 130 as first scan data and second scan data.

The LED driving part 130 includes a first register 220, a second register 222, a selector 224, and a LED light emission driving circuit 226 which are connected as shown in FIG. 26. The first scan data and the second scan data which are generated by decomposing 1 pixel from the buffer memory 90 in the sub scan direction y are successively stored in the first register 220 and the second register 222 in synchronism with the movement of ½ pixel pitch on the rotary recording surface of the photoconductive drum 32 shown in FIG. 25.

At a timing after the first scan data and the second scan data are respectively stored in the first register 220 and the second register 222, the selector 224 first selectively outputs the data from the first register 220 and supplies the data to the LED light emission driving circuit 226, so as to drive the LED array 36 in a first scan of the write process.

Then, at a timing after the photoconductive drum 32 moves by ½ pixel pitch on the rotary recording surface thereof, the selector 224 selectively outputs the data from the second register 222 and supplies the data to the LED light emission driving circuit 226, so as to drive the LED array 26 in a second scan of the write process.

FIGS. 28A and 28B respectively are diagrams for explaining a time division write scan by the LED driving part 130 shown in FIG. 26 using the high-resolution pixel data shown in FIGS. 27A and 27B. FIG. 28A shows the write process of the first scan. In this case, the LED array 36 generates a first scan light emission pattern 206 by the light emission drive based on the first scan data, and forms a latent write region on the photoconductive drum 32 as indicated by a first scan print region 202.

Next, at a timing after the photoconductive drum 32 moves by ½ pixel pitch on the rotary recording surface thereof, the write process of the second scan shown in FIG. 28B is carried out. In this case, the LED array 36 generates a second scan light emission pattern 208 by the light emission drive based on the second scan data, and forms a latent write region on the photoconductive drum 32 immediately next to the first scan print region 202 which is already written, as indicated by a second scan print region 204. By such a write process which is carried out in time division by the first scan and the second scan of the LED array 36, 1 pixel print region 200 having a width of 1 pixel pitch is formed on the photoconductive drum 32.

According to the positional error correction of this embodiment, the positional error correction is carried out at the same time as when the pixel data are developed in the buffer memory 90 and converted into the high-resolution pixel data as shown in FIG. 27B. FIGS. 29A through 29D respectively are diagrams for explaining the positional error correction which is carried out simultaneously as the conversion of the pixel data into the high-resolution pixel data. This positional error correction also carries out a process of generating gradation values with respect to the high-resolution pixel data which are obtained by the conversion.

Figure 29A:
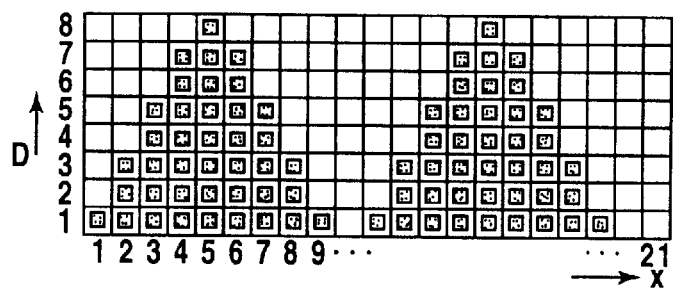
FIGS. 29A through 29D respectively are diagrams for explaining a positional error correction with respect to the high-resolution pixel data.
Figure 29B:
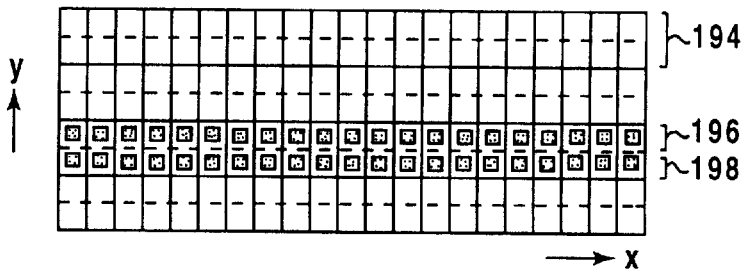

FIG. 29A shows the gradation value of the print data with respect to a first dot to a twenty-first dot in the main scan direction x, where a gradation value D has a maximum of 8 gradation levels, for example. FIG. 29B shows the print data before the positional error correction is carried out, in a state where the high-resolution pixel data are developed in the memory space of the buffer memory 90 shown in FIG. 26. In order to print a scan line having a width of 1 pixel in the main scan direction x, the pixel data from the image memory 82 are decomposed into two and stored in the first scan data region 196 and the second scan data region 198 as the high-resolution pixel data.

Figure 29C:
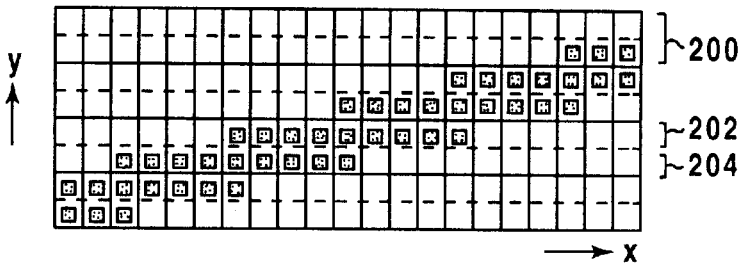

When the above described print data before the positional error correction is carried out are supplied to the LED driving part 130 shown in FIG. 26 and printed, a print result shown in FIG. 29C is obtained. It may be seen from this print result, a print error is generated in an oblique direction towards the top right. The print error of the print result shown in FIG. 29C is detected by the positional error detecting part 116 shown in FIG. 8 which obtains the positional error detection information shown in FIG. 21 including the positional error quantity $_\Delta x$ in the main scan direction, the positional error quantity $_\Delta y$ in the sub scan direction, the deviation quantity (skew quantity) $_\Delta z$ in the sub scan direction, and the magnification Km of the line width in the main scan direction. In addition, the correcting values of the cyan, magenta and yellow positional error correction tables 126C, 126M and 126Y shown in FIG. 23 are obtained based on the positional error detection information.

Figure 29D:
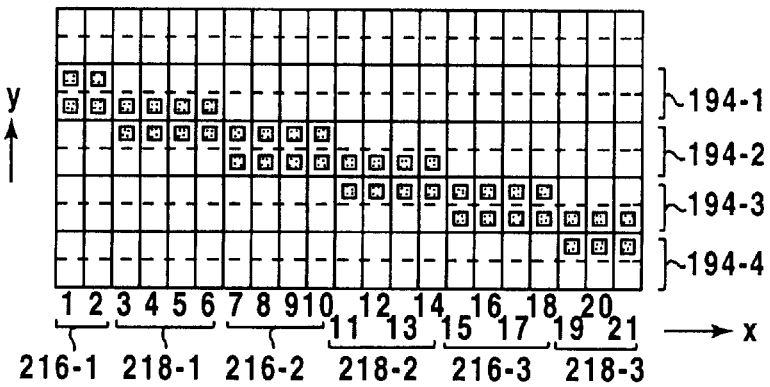

FIG. 29D shows the corrected print data which are obtained after the positional error is corrected in order to correct the positional error of the print result shown in FIG. 29C. With respect to the corrected print data shown in FIG. 29D, the high-resolution pixel data are accommodated within 1 pixel regions 194-1, 194-2 and 194-3 for regions 216-1, 216-2 and 216-3 in the main scan direction x. On the other hand, the high-resolution pixel data which are decomposed into two exist at boundaries of the 1 pixel regions 194-1, 194-2, 194-3 and 194-4 for regions 218-1, 218-2 and 218-3 in the main scan direction x.

For this reason, with respect to the high-resolution pixel data of the regions 216-1 through 216-3 located at the 1 pixel regions 194-1 through 194-3, the gradation value D shown in FIG. 29A can be used to control the light emissions of the first scan and the second scan as shown in FIGS. 28A and 28B. On the other hand, with respect to the high-resolution pixel data in the regions 218-1 through 218-3 located at the pixel boundaries, the gradation value D shown in FIG. 29A cannot be used as it is because the write process involves the second scan of the leading 1 pixel region and the first scan of the following 1 pixel region. Hence, the gradation value is divided into two as shown in FIG. 30 for the regions 218-1 through 218-3 located at the pixel boundaries.

Figure 30:
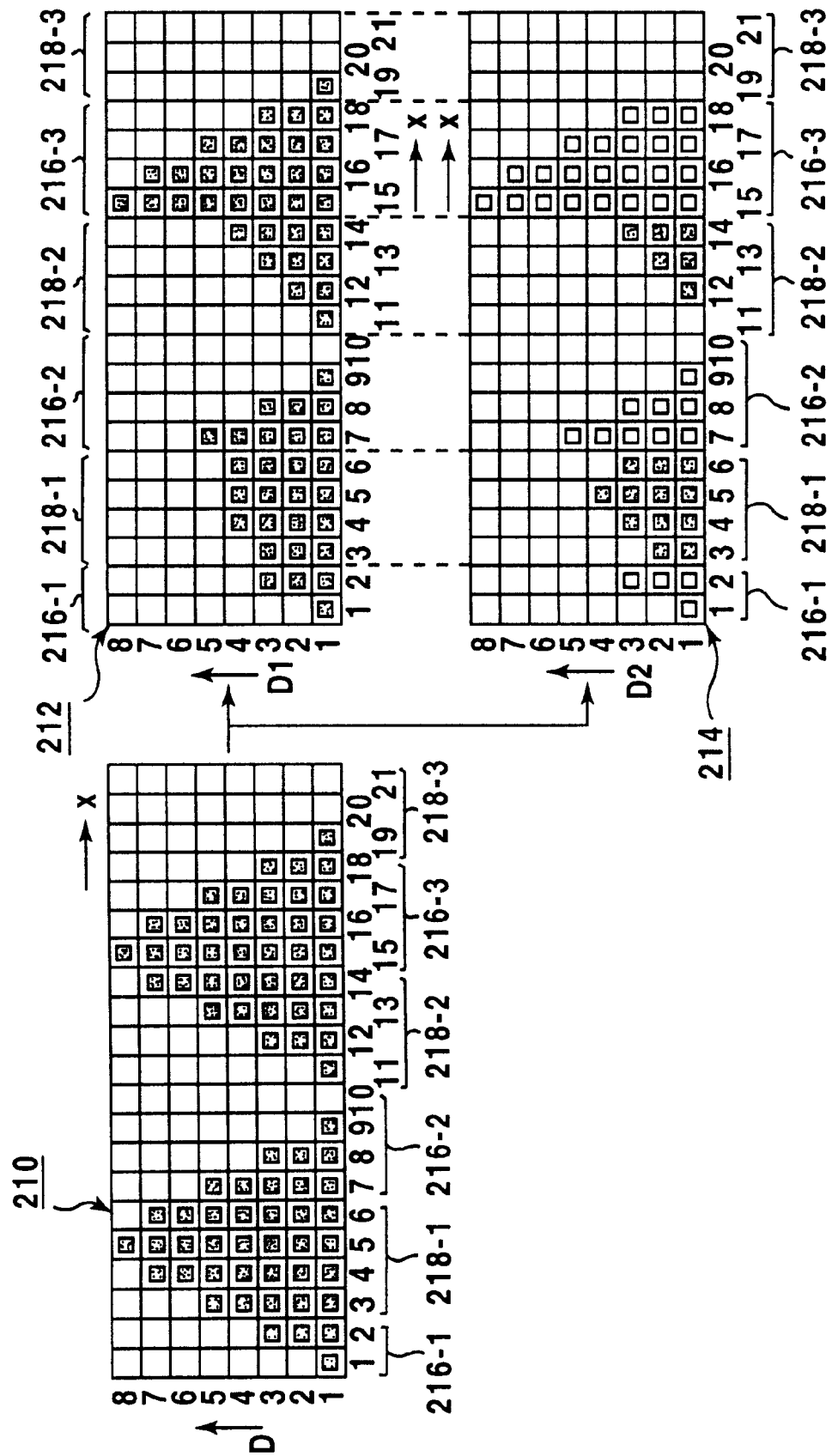
FIG. 30 is a diagram for explaining a gradation data conversion process when making a conversion to the high-resolution pixel data.

With respect to gradation data 210 shown in FIG. 30 before the correction, the same gradation value is stored for the regions 216-1 through 216-3 where the high-resolution pixel data do not exist at the pixel boundaries, similarly to gradation data 212 of the first scan shown on the right side in FIG. 30. On the other hand, with respect to the regions 218-1 through 218-3 where the high-resolution pixel data are located at the pixel boundaries, the gradation data 210 before the correction are divided into the gradation data 212 of the first scan and gradation data 214 of the second scan, as shown on the right side in FIG. 30.

In other words, if the gradation value of the gradation data 210 before the correction is denoted by D, the gradation value of the gradation data 212 of the first scan after the correction is denoted by D1, and the gradation value of the gradation data 214 of the second scan after the correction is denoted by D2, the gradation value D is divided to satisfy a relation D=D1+D2 for the regions 218-1 through 218-3 where the high-resolution pixel data are located at the pixel boundaries. For example, a gradation value D=5 at the third dot position in the region 218-1 is divided into D1=3 and D2=2.

Figure 31:
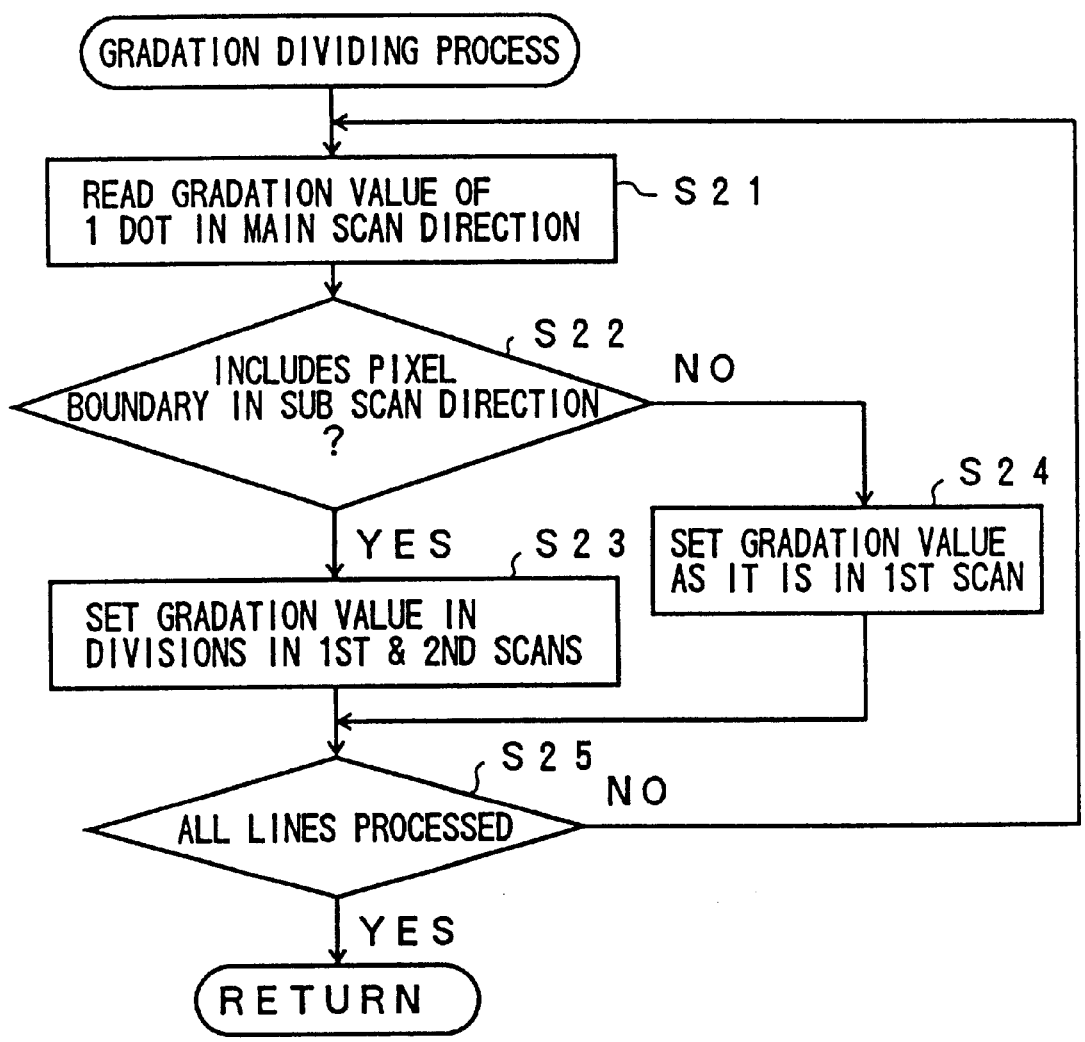
FIG. 31 is a flow chart for explaining a gradation dividing process shown in FIG. 30.

FIG. 31 is a flow chart for explaining a gradation dividing process shown in FIG. 30, that is, the gradation data generating process. First, a step S21 reads the gradation value of 1 dot in the main scan direction, and a step S22 decides whether or not a boundary pixel in the sub scan direction is included. If the decision result in the step S22 is NO, a step S24 sets the gradation value as it is as the gradation data of the first scan, and the process advances to a step S25 which will be described later.

On the other hand, if the decision result in the step S22 is YES, a step S23 divides the gradation value into two values and sets the two values as the gradation data of the first scan and the second scan, and the process advances to the step S25. The step S25 decides whether or not the process described above is carried out for all lines, and the process returns to the step S21 if the decision result in the step S25 is NO so as to repeat the above described process until all lines are processed. The process ends if the decision result in the step S25 is YES.

FIGS. 32(A) through 32(E) respectively are timing charts for explaining a light emission control of the LED array 36 by the LED driving part 130 shown in FIG. 26 using the corrected print data shown in FIG. 29D after the positional error correction and the gradation data 212 of the first scan and the gradation data 214 of the second scan which are generated as shown in FIG. 30.

Figure 32:
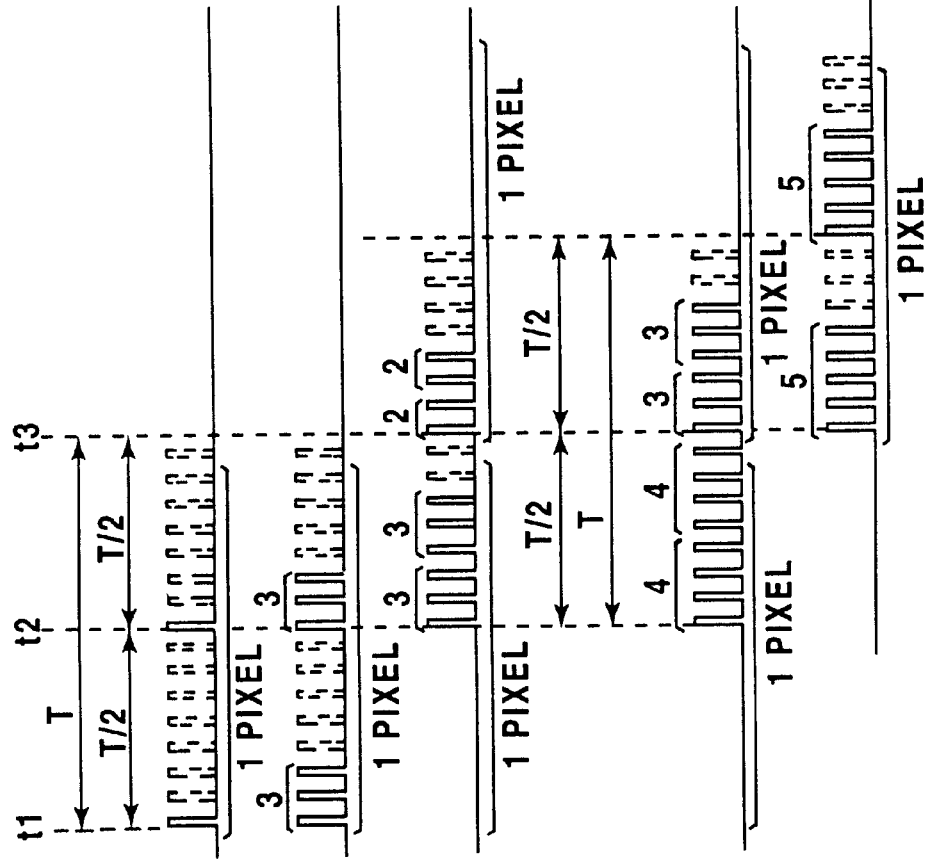
FIGS. 32(A) through 32(E) respectively are timing charts for explaining a light emission control of the LED array by the LED driving part shown in FIG. 26 using the corrected print data shown in FIG. 29D after the positional error correction and gradation data of first and second scans which are generated as shown in FIG. 30.

FIG. 32(A) shows the light emission control timing of the LED chip 182-1 for the first dot in the main scan direction x. If the light emission period of 1 pixel is denoted by T, the light emission control of the first scan occurs from a time t1 to a time t2 which is a period T/2 after the time t1, while the light emission control of the second scan occurs from the time t2 to a time t2 which is a period T/2 after the time t2.

In this case, since the two high-resolution pixel data divided in the sub scan direction y are located in the 1 pixel region 194-1 as shown in FIG. 29D with respect to the first dot, the gradation values (D1, D2) of the first scan and the second scan generated as shown in FIG. 30 are (1, 0). Hence, the light emission of the leading 1 pulse out of the 8 light emission pulse timings set in correspondence with the maximum gradation value 8 is repeated two times in time division during the first scan and the second scan respectively having the light emission time of T/2, in correspondence with D1=1.

FIG. 32(B) shows the light emission control timing of the LED chip 182-1 for the second dot in the main scan direction x. In this case, since the two high-resolution pixel data divided in the sub scan direction y are located in the 1 pixel region 194-1 as shown in FIG. 29D with respect to the second dot, the gradation values (D1, D2) of the first scan and the second scan generated as shown in FIG. 30 are (3, 0). Hence, the light emission of the leading 3 pulses out of the 8 light emission pulse timings set in correspondence with the maximum gradation value 8 is repeated two times in time division during the first scan and the second scan respectively having the light emission time of T/2, in correspondence with D1=3.

FIG. 32(C) shows the light emission control timing of the LED chip 182-1 for the third dot in the main scan direction x. In this case, since the two high-resolution pixel data divided in the sub scan direction y are located at the boundary of the 1 pixel regions 194-1 and 194-2 as shown in FIG. 29D with respect to the third dot, the gradation values (D1, D2) of the first scan and the second scan generated as shown in FIG. 30 are (3, 2).

Hence, the light emission of 3 pulses corresponding to the gradation value D1=3 of the first scan is repeated two times from the time t2 which is the period T/2 after the time t1. Thereafter, the light emission of 2 pulses corresponding to the gradation value D2=2 of the second scan is repeated two times from a time t3 which is the period T/2 after the time t2.

Similarly as in the case of the third dot in the main scan direction x, the two high-resolution pixel data divided in the sub scan direction y are located at the boundary of the 1 pixel regions 194-1 and 194-2 as shown in FIG. 29D with respect to the fourth dot and the fifth dot in the main scan direction x. Hence, the light emissions of the pulses corresponding to the gradation value D1 of the first scan and the gradation value D2 of the second scan are controlled at timings similar to those with respect to the third dot in the main scan direction x.

FIG. 32(D) shows the light emission control timing of the LED chip 182-1 for the sixth dot in the main scan direction x. In this case, since the two high-resolution pixel data divided in the sub scan direction y are located at the boundary of the 1 pixel regions 194-1 and 194-2 as shown in FIG. 29D with respect to the sixth dot, the gradation values (D1, D2) of the first scan and the second scan generated as shown in FIG. 30 are (4, 3). Hence, the light emission of 4 pulses corresponding to the gradation value D1=4 of the first scan is repeated two times from the time t2 which is the period T/2 after the time t1.

Thereafter, the light emission of 3 pulses corresponding to the gradation value D2=3 of the second scan is repeated two times from the time t3 which is the period T/2 after the time t2.

FIG. 32(E) shows the light emission control timing of the LED chip 182-1 for the seventh dot in the main scan direction x. In this case, since the two high-resolution pixel data divided in the sub scan direction y are located in the 1 pixel region 194-2 as shown in FIG. 29D with respect to the seventh dot, the gradation values (D1, D2) of the first scan and the second scan generated as shown in FIG. 30 are (5, 0). Hence, the light emission of the leading 5 pulses out of the 8 light emission pulse timings set in correspondence with the maximum gradation value 8 is repeated two times in time division during the first scan and the second scan respectively having the light emission time of T/2, in correspondence with D1=5.

Figure 33:
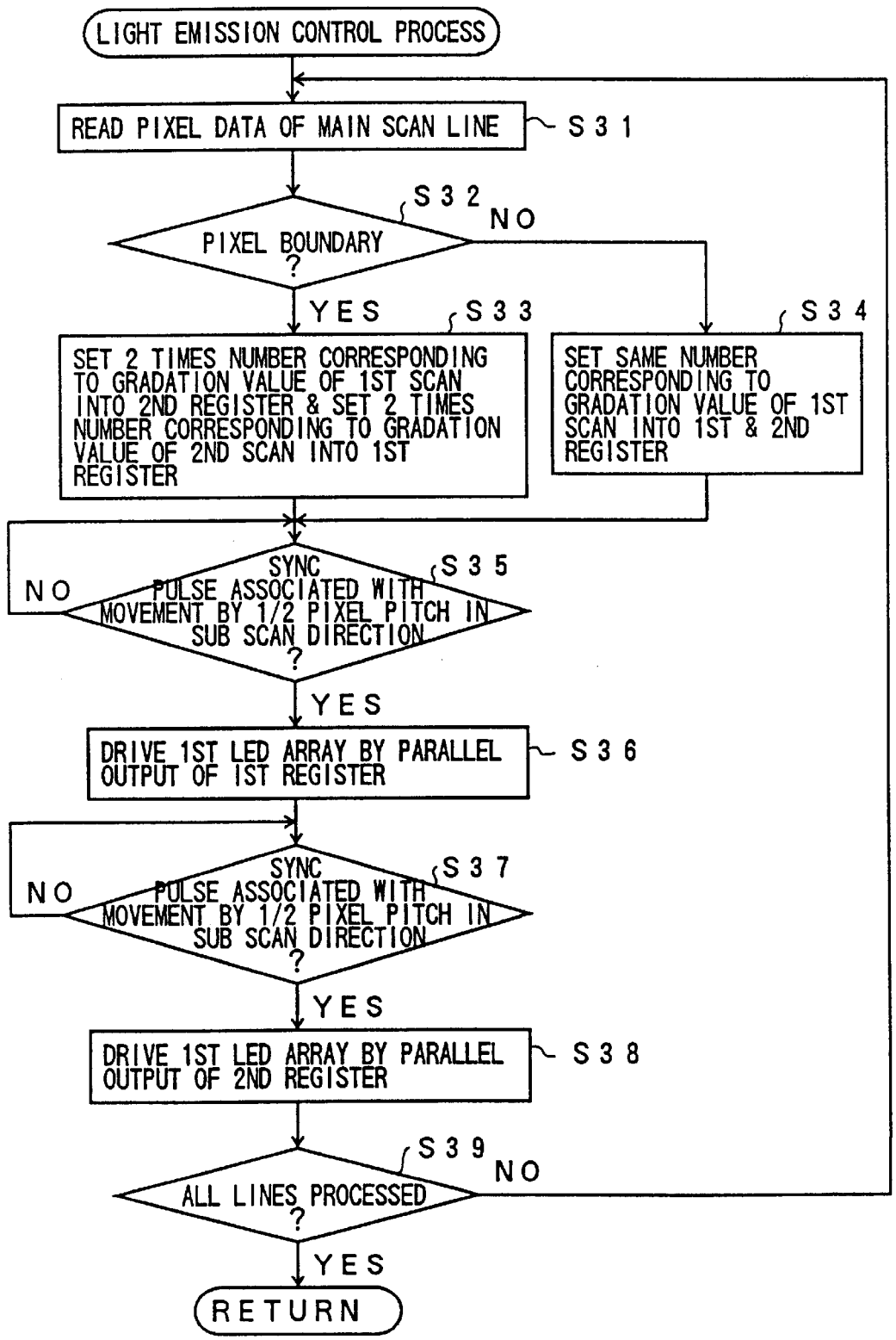
FIG. 33 is a flow chart for explaining the light emission control shown in FIGS. 32(A) through 32(E)

FIG. 33 is a flow chart for explaining the light emission control of the LED driving part 130 shown in FIG. 26 with the timings shown in FIGS. 32(A) through 32(E). First, a step S31 reads the pixel data amounting to 1 pixel in the main scan line, that is, the high-resolution pixel data divided into two in the sub scan direction y. A step S32 decides whether or not the pixel data is located at the pixel boundary. If the decision result in the step S32 is NO, a step S34 sets the same number of light emission pulses corresponding to the gradation value D1 of the first scan into the first register 220 and the second register 222.

On the other hand, if the decision result in the step S32 is YES, a step S33 sets a number which is twice the number of light emission pulses corresponding to the gradation value D1 of the first scan into the second register 222, and sets a number which is twice the number of light emission pulses corresponding to the gradation value D2 of the second scan into the first register 220.

Next, a step S35 decides whether or not a synchronizing pulse associated with the movement by ½ pixel pitch in the sub scan direction y is received. If the decision result in the step S35 becomes YES, a step S36 selects the first register 220 by the selector 224, so as to control the light emission of the LED array 36 by the LED light emission driving circuit 226 and to carry out the write process of the first scan.

Similarly to the step S35, a step S37 decides whether or not a synchronizing pulse associated with the movement by ½ pixel pitch in the sub scan direction y is received. If the decision result in the step S37 becomes YES, a step S38 selects the second register 222 by the selector 224, so as to control the light emission of the LED array 36 by the LED light emission driving circuit 226 and to carry out the write process of the second scan. A step S39 decides whether or not the above described process is carried out for all lines, and the process returns to the step S31 if the decision result in the step S39 is NO. The process ends if the decision result in the step S39 is YES.

In the actual circuit of the LED driving part 130, the process of the steps S31 through S34 and the process of the steps S35 through S38 are carried out in parallel in response to the synchronizing pulse associated with the movement by ½ pixel pitch in the sub scan direction y. Hence, the light emission control of the LED array 36 by the process of the steps S35 through S38 is carried out with a timing delayed by 1 pixel pitch with respect to the writing operation to the first and second registers 220 and 222 carried out by the process of the steps S31 through S34.

In the embodiment shown in FIG. 5, the resolution converting part 88 is provided at an intermediate part of the path which is used to transfer the pixel data read from the image memories 82-1 through 82-4 provided within the controller part 62 to the engine part 60, and the buffer memories 90-1 through 90-4 are provided within this resolution converting part 88. The conversion of the pixel data into the high-resolution pixel data, the positional error correction, and the generation of the gradation data associated with the positional error correction are carried out using the buffer memories 90-1 through 90-4 of the resolution converting part 88. However, it is of course possible to carry out the conversion of the pixel data into the high-resolution pixel data, the positional error correction, and the generation of the gradation data associated with the positional error correction when developing the image data received from the personal computer 92 into the Y, M, C and K image memories 82-1 through 82-4.

1-5. Line Width Correction:

FIGS. 34A through 34D respectively are diagrams for explaining a line width correcting process based on the line width magnification Km in the main scan direction obtained as the positional error detection information shown in FIG. 21.

Figure 34A:
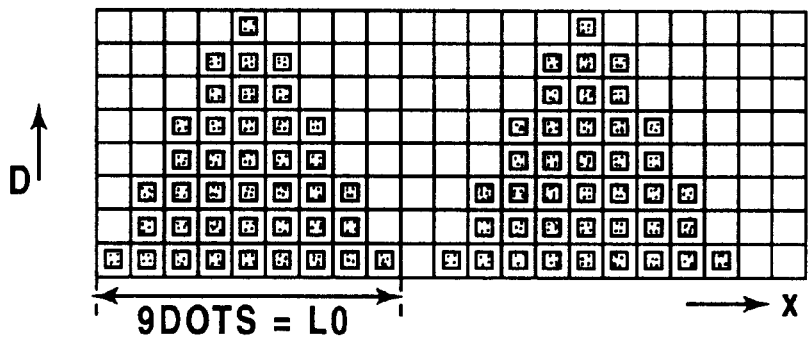
FIGS. 34A through 34D respectively are diagrams for explaining a line width correcting process based on a line width magnification.
Figure 34B:
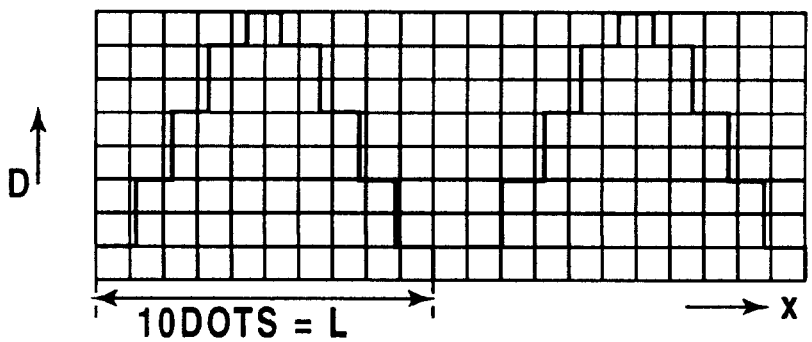

FIG. 34A shows the gradation value D of the print data before the correction, and shows the first dot to the twenty-first dot in the main scan direction x, and is the same as FIG. 29A described above. A print result which is obtained according to the gradation value D of the print data before the correction becomes as shown in FIG. 34B which shows an analog distribution of the gradation value D. In this print result before the correction, the print result shown in FIG. 34B is enlarged to 10 dots as compared to the 9 dots of the first through ninth dots in FIG. 34A, for example.

Such a change of the width in the main scan direction x after the printing occurs due to errors inevitably introduced during the production of the LED array 36, optical errors and the like. In order to simplify the description, it is assumed for the sake of convenience that the 9 dots of the print data before the correction shown in FIG. 34A have a reference line width L0, and the 10 dots of the print result before the correction shown in FIG. 34B have a line width L obtained by the positional error detection, the magnification Km of the line width in this case can be described by the following.

$$Km = L/L0 = 10/9 = 1.11$$

Figure 34C:
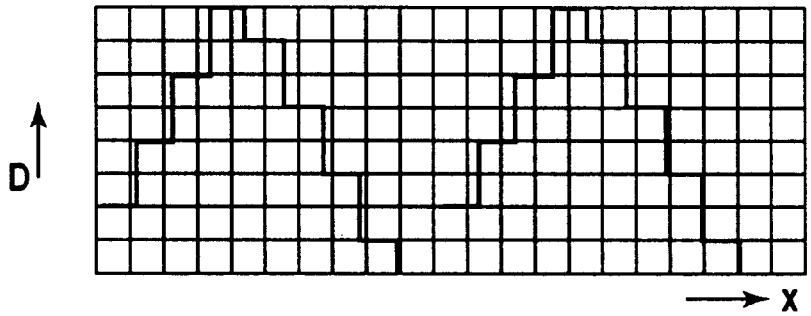
Figure 34D:
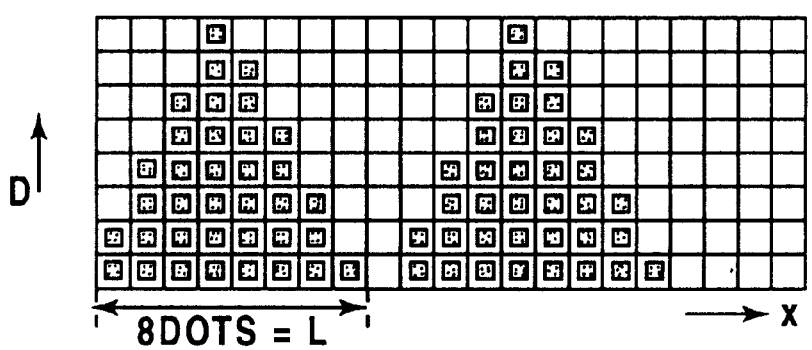

Hence, a corrected print result shown in FIG. 34C which is corrected using the magnification Km of the line width is generated. This corrected print result shown in FIG. 34C is obtained by multiplying an inverse number $(1/Km)=0.9$ of the magnification Km to the analog distribution of the gradation value of the print result shown in FIG. 34B, so as to compress the print result in the main scan direction x. When an analog distribution of the gradation value which is corrected by the above described multiplication the inverse number of the magnification Km is sampled at each pixel position in the main scan direction, print data shown in FIG. 34D are obtained. The print data shown in FIG. 34D gives a corrected gradation value distribution after the line width is corrected.

In the print data shown in FIG. 34D, the line width L0=9 dots in FIG. 34A before the correction is compressed to the line width L=8 dots. When the light emission of the LED array 36 is controlled based on the print data which are compressed to the line width L=8 dots, the printing is made according to a line width enlargement with the magnification Km. More particularly, if Km=1.11, the print result of the print data having the line width L=8 dots in FIG. 34D becomes L×K=8.88 dots. The print result having the line width of 8.88 dots falls within a range of the correct line width L0=9 dots shown in FIG. 30A ±1 dot, and the line width error is suppressed to 42 μm or less because the pitch of 1 pixel is 42 μm in the case where the resolution is 600 dpi.

FIGS. 34A through 34D show the case where the line width L of the print result before the correction is enlarged with respect to the reference line width L0. However, in a case where the line width L of the print result before the correction is reduced with respect to the reference line width L0, the print result after the correction shown in FIG. 34C becomes an analog distribution of the gradation value expanded in the main scan direction x by the multiplication of the inverse number of the magnification Km, and the corrected print data becomes expanded.

Figure 35:
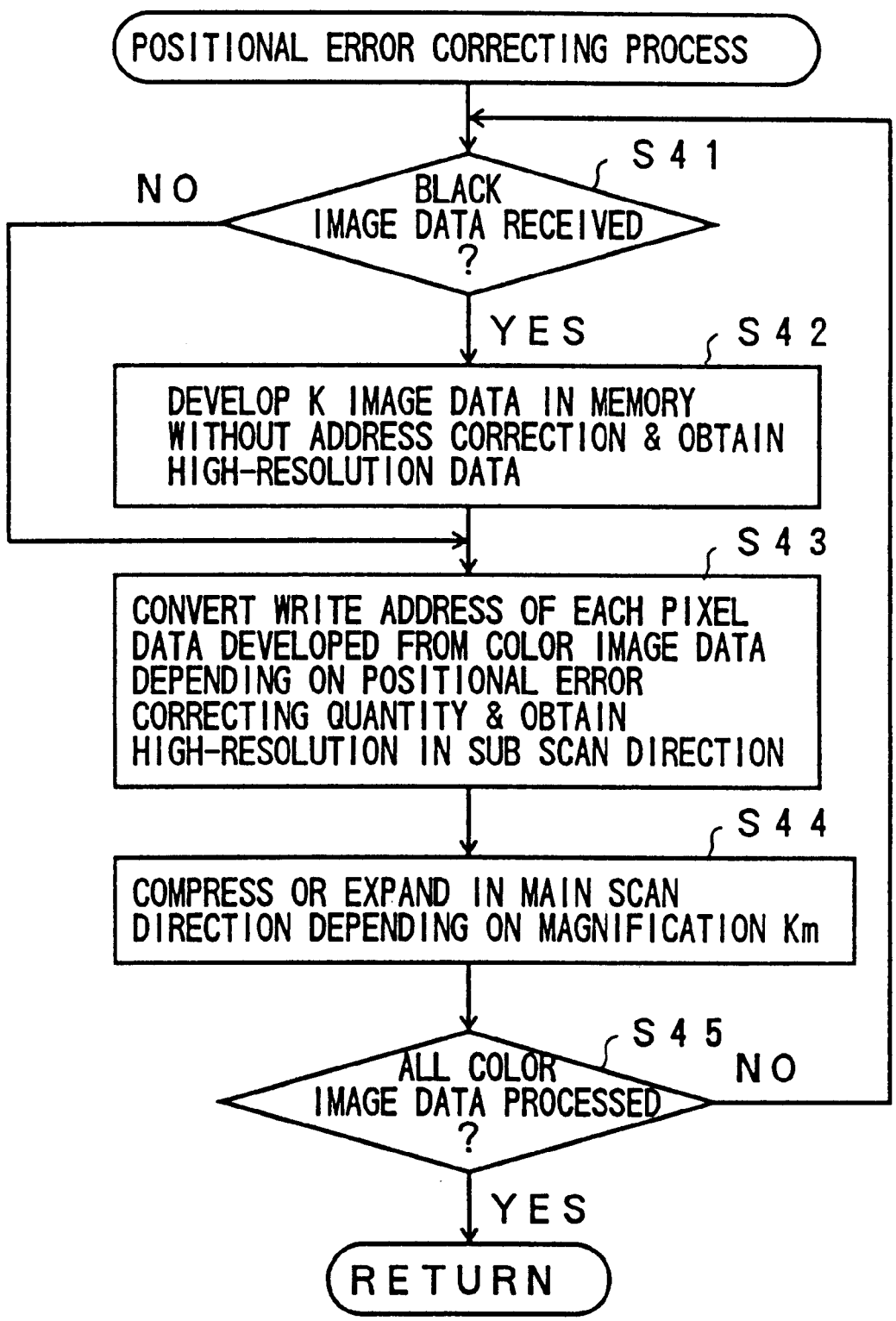
FIG. 35 is a flow chart for generally explaining a positional error correcting process in the first embodiment.

FIG. 35 is a flow chart for generally explaining a positional error correcting process in this embodiment. First, a step S41 decides whether or not black image data are received. If the decision result in the step S41 is YES, a step S42 develops the black image data into the K image memory 82-4 without carrying out a positional error correcting process, so as to decompose the black pixel data into 2 dots in the sub scan direction y and obtain the high-resolution pixel data.

On the other hand, if the decision result in the step S41 is NO or after the step S42, a step S43 converts the write address of each pixel data developed from the image data of one of the colors yellow, magenta and cyan which are other than black, depending on the positional error correcting quantity which is detected in advance, and further decomposes the pixel data into 2 dots in the sub scan direction y to obtain the high-resolution pixel data.

Next, a step S44 carries out a compression or expansion in the main scan direction x depending on the line width magnification Km which is detected in advance, as described above in conjunction with FIGS. 34A through 34D. A step S45 decides whether or not the above described process is carried out with respect to all of the color image data, and the process returns to the step S41 if the decision result in the step S45 is NO. On the other hand, if the decision result in the step S45 is YES, the positional error correcting process ends and the operation advances to the write process of the LED driving part 130 shown in FIG. 26.

For example, the positional error correcting process shown in FIG. 35 may be carried out when developing the image data into each of the Y, M, C and K image memories 82-1 through 82-4 of the controller part 62 as shown in FIG. 5 or, may be carried out by the buffer memories 90-1 through 90-4 of the resolution converting part 88 which is provided at the intermediate part of the path which is used to transfer the pixel data read from the image memories 82-1 through 82-4 provided within the controller part 62 to the engine part 60, and the location of the hardware structure for carrying out the positional error correcting process is not limited to a specific location. In addition, the positional error correcting process may be realized by a software process of the MPU 72 or the like, and further, a firmware may be provided exclusively for carrying out this positional error correcting process.

In the embodiment described above, the image forming apparatus is used in a state coupled to a host unit such as a personal computer and a word processor. However, the present invention is similarly applicable to any color electrostatic image forming apparatus which transfers a plurality of color toners onto a recording medium such as the recording paper by use of electrostatic recording units which are disposed in a tandem arrangement in the transport direction of the recording medium, so as to obtain effects similar to those described above. Further, the present invention is not limited to the numerical values given in the embodiment described above.

2. Description of Second Through Fourth Embodiments:

In many cases, manufacturers of printers providing printer systems buy an engine part from an engine manufacturer, and constructs the printer system by connecting the engine part to a controller part. In this case, from the point of view of the manufacturers of the printers, it is desirable that the specification of a video interface between the controller part and the engine part is the same or very similar among the various types of printer systems. But in reality, the specification of the video interface differs depending on the system employed by the exposure unit within the engine part. In addition, in order to correct the positional error of the printing, it is essential to feed back the correcting information to the controller part. For these reasons, the manufacturers of the printers must design and develop an exclusive controller part provided with the correcting function.

Next, a description will now be given of a second embodiment of the image forming apparatus according to the present invention, which provides the correcting function in the engine part, so that the specification of the video interface can be made the same or approximately the same regardless of the system employed by the exposure unit, and the load on the controller part is reduced, to enable printing of an image having a high quality.

Figure 36:
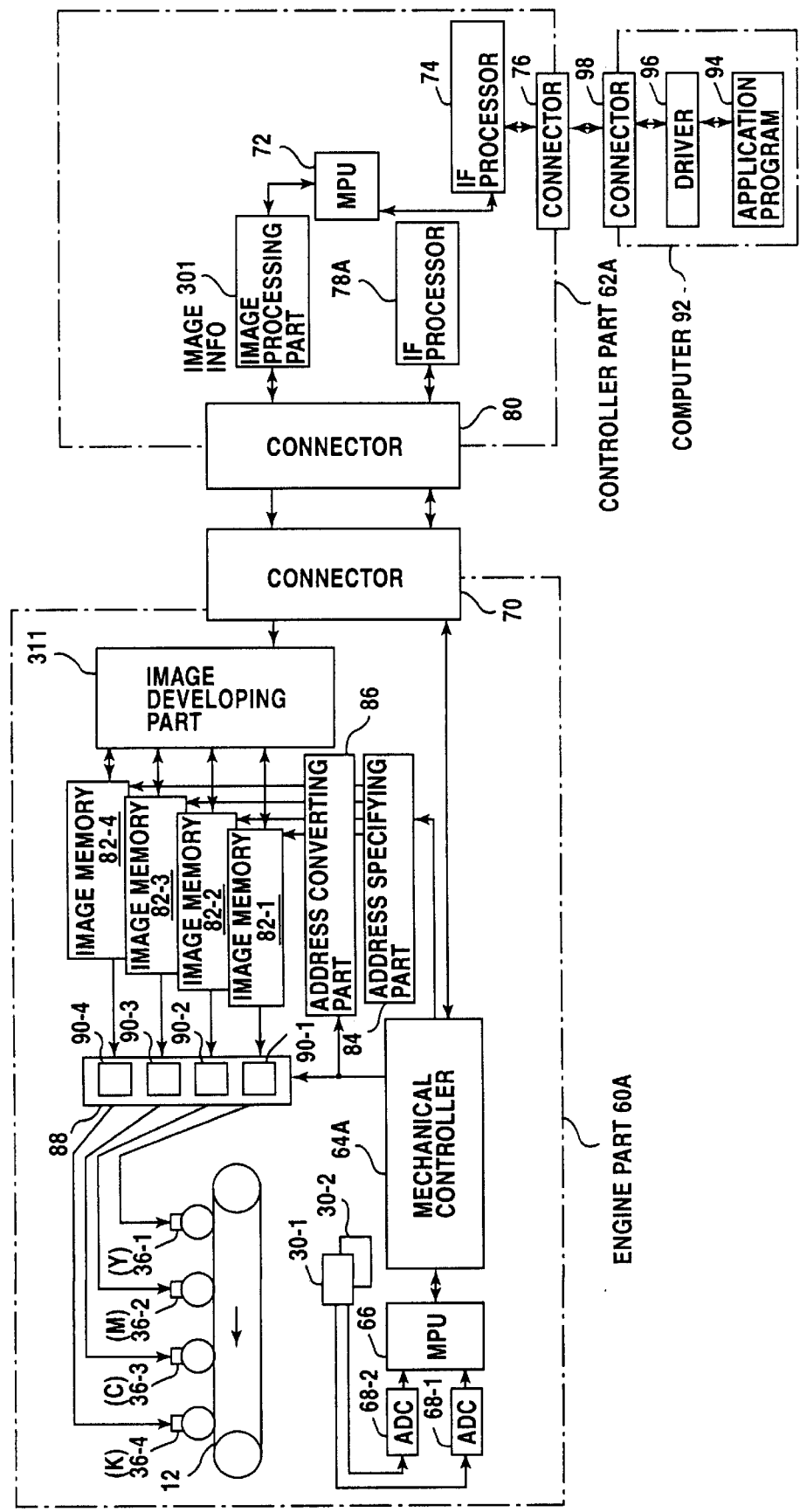
FIG. 36 is a system block diagram showing a second embodiment of the image forming apparatus according to the present invention.

FIG. 36 is a system block diagram showing the second embodiment of the image forming apparatus according to the present invention. In FIG. 36, those parts which are essentially the same as those corresponding parts in FIG. 5 are designated by the same reference numerals, and a description thereof will be omitted. In FIG. 36, a controller part 62A includes a controller MPU 72, an interface processor 74, an interface processor 78A, an image processor 301, a controller part connector 76, and a controller part connector 80. On the other hand, an engine part 60A includes an address specifying part 84, an address converting part 86, image memories 82-1 through 82-4, a resolution converting part 88 having buffer memories 90-1 through 90-4, and an image developing part 311, in addition to the constituent elements of the engine part 60 shown in FIG. 5. In addition, a mechanical controller 64A is provided in place of the mechanical controller 64. In other words, an image processing part provided within the controller part 62 of the first embodiment is provided within the engine part 62A in this embodiment.

In the controller part 62A, the interface processor 78A supplies control information which is obtained from the personal computer 92 via the controller part connector 76, the interface processor 74 and the controller MPU 72 to the mechanical controller 64A of the engine part 60A via the controller part connector 80 and the engine part connector 70. In addition, a print end notification, an abnormality notification and the like are supplied from the mechanical controller 64A to the controller MPU 72 via the engine part connector 70, the controller part connector 80 and the interface processor 78A, and supplied from the controller MPU 72 to the personal computer 92 via the interface processor 74 and the controller part connector 76.

The image processor 301 receives each of Y, M, C and K pixel data from the personal computer 92 via the controller part connector 76, the interface processor 74 and the controller MPU 72, and converts the pixel data into a video data format which conforms to the specification of a video interface between the controller part 62A and the engine part 60A. The pixel data output from the image processor 301 are supplied to the image developing part 311 via the controller part connector 80 and the interface processor 78A. The image developing part 311 converts the pixel data supplied from the controller part 62A into a data format (arrangement) which conforms to a driving system employed by the LED arrays 36-1 through 36-4, and supplies the converted pixel data to the image memories 82-1 through 82-4. If the pixel data supplied from the controller part 62A are serial data, it is necessary to convert the pixel data into parallel data before supplying the pixel data to the image memories 82-1 through 82-4. In addition, depending on the structure of the LED arrays 36-1 through 36-4, data received in a sequence 1, 2, 3, . . . , n−2, n−1, n must be rearranged into a sequence 1, 2, 3, . . . , n/2 for one data line and rearranged into a sequence n, n−1, n−2, . . . , n/2+1 for another data line. The image developing part 311 is provided to convert the data format of the pixel data in the above described manner.

Figure 37:
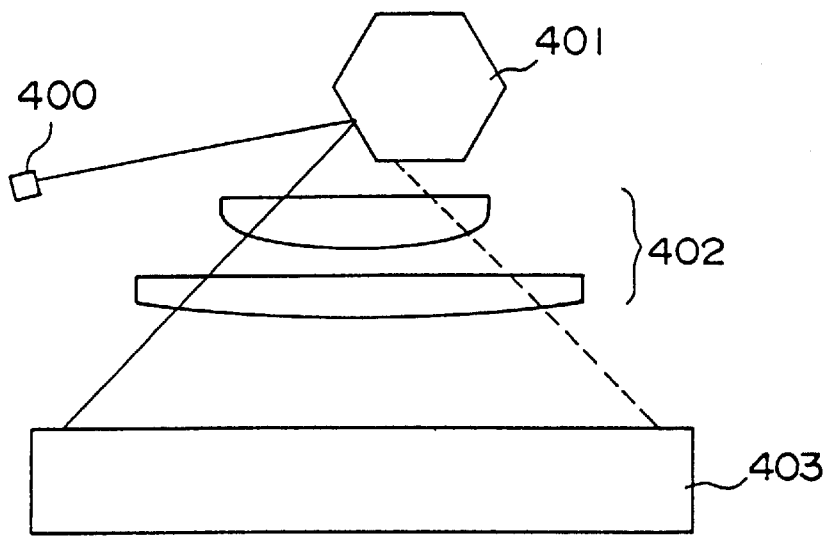
FIG. 37 is a diagram for explaining an exposure using a single laser beam.
Figure 38:
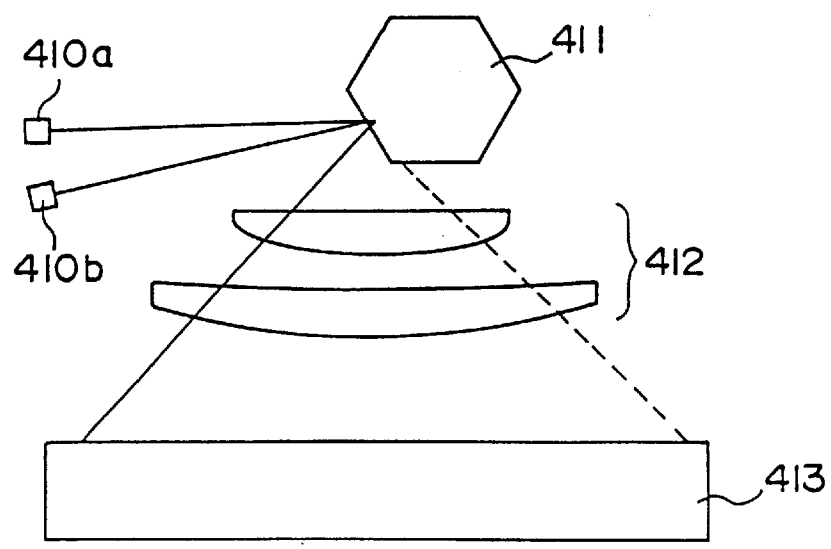
FIG. 38 is a diagram for explaining an exposure using two laser beams.

The electrostatic recording units 24-1 through 24-4 may use a structure shown in FIG. 37 or a structure shown in FIG. 38 in place of each of the LED arrays 36-1 through 36-4. In the case of an exposure part shown in FIG. 37, a single laser beam emitted from a laser diode 400 is deflected by a polygonal mirror 401 to scan and expose a photoconductive drum 403 via a lens system 402. On the other hand, in the case of an exposure part shown in FIG. 38, two laser beams emitted from laser diodes 410a and 410b are deflected by a polygonal mirror 411 to scan and expose a photoconductive drum 413 via a lens system 412. The laser beam from the laser diode 410a exposes the pixels of the odd lines on the photoconductive drum 413, while the laser beam from the laser diode 410b exposes the pixels of the even lines on the photoconductive drum 413, independently. In the case of the exposure part using the single laser beam, it is necessary to convert the parallel data into the serial data. On the other hand, in the case of the exposure part using the two laser beams, it is necessary to carry out conversions such as converting the data on one data line into data on two data lines, and converting the parallel data into two serial data. Even in such cases where the structures shown in FIGS. 37 and 38 are used, the image developing part 311 can appropriately convert the data format of the pixel data depending on the driving system employed by the electrostatic recording units 24-1 through 24-4.

Therefore, according to this embodiment, the positional error correction and the conversion of the data format of the pixel data depending on the driving system employed by the electrostatic recording units 24-1 through 24-4 are carried out in the engine part 60A. For this reason, the specification of the video interface between the controller part 62A and the engine part 60A can be made the same or very similar (that is, approximately the same), regardless of the printer system. As a result, the manufacturers of the printers need not design and develop an exclusive controller part 62 provided with the correcting function, and in addition, it is possible to reduce the load on the controller part 62A.

Figure 39:
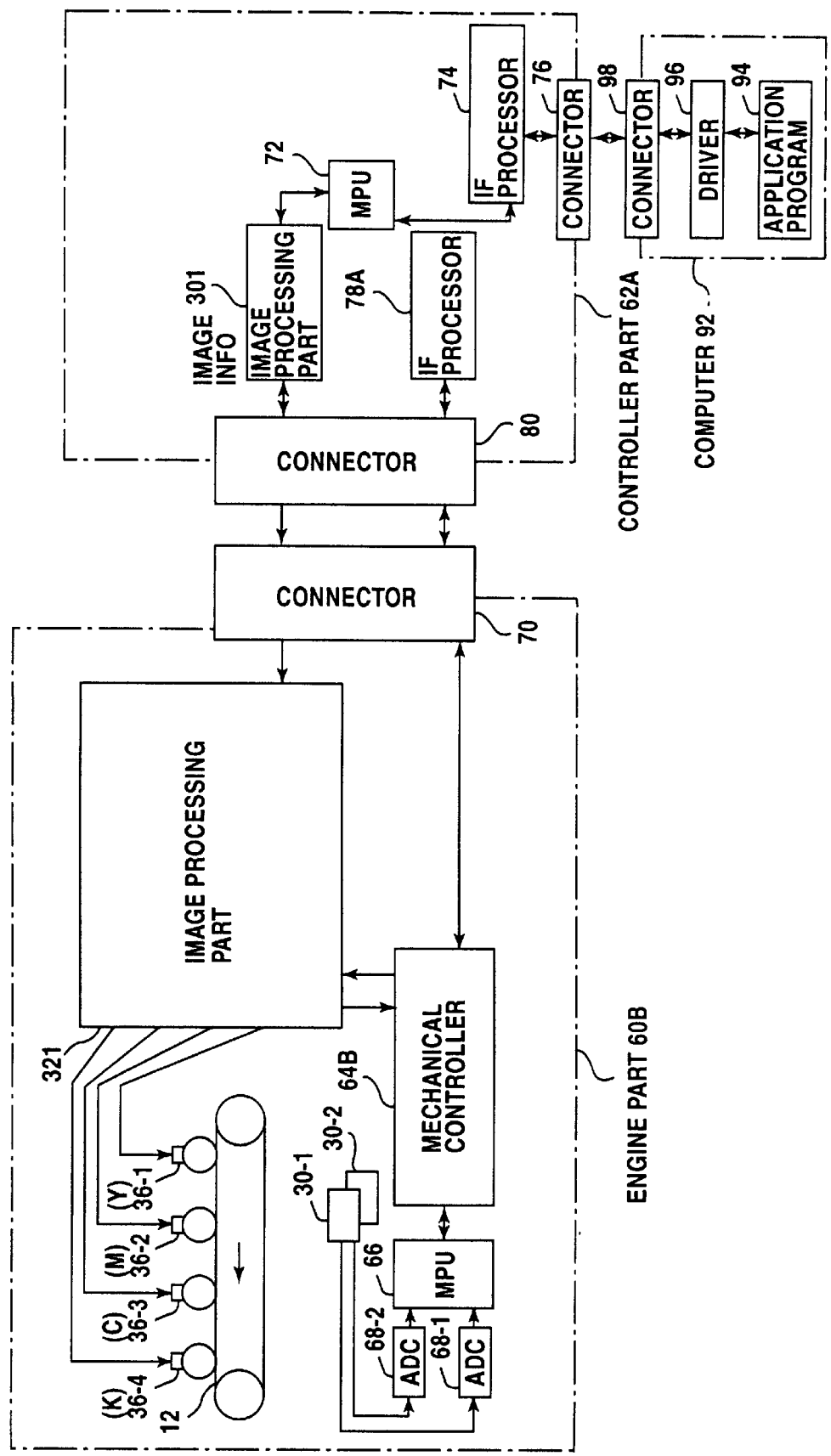
FIG. 39 is a system block diagram showing a third embodiment of the image forming apparatus according to the present invention.

FIG. 39 is a system block diagram showing a third embodiment of the image forming apparatus according to the present invention. In FIG. 39, those parts which are essentially the same as those corresponding parts in FIG. 36 are designated by the same reference numerals, and a description thereof will be omitted. In FIG. 39, an engine part 60B includes a mechanical controller 64B and an image processing part 321.

Figure 40:
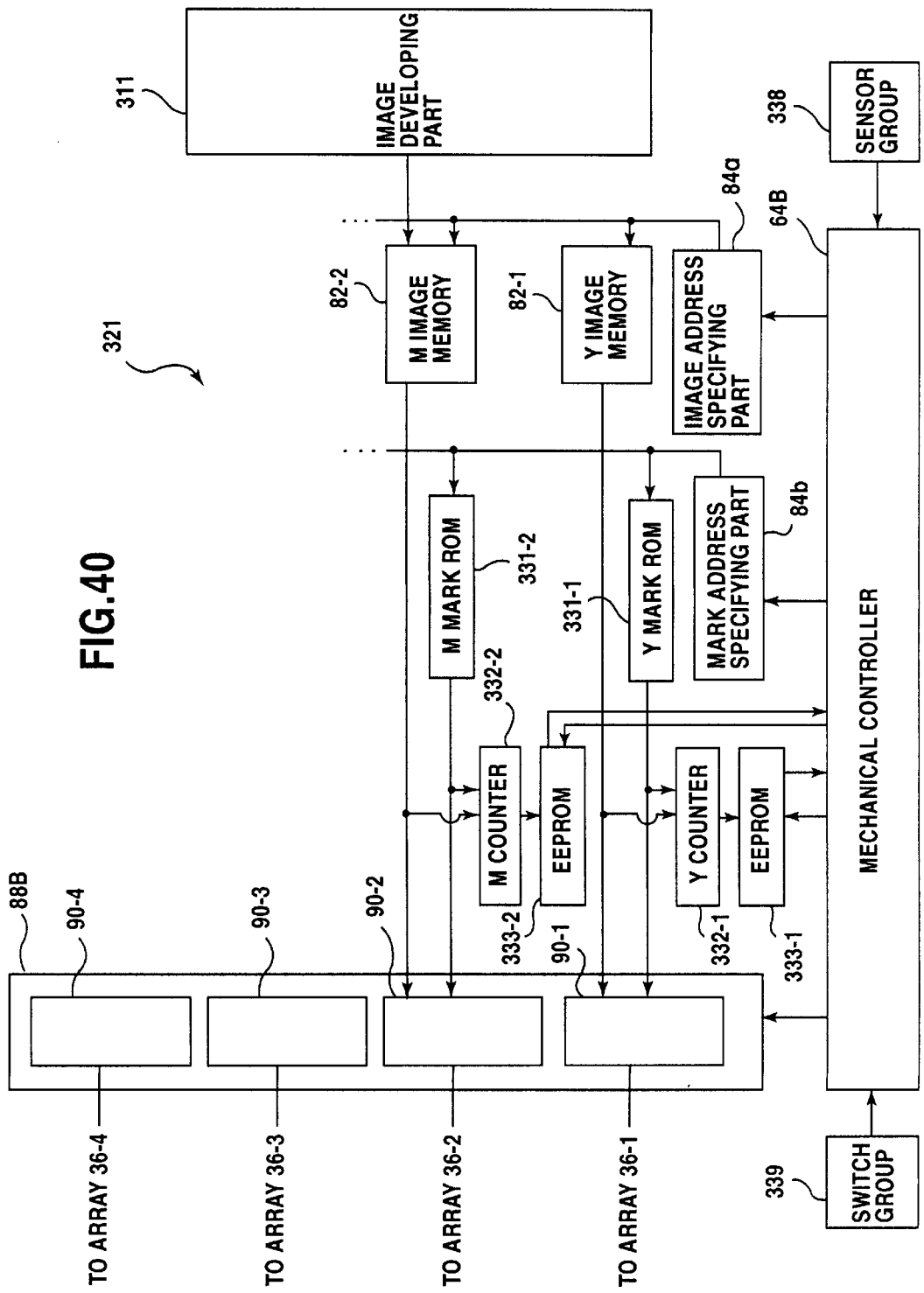
FIG. 40 is a system block diagram showing the construction of an image processor of an engine part.

The image processing part 321 has a construction shown in FIG. 40. In FIG. 40, those parts which are essentially the same as those corresponding parts in FIG. 36 are designated by the same reference numerals, and a description thereof will be omitted. For the sake of convenience, FIG. 40 only shows processing systems for the colors yellow and magenta, but processing systems for the other colors cyan and black have a structure similar to the structure of the processing systems for the colors yellow and magenta. In addition to the image memories 82-1 through 82-4 (only the image memories 82-1 and 82-2 shown in FIG. 40), a resolution converting part 88B and an image developing part 311, the image processing part 321 includes an image address specifying part 84a and a mark address specifying part 84b which are provided in common to the processing systems of each of the colors, Y mark ROM 331-1, a Y counter 332-1 and an EEPROM 333-1 provided in the processing system of the color yellow, and a M mark ROM 331-2, a M counter 332-2 and an EEPROM 333-2 provided in the processing system of the color magenta.

Each of the EEPROMs 333-1 and 333-2 stores a correcting value for correcting an exposure quantity of a corresponding color. For example, in the case where the LED array 36 is used for the electrostatic recording unit 24, it is extremely difficult to make the exposure quantity constant for the entire region of 1 line, due to inconsistencies in the characteristics of the LEDs forming the LED array 36. In addition, when using one or two laser beams to carry out the exposure, it may be seen from FIGS. 37 and 38 that it is extremely difficult to keep the exposure quantity and/or the diameter of the beam spot constant for the entire region of 1 line, because the optical path length from the polygonal mirror 401 or 411 to the photoconductive drum 403 or 413 differs depending on the position within 1 line (1 main scan period). Accordingly, correcting values dependent upon the exposure positions are obtained in advance and stored in the EEPROMs 333-1 and 333-2, so that the pixel data can be corrected based on the correcting values so that the exposure quantity and/or the diameter of the beam spot becomes approximately constant for the entire region of 1 line, when the mechanical controller 64B supplies the pixel data to the corresponding electrostatic recording units 24-1 and 24-2 via the resolution converting part 88B.

The exposure quantity and/or the diameter of the beam spot at each exposure position on 1 line may also vary depending on a change in characteristics caused by aging of the image forming apparatus and/or by a temperature change. Hence, the correcting values at each of the exposure positions may be obtained in advance with respect to the aging and temperature change and stored in the EEPROMs 333-1 and 333-2. In this case, when the mechanical controller 64B supplies the pixel data to the corresponding electrostatic recording units 24-1 and 24-2 via the resolution converting part 88B, the pixel data can be corrected based on the correcting values read from the EEPROMs 333-1 and 333-2 depending on time information and temperature information received from a sensor group 338 which includes a timer, temperature sensor and the like.

The image address specifying part 84a operates similarly to the address specifying part 84 shown in FIG. 36, and specifies addresses for reading the image data of each of the colors from the image memories 82-1 through 82-4 (only the image memories 82-1 and 82-2 shown in FIG. 40). On the other hand, the mark address specifying part 84b specifies addresses for reading mark data of each of the colors from the Y, M, C and K mark ROMs 331-1 through 331-4 (only the mark ROMs 331-1 and 331-2 shown in FIG. 40). The mark data of each of the colors indicate the Y, M, C and K resist marks or Y, M, C and K test patterns described above in conjunction with the first embodiment.

When supplying the mark patterns of each of the colors to the engine part 60B via the controller part 62A, similarly to the first embodiment, the controller part 62A must carry out a mark pattern transmitting operation when starting a job or the like, and for this reason, it may cause a delay in developing the image data from the personal computer 92 into the bit map pattern. But in this embodiment, the mark patterns of each of the colors are prestored in the Y, M, C and K mark ROMs 331-1 through 331-4 (only the mark ROMs 331-1 and 331-2 shown in FIG. 40) within the engine part 60B, and a delay in developing the image data into the bit map pattern can be prevented.

In addition, when printing test patterns of each of the colors to locate a failure, it is desirable that the test patterns can be printed by the engine part 60B alone in order to determine whether the failure exists within the engine part 60B or within the controller part 62B. In this embodiment, the test patterns of each of the colors are prestored in the Y, M, C and K mark ROMs 331-1 through 331-4 (only the mark ROMs 331-1 and 331-2 shown in FIG. 40) within the engine part 60B, so that it is possible to easily locate the failure by printing the test patterns by the engine part 60B alone and printing the test patterns by supplying the test patterns from the controller part 62A to the engine part 60B.

The data prestored in the Y, M, C and K mark ROMs 331-1 through 331-4 (only the mark ROMs 331-1 and 331-2 shown in FIG. 40) are not limited to the resist patterns and the test patterns, and may be fixed data or fixed patterns such as marks which are printed when detecting the quantity or density of the toner adhered on the endless belt 12 and patterns for use in carrying out a jitter compensation.

Each of the Y, M, C and K counters 332-1 through 332-4 (only the counters 332-1 and 332-2 shown in FIG. 40) counts a sum total of the exposure quantities, a sum total of the image densities, a sum total of the number of times the LEDs of the LED array 36 are turned ON or, a value having a correlation with any of the preceding elements, with respect to the corresponding color based on the image data. Counted values of the counters 332-1 through 332-4 (only the counters 332-1 and 332-2 shown in FIG. 40) are stored in the corresponding EEPROMs 333-1 through 333-4 (only the EEPROMs 333-1 and 333-2 shown in FIG. 40). Hence, the mechanical controller 64B can predict the correcting values of the exposure quantities based on the amount of toner consumed, deterioration of the LED arrays or exposure parts of the electrostatic recording units depending on the used states thereof, and correct the pixel data based on the correcting values similarly to the above. The predicted correcting values of the exposure quantities may be stored in the EEPROMs 333-1 through 333-4 (only the EEPROMs 333-1 and 333-2 shown in FIG. 40). It is possible to reset the counted values stored in the EEPROMs 333-1 through 333-4 (only the EEPROMs 333-1 and 333-2 shown in FIG. 40) by sending a reset instruction from the personal computer 92 when replacing the toner, LED array or exposure part of the electrostatic recording units.

The counted values stored in the EEPROMs 333-1 through 333-4 (only the EEPROMs 333-1 and 333-2 shown in FIG. 40) may be reset in response to an output of a switch provided in the engine part 60B when replacing the toner, LED array or exposure part of the electrostatic recording units. In FIG. 40, an output of the switch group 339 including a switch which is operated when supplying or replacing the toner or replacing the LED array or exposure part of the electrostatic recording units is supplied to the mechanical controller 64B. The switch included in the switch group 339 may be constructed to automatically turn ON/OFF to instruct resetting of the counted values when the electrostatic recording unit or the like is removed from the image forming apparatus.

Figure 41:
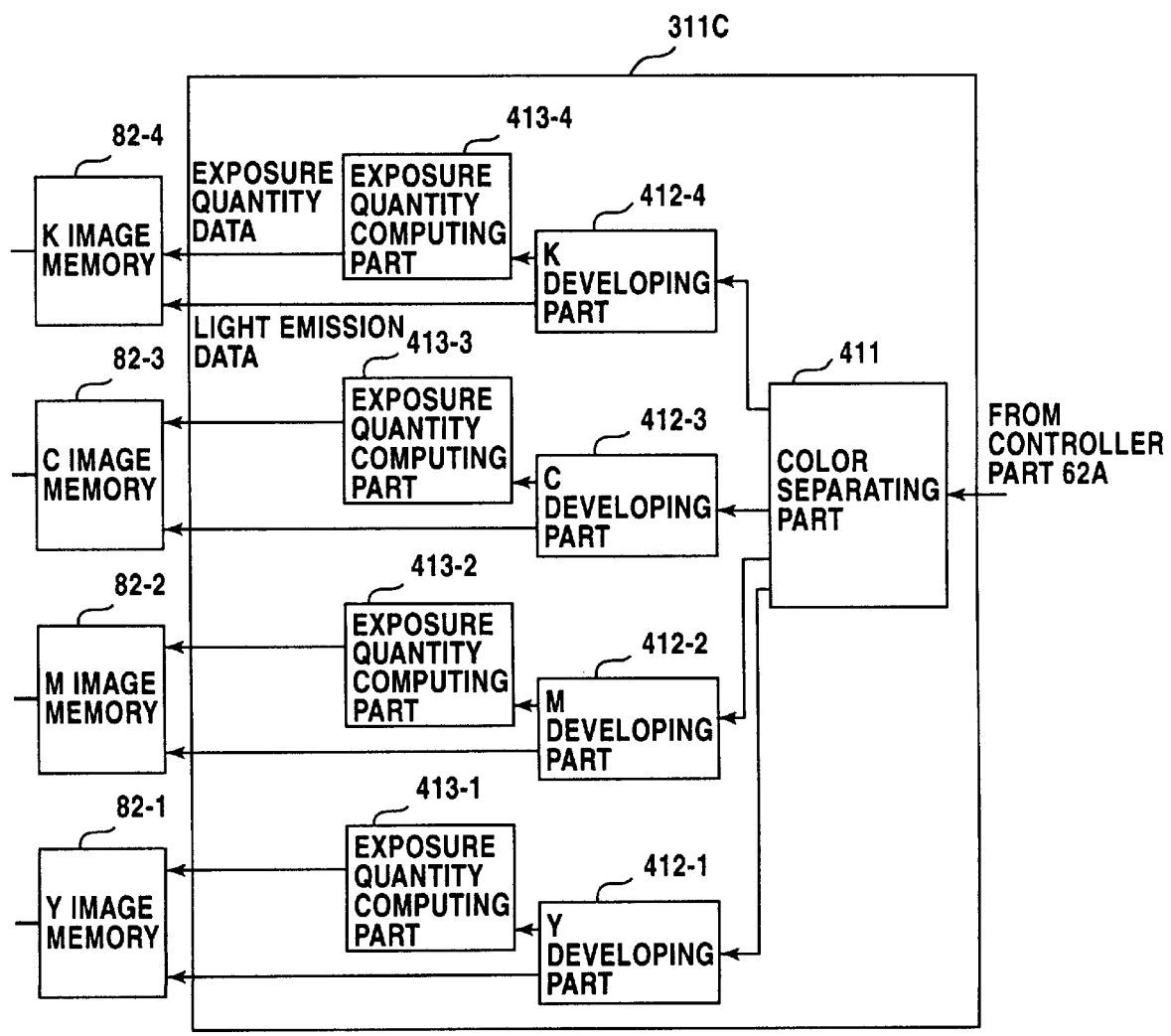
FIG. 41 is a system block diagram showing an important part of a fourth embodiment of the image forming apparatus according to the present invention.

FIG. 41 is a system block diagram showing an important part of a fourth embodiment of the image forming apparatus according to the present invention. In FIG. 41, those parts which are essentially the same as those corresponding parts in FIG. 36 are designated by the same reference numerals, and a description thereof will be omitted.

In FIG. 41, an image developing part 311C generally includes a color separating part 411, Y, M, C and K developing parts 412-1 through 412-4, and exposure quantity computing parts 413-1 through 413-4. In other words, in addition to the constituent elements of the image developing part 311 shown in FIG. 36, the image developing part 311C further includes the exposure quantity computing parts 413-1 through 413-4. The color separating part 411 separates the image data obtained from the controller part 62A into the image data of each of the colors yellow, magenta, cyan and black, and supplies the separated Y, M, C and K image data to the corresponding Y, M, C and K developing parts 412-1 through 412-4. The Y, M, C and K developing parts 412-1 through 412-4 develop the corresponding Y, M, C and K image data into dot data (pixel data), and store the pixel data into the corresponding Y, M, C and K image memories 82-1 through 82-4 as ON/OFF data for controlling ON/OFF states of the LEDs of the LED arrays 36-1 through 36-4. In addition, the exposure quantity computing parts 413-1 through 413-4 compute the exposure quantities of the pixel data obtained from the corresponding Y, M, C and K developing parts 412-1 through 412-4, and store computed exposure quantity data in the corresponding Y, M, C and K image memories 82-1 through 82-4. The exposure quantity computing parts 413-1 through 413-4 also carry out an operation process such as a 1 dot (1 pixel) emphasis process with respect to the exposure quantities of the corresponding pixel data. As a result, it is possible to correct an image quality deteriorating element originating from the engine part 60A by the operation process such as the 1 dot emphasis process.

Figure 42:
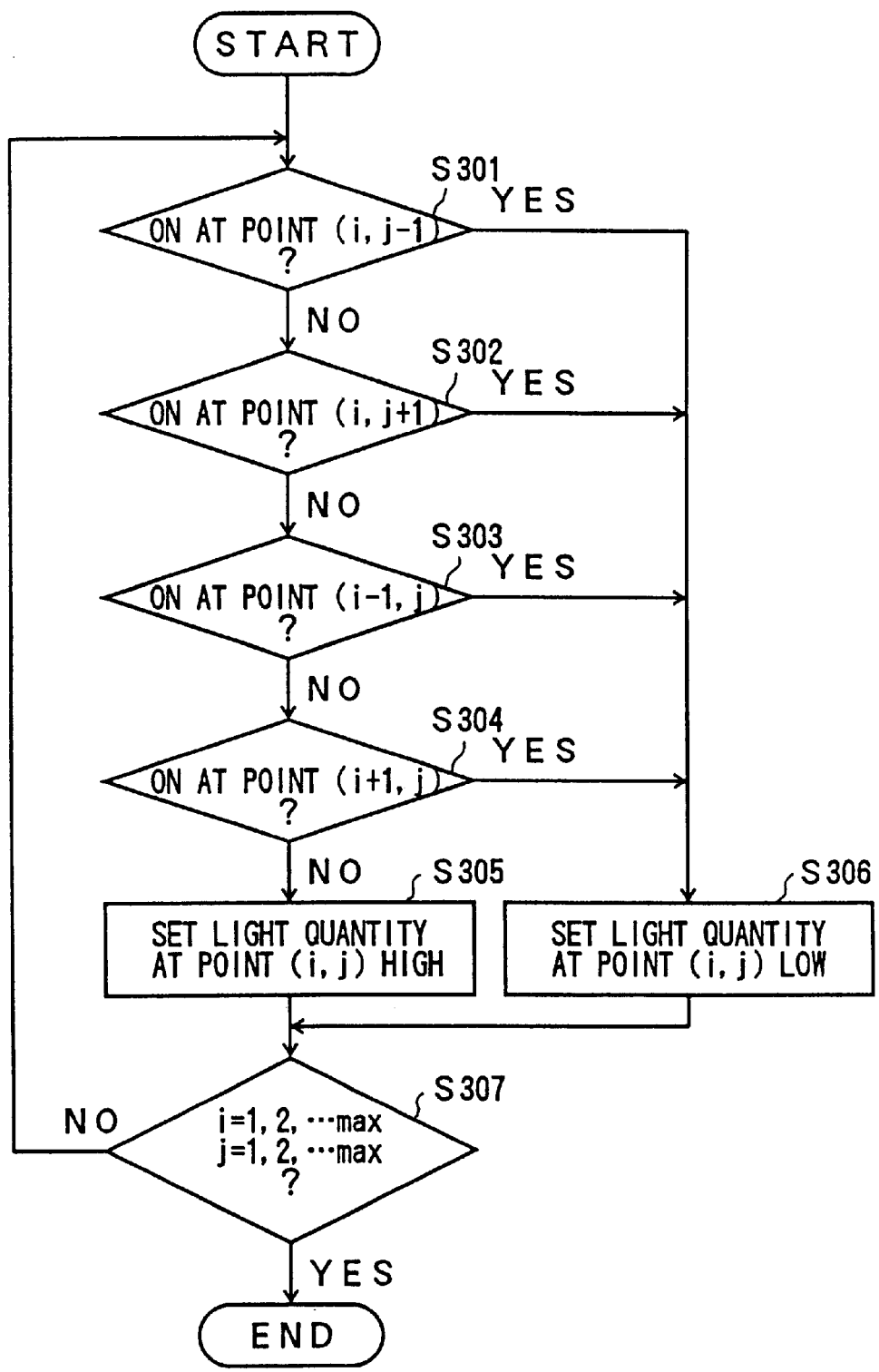
FIG. 42 is a flow chart for explaining an embodiment of an operation process carried out by an exposure quantity operation unit.

FIG. 42 is a flow chart for explaining an embodiment of the operation process carried out by the exposure quantity computing parts 413-1 through 413-4. In this embodiment, the exposure quantity computing parts 413-1 through 413-4 are formed by at least 1 CPU or the like, for example, and carry out the operation process shown in FIG. 42. For example, if it is assumed for the sake of convenience that the 1 dot emphasis process is carried out by the exposure quantity computing part 413-4 with respect to the color black, a step S301 shown in FIG. 42 decides whether or not a dot (pixel) at a point (i, j−1) is to be turned ON, where i denotes a x-coordinate of an image described by pixel data obtained from the corresponding K developing part 412-4 in an xy-coordinate system, and j denotes a y-coordinate of this image in the xy-coordinate system. If the decision result in the step S301 is NO, a step S302 decides whether or not a dot at a point (i, j+1) is to be turned ON. If the decision result in the step S302 is NO, a step S303 decides whether or not a dot at a point (i−1, j) is to be turned ON. If the decision result in the step S303 is NO, a step S304 decides whether or not a dot at a point (i+1, j) is to be turned ON.

If the decision result in the step S304 is NO, a step S305 sets the light quantity of the dot at the point (i, j) to LH, and the process advances to a step S307. On the other hand, if the decision result in any one of the steps S301 through S304 is YES, a step S306 sets the light quantity of the dot at the point (i, j) to LL, where LL<LH, and the process advances to the step S307. The step S307 decides whether or not both i and j are maximum values, and the process returns to the step S301 if the decision result in the step S307 is NO. The process ends if the decision result in the step S307 is YES.

Further, the present invention is not limited to these embodiments, but various variations and modifications may be made without departing from the scope of the present invention.

What is claimed is:

1. An image forming apparatus comprising:
   a transport mechanism transporting a recording medium on a belt which is transported at a constant speed in a transport direction;
   a plurality of electrostatic recording units arranged in the transport direction of the recording medium and transferring toner images of different colors;
   a positional error detecting part using the toner image of a reference color transferred by one of the electrostatic recording units as a reference image, and relatively detecting positional error information related to positional errors of the toner images of remaining colors transferred by the remaining electrostatic recording units with respect to the reference image; and
   a positional error correcting part relatively correcting the positional errors of the toner images transferred by the remaining electrostatic recording units based on the positional error information,
   said positional error detecting part comprising:
      first means for controlling said electrostatic recording units to transfer at least two resist marks on the belt at a scan starting end and a scan terminating end of the belt in a main scan direction which is perpendicular to the transport direction of the recording medium, with respect to each of the colors; and
      second means, including a sensor detecting the resist marks, for detecting positional error quantities of the resist marks of each of the remaining colors with respect to the resist marks of the reference color based on detection times of the resist marks of the reference color and of the remaining colors,
   wherein each of the resist marks has a first straight line parallel to a main scan direction which is perpendicular to the transport direction of the recording medium and a second straight line included with respect to the main scan direction and a sub scan direction which is perpendicular to the main scan direction,
   wherein said second means measures a first time from a detection time of the first line to a detection time of the second line of one resist mark of the reference color, and a second time from a detection time of the first line to a detection time of the second line of each of the remaining colors, and detects an error quantity in the main scan direction of each of the remaining colors based on a difference between the first time and the second time, and
   wherein said positional error detecting part sets an intersecting angle θ of the second straight line of the resist mark with respect to the first straight line to a value satisfying $$\tan\theta \leq (v \cdot T/S)$$

where v denotes a transport speed of the belt in (mm/sec), S denotes a detection accuracy of the sensor in (μm), and T denotes a sampling period of a detection signal output from the sensor in (sec).

2. An image forming apparatus comprising:

a transport mechanism transporting a recording medium on a belt which is transported at a constant speed in a transport direction;

a plurality of electrostatic recording units arranged in the transport direction of the recording medium and transferring toner images of different colors;

a positional error detecting part using the toner image of a reference color transferred by one of the electrostatic recording units as a reference image, and relatively detecting positional error information related to positional errors of the toner images of remaining colors transferred by the remaining electrostatic recording units with respect to the reference image; and a positional error correcting part relatively correcting the positional errors of the toner images transferred by the remaining electrostatic recording units based on the positional error information, said positional error detecting part comprising:

first means for controlling said electrostatic recording units to transfer at least two resist marks on the belt at a scan starting end and a scan terminating end of the belt in a main scan direction which is perpendicular to the transport direction of the recording medium, with respect to each of the colors; and second means, including a sensor detecting the resist marks, for detecting positional error quantities of the resist marks of each of the remaining colors with respect to the resist marks of the reference color based on detection times of the resist marks of the reference color and of the remaining colors, wherein each of the resist marks has a first straight line parallel to a main scan direction which is perpendicular to the transport direction of the recording medium and a second straight line included with respect to the main scan direction and a sub scan direction which is perpendicular to the main scan direction, wherein said second means measures a first time from a detection time of the first line to a detection time of the second line of one resist mark of the reference color, and a second time from a detection time of the first line to a detection time of the second line of each of the remaining colors, and detects an error quantity in the main scan direction of each of the remaining colors based on a difference between the first time and the second time, and wherein said positional error detecting part sets an intersecting angle θ of the second straight line of the resist mark with respect to the first straight line to a value satisfying $$\tan\theta \leq (v \cdot t/W)$$

where v denotes a transport speed of the belt in (mm/sec), W denotes a tolerable error width of the first straight line in the main scan direction in (mm), and t denotes a tolerable time of printing one resist mark in the sub scan direction in (sec).

3. An image forming apparatus comprising:

a transport mechanism transporting a recording medium on a belt which is transported at a constant speed in a transport direction;

a plurality of electrostatic recording units arranged in the transport direction of the recording medium and transferring toner images of different colors;

a positional error detecting part using the toner image of a reference color transferred by one of the electrostatic recording units as a reference image, and relatively detecting positional error information related to positional errors of the toner images on remaining colors transferred by the remaining electrostatic recording units with respect to the reference image;

a positional error correcting part relatively correcting the positional errors of the tones images transferred by the remaining electrostatic recording units based on the positional error information; and an image memory developing image data of each of the colors into pixel data and storing the pixel data, said positional error detecting part comprising;

first means for controlling said electrostatic recording units to transfer at least two resist marks on the belt at a scan starting end and a scan terminating end of the belt in a main scan direction which is perpendicular to the transport direction of the recording medium, with respect to each of the colors; and second means, including a sensor detecting the resist marks, for detecting positional error quantities of the resist marks of each of the remaining colors with respect to the resist marks of the reference color based on a difference between detection times of the resist marks of the reference color and of the remaining colors, wherein said positional error correcting part corrects a write address of said image memory based on the positional error information detected by said positional error detecting part when developing the image data into the pixel data, so as to correct an error of images of the remaining colors with respect to the reference image when printing, wherein said positional error correction part computes an error quantity in a sub scan direction which is perpendicular to the main scan direction at each pixel position along a main scan line in the main scan direction based on an error quantity Δx in the main scan direction, an error quantity Δy in the sub scan direction and a skew quantity Δz in the sub scan direction of the pixel data, and corrects the write address of said image memory by correcting the write address in the sub scan direction to a position in a direction opposite to a direction of the error so as to cancel each error quantity, wherein each of said electrostatic recording units comprises an optical write unit, including a photoconductive drum, forming an electrostatic latent image on the photoconductive drum by carrying out an optical write operation with respect to the photoconductive drum depending on gradation values of the pixel data, wherein a resolution in the sub scan direction of the optical write unit being higher than a resolution in the main scan direction, and wherein said position error correcting part carrying out the printing by correcting the positional error using the gradation values and a high-resolution optical write operation of the optical write unit.

4. The image forming apparatus as claimed in claim 3, wherein:

said optical write unit includes a write array having a plurality of light emitting elements arranged at a pitch of 1 pixel in the main scan direction, and writes 1 pixel by controlling light emissions of the write array in time divisions of first through nth scans in synchronism with the transport of the recording medium in the sub scan direction at a pitch of 1/n pixels, said positional error correcting part converts the pixel data into the high-resolution pixel data by decomposing the pixel data into n in the sub scan direction and stores the high-resolution pixel data in said image memory when developing the pixel data in said image memory, and computes the error quantity in the sub scan direction at each pixel position on the main scan line, based on the error quantity $_\Delta x$ in the main scan direction, the error quantity $_\Delta y$ in the sub scan direction and the skew quantity $_\Delta z$ in the sub scan direction, with respect to the high-resolution pixel data, and writes the pixel data in said image memory by correcting the write address in the sub scan direction to a position in a direction opposite to the direction of the error so as to cancel each error quantity, so that n corrected high-resolution pixel data are successively read from said image memory in synchronism with the transport of the recording medium in the sub scan direction at a pitch of 1/n pixel, and 1 pixel is written by the write array by time-divisionally driving the light emitting elements of the write array.

5. The image forming apparatus as claimed in claim 4, wherein:

said positional error correcting part judges whether or not the n high-resolution pixel data decomposed with the pitch of 1/n pixel in the sub scan direction are located at a pixel boundary when developing the high-resolution pixel data which are corrected of the positional error in said image memory, stores a previously used gradation value as a gradation value of a first scan with respect to the n decomposed high-resolution pixel data if the n high-resolution pixel data are not located at the pixel boundary, and stores the gradation values separately for the first through nth scans with respect to the decomposed n high-resolution pixel data if the n high-resolution pixel data are located at the pixel boundary, a light emission of the light emitting elements of the write array of the optical write unit is time-divisionally controlled depending on the same gradation value for each timing of the first through nth scans of 1 pixel at the pitch of 1/n pixel in the sub scan direction if the high-resolution pixel data amounting to 1 pixel decomposed in the sub scan direction and read from said image memory has the gradation value of only the first scan, and if the high-resolution pixel data amounting to 1 pixel decomposed in the sub scan direction and read from said image memory has the gradation values of the first through nth scans, the light emission of the light emitting elements of the write array of the optical write unit is controlled depending on the gradation value of the first scan with the timing of the nth scan of the nth 1/n period for the first 1 pixel, controlled depending on the gradation value of the second scan with the timing of the (n−1)th scan of the second 1/n period of the next 1 pixel, . . . , and controlled depending on the gradation value of the nth scan with the timing of the first scan of the first 1/n period of the next 1 pixel.

6. The image forming apparatus as claimed in claim 5, wherein the optical write unit comprises:

a driving part controlling the light emission of the light emitting elements of the write array by a number of light emission pulses dependent upon the gradation value during each light emission period, so as to control a depth of the latent image formed on the photoconductive drum.

7. The image forming apparatus as claimed in claim 4, wherein the write array of the optical write unit comprises a light emitting diode (LED) array having a plurality of LEDs arranged at a pitch of 1 pixel in the main scan direction.

8. The image forming apparatus as claimed in claim 7, wherein a print resolution of the LED array in the sub scan direction is an integral multiple of a print resolution of the LED array in the main scan direction.

9. The image forming apparatus as claimed in claim 3, wherein a print resolution of the optical write unit in the sub scan direction is an integral multiple of a print resolution of the optical write unit in the main scan direction.

10. An image forming apparatus comprising:

a transport mechanism transporting a recording medium on a belt which is transported at a constant speed in a transport direction;

a plurality of electrostatic recording units arranged in the transport direction of the recording medium and transferring toner images of different colors;

a positional error detecting part using the toner image of a reference color transferred by one of the electrostatic recording units as a reference image, and relatively detecting positional error information related to positional errors of the toner images of remaining colors transferred by the remaining electrostatic recording units with respect to the reference image;

a positional error correcting part relatively correcting the positional errors of the toner images transferred by the remaining electrostatic recording units based on the positional error information; and an image memory developing image data of each of the colors into pixel data and storing the pixel data, said positional error detecting part comprising:

first means for controlling said electrostatic recording units to transfer at least two resist marks on the belt at a scan starting end and a scan terminating end of the belt in a main scan direction which is perpendicular to the transport direction of the recording medium, with respect to each of the colors; and second means, including a sensor detecting the resist marks, for detecting positional error quantities of the resist marks of each of the remaining colors with respect to the resist marks of the reference color based on a difference between detection times of the resist marks of the reference color and of the remaining colors, wherein said positional error correcting part corrects a write address of said image memory based on the positional error information detected by said positional error detecting part when developing the image data into the pixel data, so as to correct an error of images of the remaining colors with respect to the reference image when printing, wherein said positional error correcting part obtains a reduced or enlarged number (N/Km) of corrected pixels by multiplying to a predetermined number N of pixels in the main scan direction an inverse number of a magnification Km which is obtained by dividing a line width of the image in the main scan direction by a line width of the reference image of the main scan direction, and writes the graduation value of the pixel data compressed or expanded in the main scan direction at each pixel address of the reduced or enlarged number (N/Km) of corrected pixels, and wherein said positional error detecting part sets an intersecting angle θ of the second straight line of the resist mark with respect to the first straight line to a value satisfying at least one of $$\tan\theta \leq (v \cdot T/S),$$

and $$\tan\theta \leq (v \cdot t/W)$$

where v denotes a transport speed of the belt in (mm/sec,) S denotes a detection accuracy of the sensor in (μm), T denotes a sampling period of a detection signal output from the sensor in (sec), W denotes a tolerable error width of the first straight line in the main scan direction in (mm), and t denotes a tolerable time of printing one resist mark in the sub scan direction in (sec).

11. The image forming apparatus as claimed in claim 10, wherein said positional error correcting part multiplies the inverse number of the magnification Km with respect to the print result of the pixel data before the correction to obtain a corrected print result which is reduced or enlarged in the main scan direction, and samples the corrected print result at each position of the reduced or enlarged number (N/Km) of corrected pixels by multiplying the inverse number of the magnification Km of the line width of the image in the main scan direction to the predetermined number N of pixels in the main scan direction, so as to generate the gradation value of each pixel after being subjected to the line width correction.

12. An image forming apparatus comprising:
a controller part receiving image data and control information and converting the image data into a video data format conforming to a video interface specification for a video interface; and
an engine part, separate from said controller part, including a recording unit printing an image on a recording medium based on the image data and the control information received from said controller part via the video interface,
said engine part further including image processing means for converting the video data format of the image data received via the video interface depending on a driving system employed by the recording unit for correcting a positional error of a print position of the recording unit.

13. The image forming apparatus as claimed in claim 12, wherein the video interface specification of the video interface between said controller part and said engine part is the same or approximately the same regardless of different types of the image forming apparatus.

14. The image forming apparatus as claimed in claim 12, wherein the image processing means of said engine part includes a storing part storing correcting values dependent upon exposure positions.

15. The image forming apparatus as claimed in claim 14, wherein the storing part stores correcting values dependent upon the exposure positions with respect to aging and/or temperature change.

16. The image forming apparatus as claimed in claim 14, wherein said engine part further includes correcting means for correcting an exposure quantity of the recording unit based on the correcting values.

17. The image forming apparatus as claimed in claim 12, wherein the image processing means of said engine part includes a storing part storing a fixed pattern selected from a group consisting of a resist pattern, a test pattern, a jitter compensation pattern, and marks which are printed when detecting a quantity or density of a toner transferred from the recording unit.

18. The image forming apparatus as claimed in claim 12, wherein the image processing means of said engine part includes means for storing a counted value by counting based on the image data at least one of a group consisting of a sum total of exposure quantities, a sum total of image densities, a sum total of a number of times light emitting elements of the recording unit are turned ON, and a value having a correlation with any of preceding elements.

19. The image forming apparatus as claimed in claim 18, which further comprises:
means for resetting the counted value.

20. The image forming apparatus as claimed in claim 18, wherein said engine part further includes correcting means for correcting an exposure quantity of the recording unit based on the counted value.

21. The image forming apparatus as claimed in claim 12, wherein the image processing means of said engine part includes means for carrying out an operation process with respect to an exposure quantity of the image data.

* * * * *